United States Patent
Mizusawa

(10) Patent No.: US 10,057,801 B2
(45) Date of Patent: Aug. 21, 2018

(54) APPARATUS FOR DECIDING A MULTIMEDIA BROADCAST MULTICAST SERVICE OVER SINGLE FREQUENCY NETWORK AREA

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 120 days.

(21) Appl. No.: 15/035,886

(22) PCT Filed: Jan. 13, 2015

(86) PCT No.: PCT/JP2015/050660
§ 371 (c)(1),
(2) Date: May 11, 2016

(87) PCT Pub. No.: WO2015/115167
PCT Pub. Date: Aug. 6, 2015

(65) Prior Publication Data
US 2016/0295443 A1    Oct. 6, 2016

(30) Foreign Application Priority Data

Jan. 30, 2014    (JP) ................................. 2014-015631

(51) Int. Cl.
*H04W 24/10*    (2009.01)
*H04W 76/40*    (2018.01)
(Continued)

(52) U.S. Cl.
CPC ........... *H04W 24/10* (2013.01); *H04L 5/0048* (2013.01); *H04L 12/189* (2013.01);
(Continued)

(58) Field of Classification Search
None
See application file for complete search history.

(56) References Cited

U.S. PATENT DOCUMENTS

2013/0028161 A1*  1/2013 Maeda ................. H04L 5/0048
                                                             370/311
2013/0301509 A1* 11/2013 Purnadi ............... H04L 65/4076
                                                             370/312

(Continued)

OTHER PUBLICATIONS

Huawei, HiSilicon, "Discussion on UE measurements for MBMS," 3GPP TSG RAN WG1 Meeting #74bis R1-134351, <URL:http://www.3gpp.org/ftp/tsg_ran/WG1_RL1/TSGR1_74b/Docs/R1-134351.zip>, Oct. 7-11, 2013, (4 pages).

(Continued)

*Primary Examiner* — Diane Lo
(74) *Attorney, Agent, or Firm* — Oblon, McClelland, Maier & Neustadt, L.L.P.

(57) ABSTRACT

[Object] To make it possible to automatically decide an MBSFN area to which a cell belongs.
[Solution] There is provided an apparatus including an acquisition unit configured to acquire a result of measurement of a reference signal transmitted by one of a target base station and one or more other base stations, the result of the measurement being supplied by the other of the target base station and the one or more other base stations, and a decision unit configured to decide an MBSFN area to which a cell of the target base station belongs based on the result of the measurement.

25 Claims, 35 Drawing Sheets

(51) Int. Cl.
*H04W 4/06* (2009.01)
*H04W 24/02* (2009.01)
*H04W 76/00* (2018.01)
*H04L 5/00* (2006.01)
*H04L 12/18* (2006.01)

(52) U.S. Cl.
CPC ........... *H04L 12/1877* (2013.01); *H04W 4/06* (2013.01); *H04W 24/02* (2013.01); *H04W 76/002* (2013.01); *H04W 76/40* (2018.02); *H04L 12/1836* (2013.01)

(56) References Cited

U.S. PATENT DOCUMENTS

| | | | | |
|---|---|---|---|---|
| 2014/0185455 A1* | 7/2014 | Balasubramanian | ... | H04W 4/06 370/241 |
| 2014/0247766 A1* | 9/2014 | Zhang | ...... | H04W 72/005 370/312 |
| 2016/0211980 A1* | 7/2016 | Zhu | ........... | H04W 4/06 |
| 2016/0374050 A1* | 12/2016 | Prasad | ............ | H04W 4/06 |

OTHER PUBLICATIONS

Qualcomm Incorporated, "Initial MBSFN measurement evaluation," 3GPP TSG-RAN WG1 #74bis R1-134615, <URL:http://www.3gpp.org/ftp/tsg_ran/WG1_RL1/TSGR1_74b/Docs/R1-134615.zip>, Oct. 7-11, 2013, (7 pages).

Huawei, HiSilicon, "Details of MBMS measurements," 3GPP TSG RAN WG1 Meeting #75 R1-135031, <URL:http://www.3gpp.org/ftp/tsg_ran/WG1_RL1/TSGR1_75/Docs/R1-135031.zip>, Nov. 11-15, 2013, (4 pages).

ETSI Technical Specification, "LTE; Evolved universal Terrestrial Radio Access (E-UTRA); Radio Resource Control (RRC); Protocol specification (3GPP TS 36.331 version 11.5.0 Release 11)," ETSI TS 136 331 V11.5.0, Sep. 2013, (351 pages).

International Search Report dated Apr. 7, 2015 in PCT/JP2015/050660 filed Jan. 13, 2015.

* cited by examiner

FIG. 6
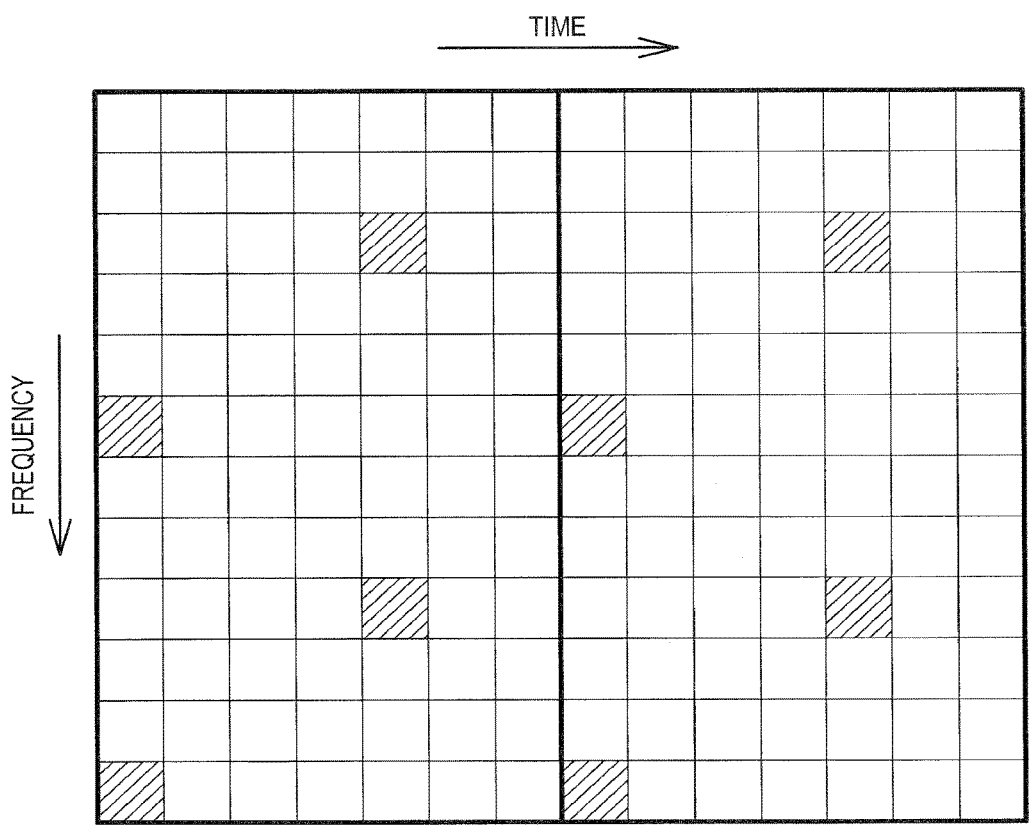
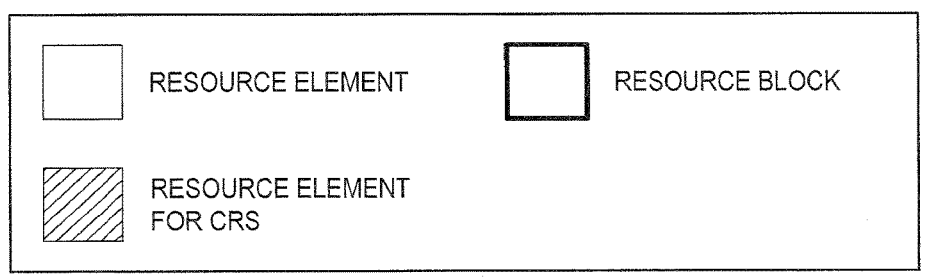

FIG. 18

| MBSFN AREA ID | RECEPTION LEVEL [dBm/Hz] | SINR [dB] |
|---|---|---|
| 2 | -135 | 15 |
| 0 | -140 | 10 |
| 1 | -155 | -1 |

FIG. 19

| CELL ID | PATH LOSS [dB] |
|---|---|
| 1 | 50 |
| 3 | 65 |
| 6 | 85 |

FIG. 26

| CELL ID | PATH LOSS [dB] |
|---------|----------------|
| 1       | 45             |
| 3       | 65             |
| 6       | 80             |

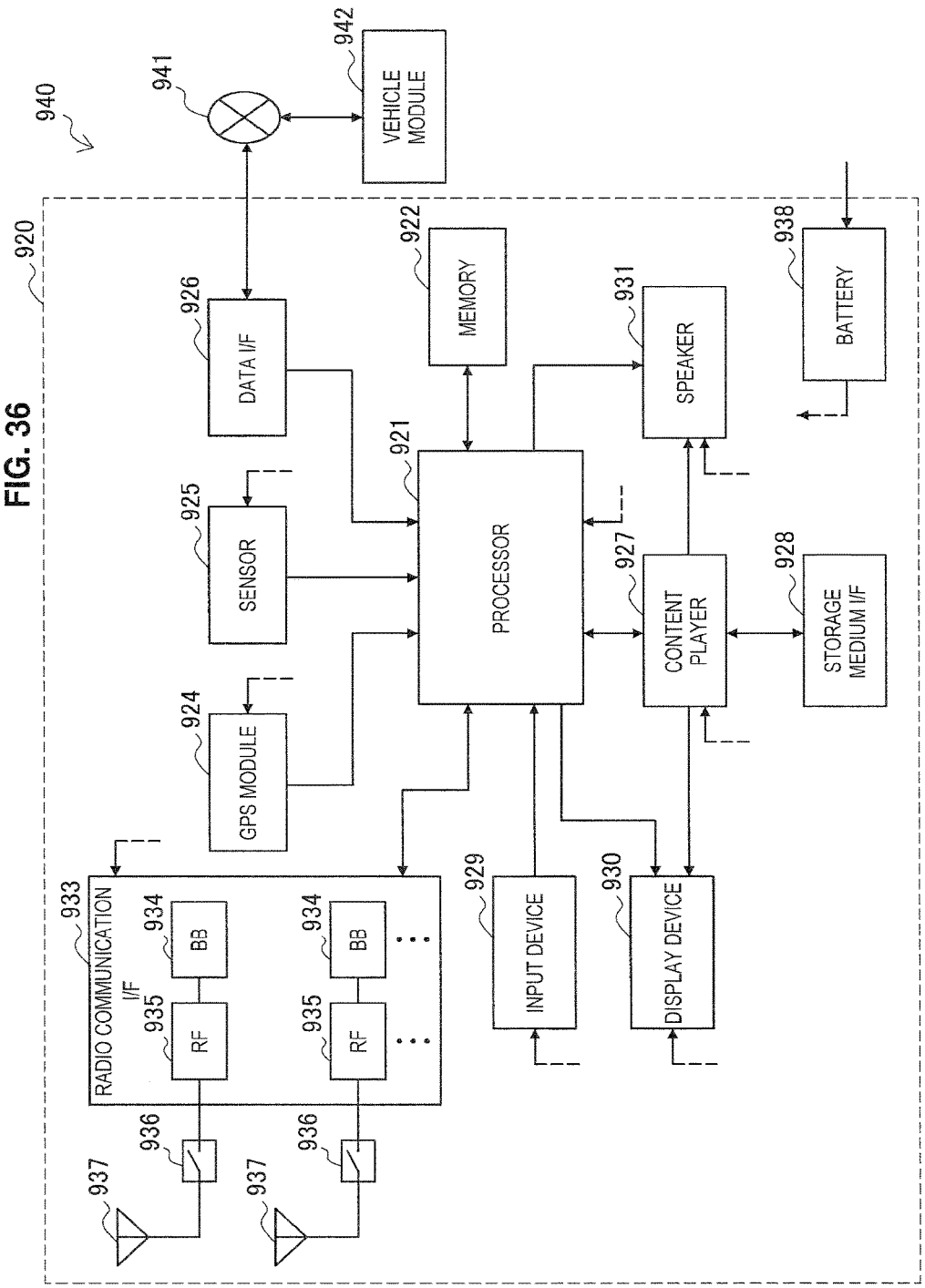

(1)

APPARATUS FOR DECIDING A MULTIMEDIA BROADCAST MULTICAST SERVICE OVER SINGLE FREQUENCY NETWORK AREA

TECHNICAL FIELD

The present disclosure relates to an apparatus.

BACKGROUND ART

In cellular networks, multicast broadcast multimedia services (MBMS) has been put to practical use as a scheme of delivering the same content as broadcast content to a plurality of users. In particular, in Long Term Evolution (LTE), an MBMS over single frequency network (MBSFN) in which base stations of a plurality of cells are mutually synchronized to deliver the same content has been standardized. Through an MBSFN, received signals from a plurality of base stations are combined so that reception quality can be improved.

Technologies have been proposed.

For example, Non-Patent Literature 1 discloses a technology standardized for MBMS and MBSFN.

CITATION LIST

Non-Patent Literature

Non-Patent Literature 1: 3GPP TS 36.331 V11. 5.0 (2013-09) LTE; Evolved Universal Terrestrial Radio Access (E-UTRA); Radio Resource Control (RRC); Protocol Specification

SUMMARY OF INVENTION

Technical Problem

However, it is difficult to decide an MBSFN area to which a cell belongs in some cases. For example, since a home evolved node B (HeNB) is installed by a user, an operator of a mobile communication network may not systematically decide an installation place of the HeNB. For this reason, for example, when an MBSFN area is configured by a cell (for example, a femtocell) of an HeNB, it may be difficult to decide an MBSFN area to which a newly installed cell of an HeNB belongs.

Accordingly, it is desirable to provide a structure capable of automatically deciding an MBSFN area to which a cell belongs.

Solution to Problem

According to the present disclosure, there is provided an apparatus including: an acquisition unit configured to acquire a result of measurement of a reference signal transmitted by one of a target base station and one or more other base stations, the result of the measurement being supplied by the other of the target base station and the one or more other base stations, and a decision unit configured to decide a multimedia broadcast multicast service (MBMS) over single frequency network (MBSFN) area to which a cell of the target base station belongs based on the result of the measurement.

According to the present disclosure, there is provided an apparatus including: an acquisition unit configured to acquire a result of measurement of a reference signal transmitted by one of a target base station and one or more other base stations; and a supply unit configured to supply the result of the measurement to a control apparatus that decides an MBSFN area to which a cell of the target base station belongs.

According to the present disclosure, there is provided an apparatus including: a measurement unit configured to measure an MBSFN reference signal transmitted by one or more base stations; and a supply unit configured to supply a result of the measurement to a base station to which a terminal apparatus is connected.

According to the present disclosure, there is provided an apparatus including: an acquisition unit configured to acquire a result of measurement of delay between identical signals transmitted in an MBSFN area and a decision unit configured to decide a length of a cyclic prefix for MBSFN subframes of the MBSFN area based on the result of the measurement.

According to the present disclosure, there is provided an apparatus including an acquisition unit configured to acquire a result of measurement of delay between identical signals transmitted in an MBSFN area and a supply unit configured to supply the result of the measurement to a control device that decides a length of a cyclic prefix for MBSFN subframes of the MBSFN area.

According to the present disclosure, there is provided an apparatus including a measurement unit configured to measure delay between identical signals transmitted in an MBSFN area.

According to the present disclosure, there is provided an apparatus including a control unit configured to control transmission so that only an MBSFN reference signal is transmitted in at least one symbol of an MBSFN area of specific MBSFN subframes.

According to the present disclosure, there is provided an apparatus including an acquisition unit configured to acquire specification information for specifying a length of a cyclic prefix for MBSFN subframes of the MBSFN area and a control unit configured to control transmission of the specification information in a cell.

Advantageous Effects of Invention

According to the present disclosure described above, it is possible to automatically decide an MBSFN area to which a base station belongs. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 6 is an explanatory diagram illustrating a first example of resources and signals of normal subframes.

FIG. 18 is an explanatory diagram illustrating an example of a result of measurement of an MBSFN reference signal.

FIG. 19 is an explanatory diagram illustrating an example of a result of measurement of a CRS.

FIG. 26 is an explanatory diagram illustrating an example of a result of measurement of a CRS.

FIG. 36 is a block diagram illustrating an example of a schematic configuration of a car navigation apparatus.

DESCRIPTION OF EMBODIMENT(S)

Figure 1:
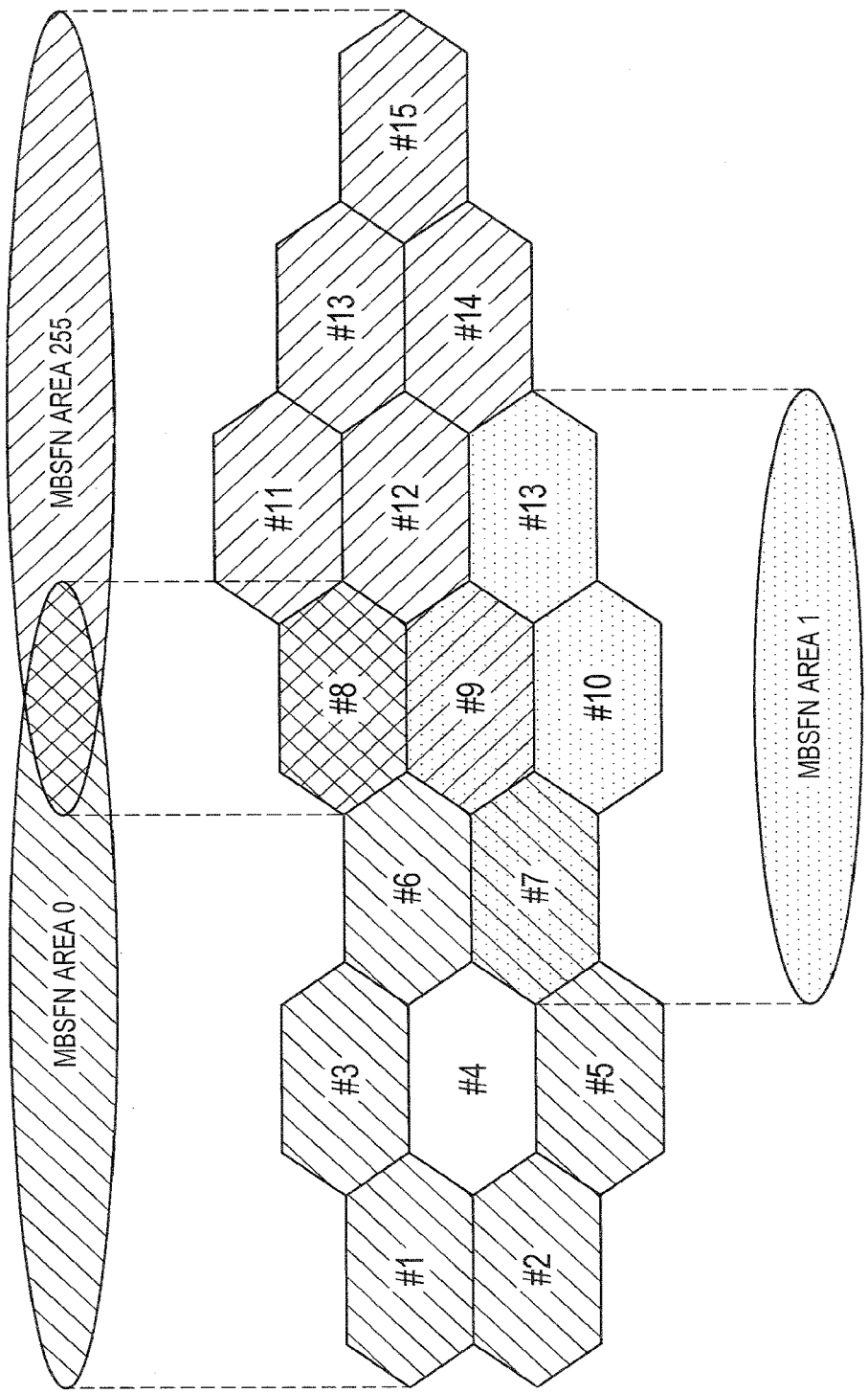
FIG. 1 is an explanatory diagram illustrating an example of an MBSFN area.

Hereinafter, preferred embodiments of the present disclosure will be described in detail with reference to the appended drawings. In this specification and the drawings, elements that have substantially the same function and structure are denoted with the same reference signs, and repeated explanation is omitted.

The description will be made in the following order.
1. Introduction
2. Schematic configuration of communication system
3. First embodiment
3.1. Configuration of control apparatus
3.2. Configuration of small base station
3.3. Flow of process
4. Second embodiment
4.1. Configuration of control apparatus
4.2. Configuration of small base station
4.3. Configuration of terminal apparatus
4.4. Flow of process
5. Third embodiment
5.1. Configuration of control apparatus
5.2. Configuration of small base station
5.3. Flow of process
6. Fourth embodiment
6.1. Configuration of control apparatus
6.2. Configuration of small base station
6.3. Configuration of terminal apparatus
6.4. Flow of process
7. Application examples
7.1. Application example of control apparatus
7.2. Application example of small base station
7.3. Application example of terminal apparatus
8. Conclusion 1. Introduction First, technologies for MBMS and an MBSFN will be described with reference to FIGS. 1 to 15.
(MBSFN Area)

In an MBSFN, a plurality of base stations are mutually synchronized to deliver the same content. That is, in an MBSFN, a plurality of base stations transmit the same data with the same radio resources. Cells (that is, a plurality of cells) of the plurality of base stations are referred to as MBSFN areas. Each cell can belong to a maximum of 8 MBSFN areas. Hereinafter, a specific example of an MBSFN area will be described with reference to FIG. 1.

FIG. 1 is an explanatory diagram illustrating an example of an MBSFN area. Referring to FIG. 1, cells #1 to #15 are illustrated. In this example, an MBSFN area 0 includes cells #1 to #3 and #5 to #8, an MBSFN area 1 includes cells #7, #9, #10, and #13, and an MBSFN area 255 includes cells #8, #9, and #11 to #15. Cell #7 belongs to both of the MBSFN area 0 and the MBSFN area 1. Cell #8 belongs to both of the MBSFN area 0 and the MBSFN area 255. Cell #9 belongs to both of the MBSFN area 1 and the MBSFN area 255. Cell #4 belongs to neither the MBSFN area 1 nor the MBSFN area.

(Channels Related to MBMS)

Logical channels, transport channels, and physical channels are decided for the MBMS. Hereinafter, this point will be described with reference to FIG. 2.

Figure 2:
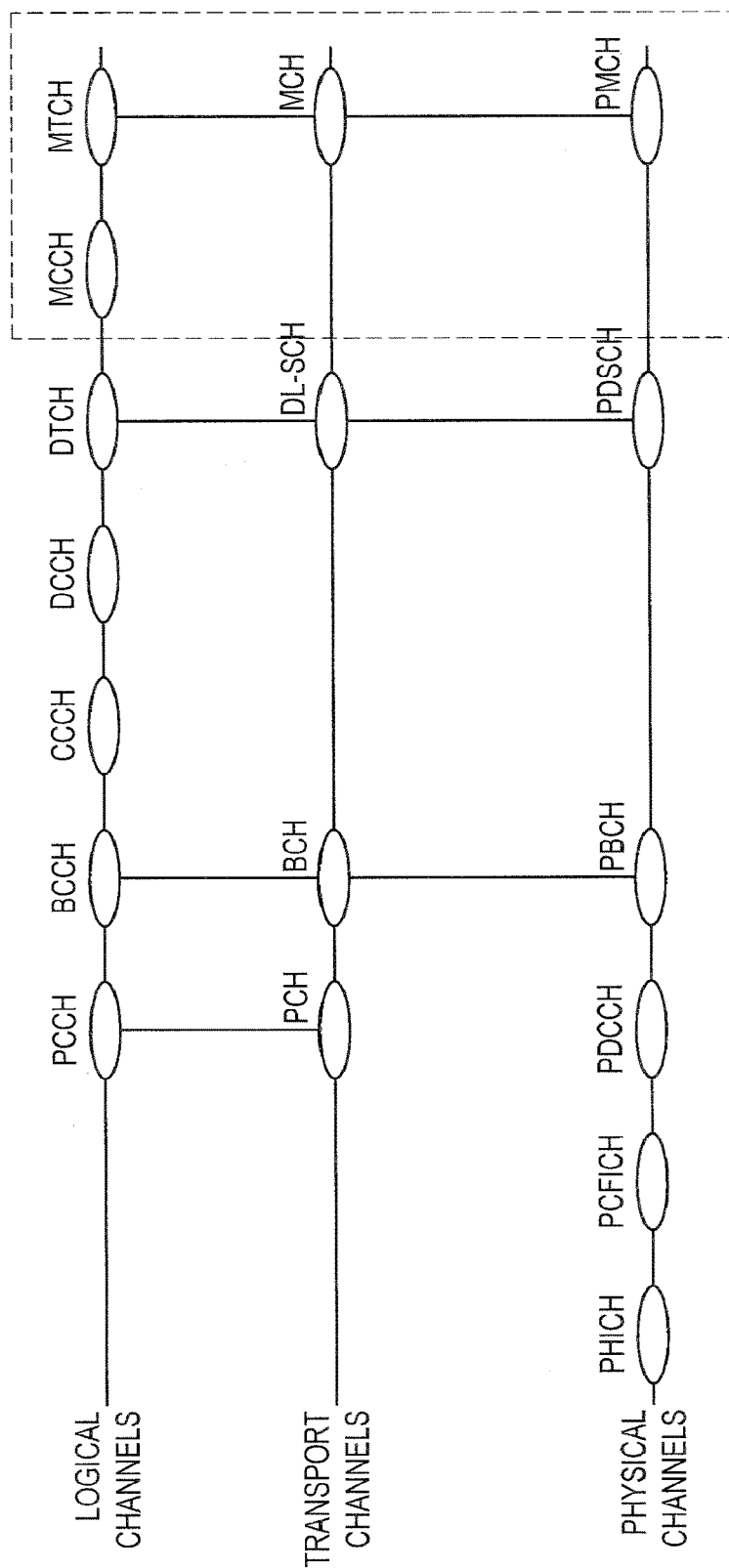
FIG. 2 is an explanatory diagram illustrating channels for an MBMS.

FIG. 2 is an explanatory diagram illustrating channels for an MBMS. Referring to FIG. 2, logical channels, transport channels, and physical channels decided in LTE are illustrated. In particular, a multicast control channel (MCCH) and a multicast traffic channel (MTCH) are decided as the logical channels for the MBMS. The MCCH is a channel for transmitting control information such as an MBSFN area configuration message and an MBM counting request messega (MBMS). The MTCH is a channel for transmitting data of the MBMS. A physical multicast channel (PMCH) is decided as the physical channel for the MBMS. Both of the control information mapped to the MCCH and data mapped to the MTCH are mapped to the PMCH via a multicast channel (MCH) which is a transport channel.

(MBSFN Subframes)

The MBSFN is transmitted with MBSFN subframes. The MBSFN subframe is indicated by a radio frame allocation period, a radio frame allocation offset, and a subframe allocation. Hereinafter, specific examples of the MBSFN subframes will be described with reference to FIG. 3.

Figure 3:
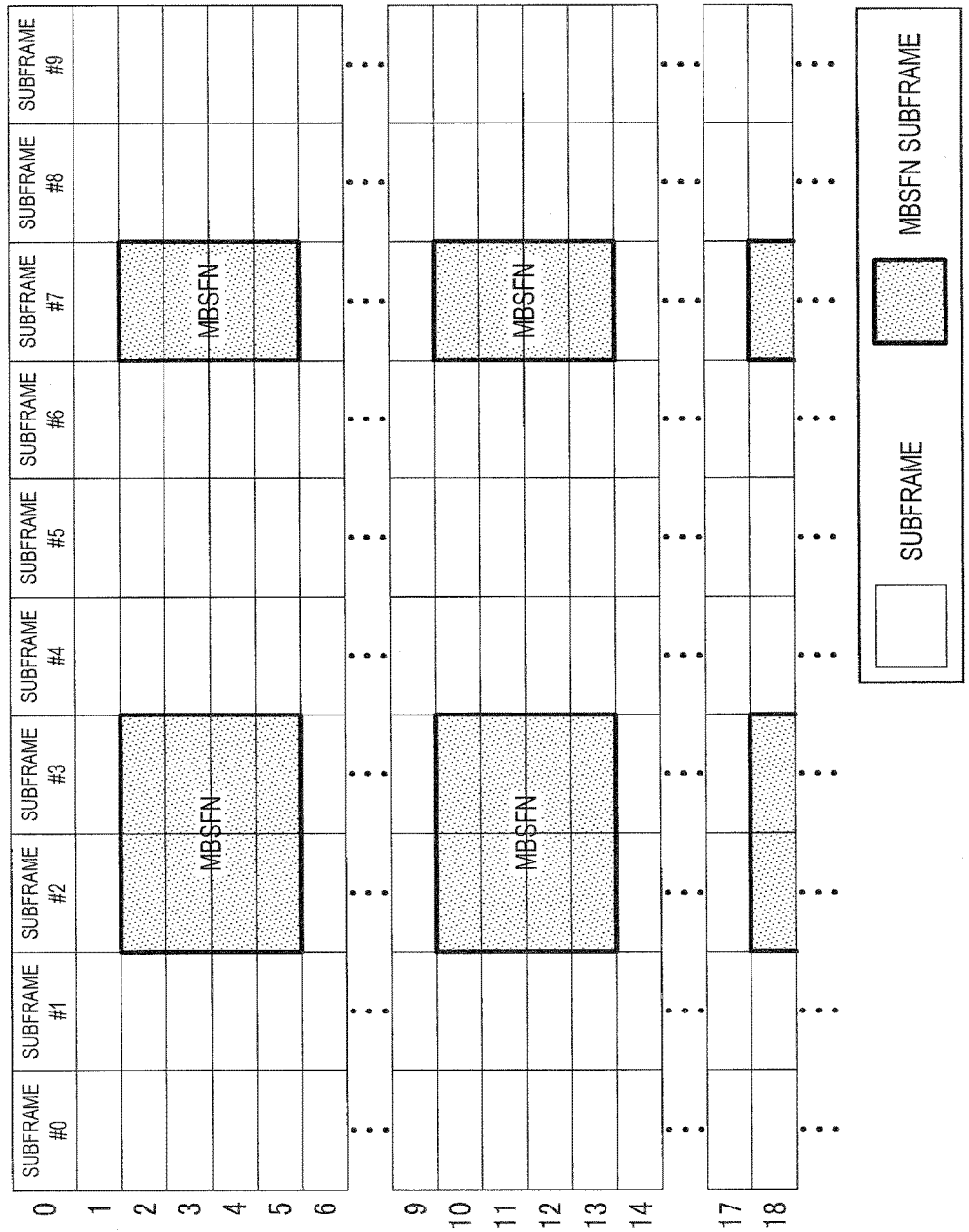
FIG. 3 is an explanatory diagram illustrating examples of MBSFN subframes.

FIG. 3 is an explanatory diagram illustrating examples of the MBSFN subframes. Referring to FIG. 3, subframes included in a radio frame of each system frame number (SFN) are illustrated. In this example, the radio frame allocation period is 8 and the radio frame allocation offset is 2. The subframe allocation is a 4 frame pattern (24 bits). Therefore, a radio frame of the SFN satisfying "SFN mod 8=2" (that is, the SFN of 2, 10, 18, or the like) and 3 radio frames continuously subsequent to the radio frame are radio frames for the MBSFN. In this example, frequency division duplexing (FDD) is adopted and the subframe allocation is "011010 011010 011010 011010." When the FDD is adopted, bits of the subframe allocation indicate subframes #1, #2, #3, #6, #7, and #8. Therefore, of the radio frames, subframes #2, #3, and #7 are MBSFN subframes.

Subframes with which system information and paging information are transmitted are not used as the MBSFN subframes. Thus, when the FDD is adopted, subframes #0, #4, #5, and #9 are not used as the MBSFN subframes. When time division duplexing (TDD) is adopted, subframes #0, #1, #2, #5, and #6 are not used as the MBSFN subframes.

For example, a terminal apparatus is notified of the MBSFN subframes with system information block (SIB) 2. Accordingly, the terminal apparatus can know an MBSFN area. The terminal apparatus is notified of the MBSFN subframes of each MBSFN area also with control information mapped to the MCCH (MBSFN area configuration message), as will be described below.

(Resources and Signals of MBSFN Subframes)

Number of OFDM Symbols

In the MBSFN, the plurality of base stations transmit the same data with the same radio resources. Therefore, in order to permit a long delay spread, an extended CP of 16.7 us or 33.3 us is used in MBSFN regions of the MBSFN subframes. When the extended CP of 16.7 us is used, 6 OFDM symbols are included in one slot. That is, 12 OFDM symbols are included in one subframe. On the other hand when the extended CP of 33.3 us is used, 3 OFDM symbols are included in one slot. That is, 6 OFDM symbols are included in one subframe.

Reference Signal (RS)

The base stations of the cells belonging to an MBSFN area transmit the same signal particularly in the MBSFN regions of the MBSFN subframes. Therefore, such a base station does not transmit a cell-specific reference signal (CRS) in the MBSFN region. Instead, such a base station transmits an MBSFN reference signal (MBSFN-RS) which is a reference signal for the MBSFN. The MBSFN-RS is transmitted with the same radio resources (that is, the same resource elements) in all the cells belonging to an MBSFN area.

Specific Example

Figure 4:
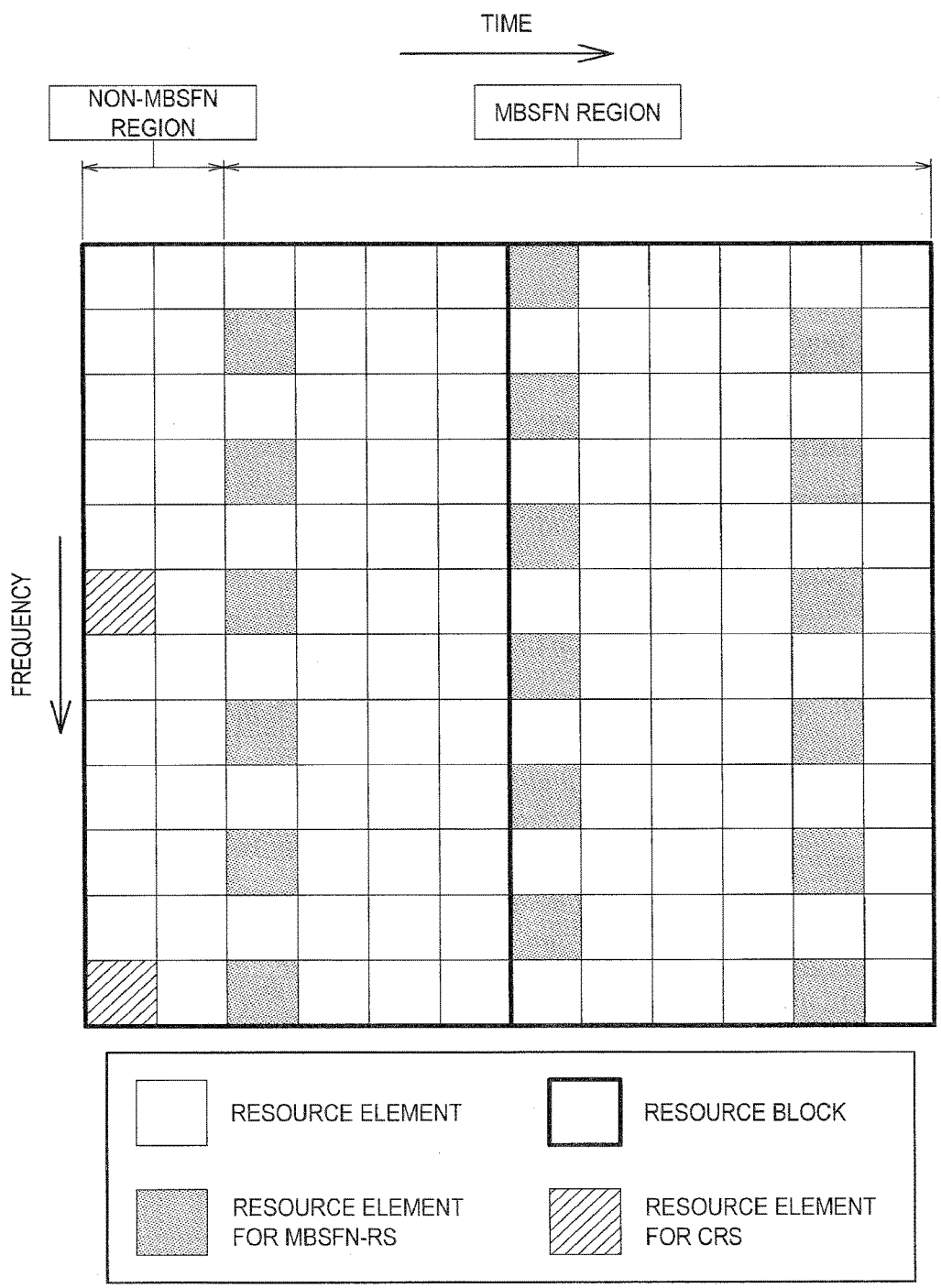
FIG. 4 is an explanatory diagram illustrating a first example of resources and signals of the MBSFN subframes.

FIG. 4 is an explanatory diagram illustrating first examples of resources and signals of the MBSFN subframes. Referring to FIG. 4, two resource blocks (RB) arranged in a time direction in the MBSFN subframes are illustrated. In this example, the extended CP of 16.7 us is used, and the MBSFN subframes include 12 OFDM symbols in the time direction. The MBSFN subframe includes a non-MBSFN region extending over the first two OFDM symbols among the 12 OFDM symbols and an MBSFN region continuing after the non-MBSFN region. In the non-MBSFN region, the CRS can be transmitted. On the other hand, in the MBSFN region, a common MBSFN-RS between cells belonging to the MBSFN area is transmitted. In the MBSFN region, the control information mapped to the MCCH and/or the data mapped to the MTCH are transmitted.

Figure 5:
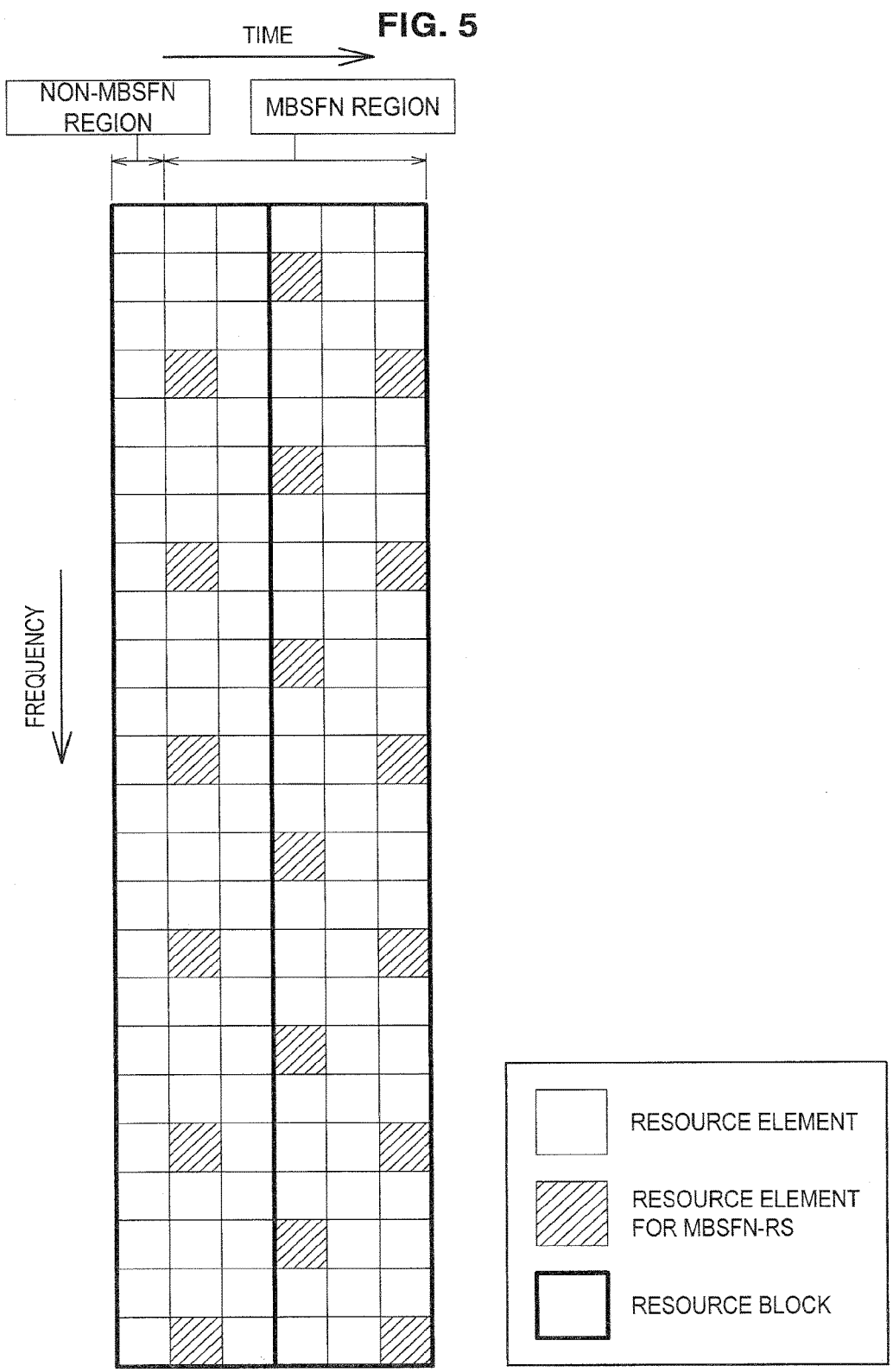
FIG. 5 is an explanatory diagram illustrating a second example of resources and signals of the MBSFN subframes.

FIG. 5 is an explanatory diagram illustrating second examples of resources and signals of the MBSFN subframes. Referring to FIG. 5, two resource blocks (RB) arranged in a time direction in the MBSFN subframes are illustrated. In this example, the extended CP of 33.3 us is used, and the MBSFN subframes include 6 OFDM symbols in the time direction. The MBSFN subframe includes a non-MBSFN region extending over the first one OFDM symbol among the 6 OFDM symbols and an MBSFN region continuing after the non-MBSFN region. In the non-MBSFN region, the CRS can be transmitted (not illustrated). On the other hand, in the MBSFN region, a common MBSFN-RS between cells belonging to the MBSFN area is transmitted. In the MBSFN region, the control information mapped to the MCCH and/or the data mapped to the MTCH are transmitted.

(Resources and Signals of Normal Subframes)

Number of OFDM Symbols

In the normal subframes which are not the MBSFN subframes, a normal CP or the extended CP of 16.7 us is used. The length of the normal CP is 5.1 us in the first OFDM symbol in the slot and is 4.7 us in the other OFDM symbols. When the normal CP is used, 7 OFDM symbols are included in one slot. That is, 14 OFDM symbols are included in one subframe. On the other hand, when the extended CP of 16.7 us is used, 6 OFDM symbols are included in one slot. That is, 12 OFDM symbols are included in one subframe.

Reference Signal (RS)

The base station transmits the CRS in the normal subframes. The CRS is used, for example, to select a cell, estimate a channel, and detect synchronization of downlink data.

Specific Example

FIG. 6 is an explanatory diagram illustrating a first example of resources and signals of the normal subframes. Referring to FIG. 6, two resource blocks (RBs) arranged in the time direction in the normal subframes are illustrated. In this example, the normal CP is used and the subframes include 14 OFDM symbols in the time direction. The CRS is transmitted with a predetermined resource element (RE) in each RB. The predetermined RE is set for each cell.

Figure 7:
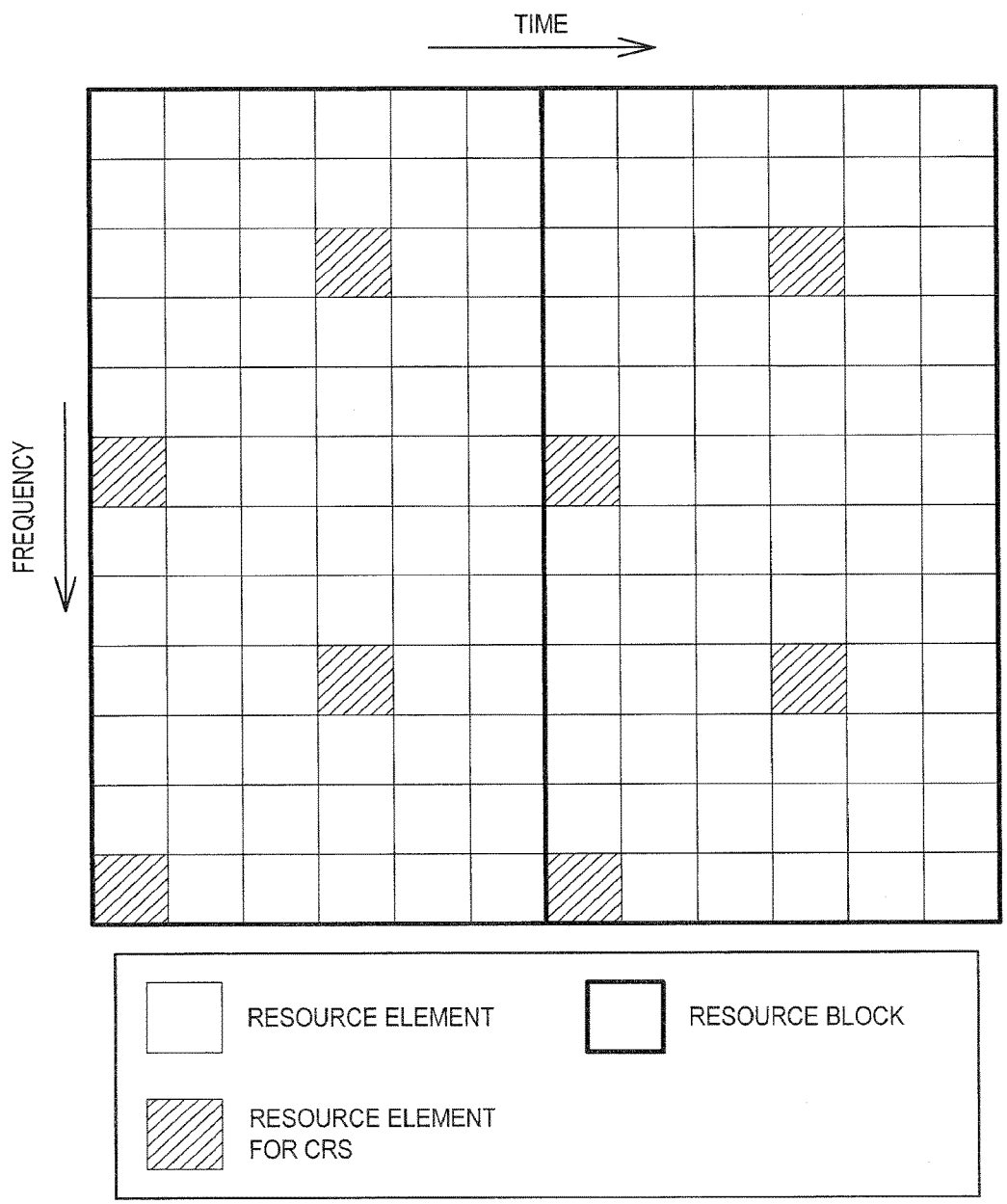
FIG. 7 is an explanatory diagram illustrating a second example of resources and signals of the normal subframes.

FIG. 7 is an explanatory diagram illustrating a second example of resources and signals of the normal subframes. Referring to FIG. 7, two resource blocks (RB) arranged in the time direction in the normal subframes are illustrated. In this example, the extended CP of 16.7 us is used and the subframes include 12 OFDM symbols in the time direction. Even in this case, the CRS is transmitted with a predetermined resource element (RE) in each RB. The predetermined RE is set for each cell.

(Cyclic Prefix (CP))

The OFDM symbol includes a cyclic prefix (CP) and a main body. The CP is generated by copying a part of a waveform of the main body. Hereinafter, a specific example of this point will be described with reference to FIG. 8.

Figure 8:
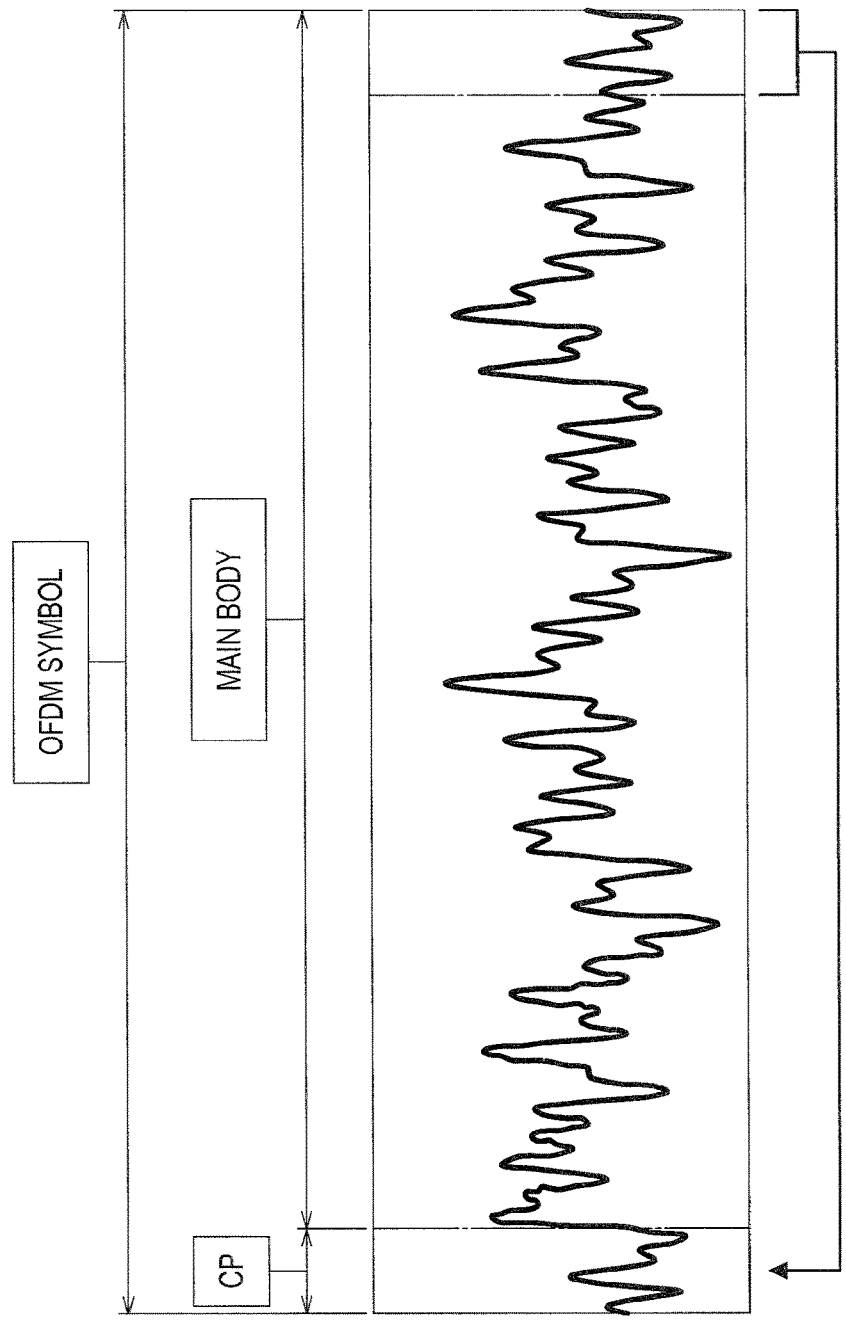
FIG. 8 is an explanatory diagram illustrating an example of a cyclic prefix (CP).

FIG. 8 is an explanatory diagram illustrating an example of the cyclic prefix (CP). Referring to FIG. 8, the waveform of the OFDM symbol is illustrated. The OFDM symbol includes the CP and the main body. The CP is generated by copying a final portion of the main body and is prefixed before the main body.

When a delay spread by a multipath falls in the length of the CP, a signal is fully expressed in a fast Fourier transform (FFT) processing window and is accurately combined by FFT processing. Conversely, when a delay spread by a multipath does not fall in the length of the CP, a signal is not fully expressed in the FFT processing window and intersymbol interference may occur. As a result, reception performance may deteriorate. Hereinafter, a specific example of this point will be described with reference to FIG. 9.

Figure 9:
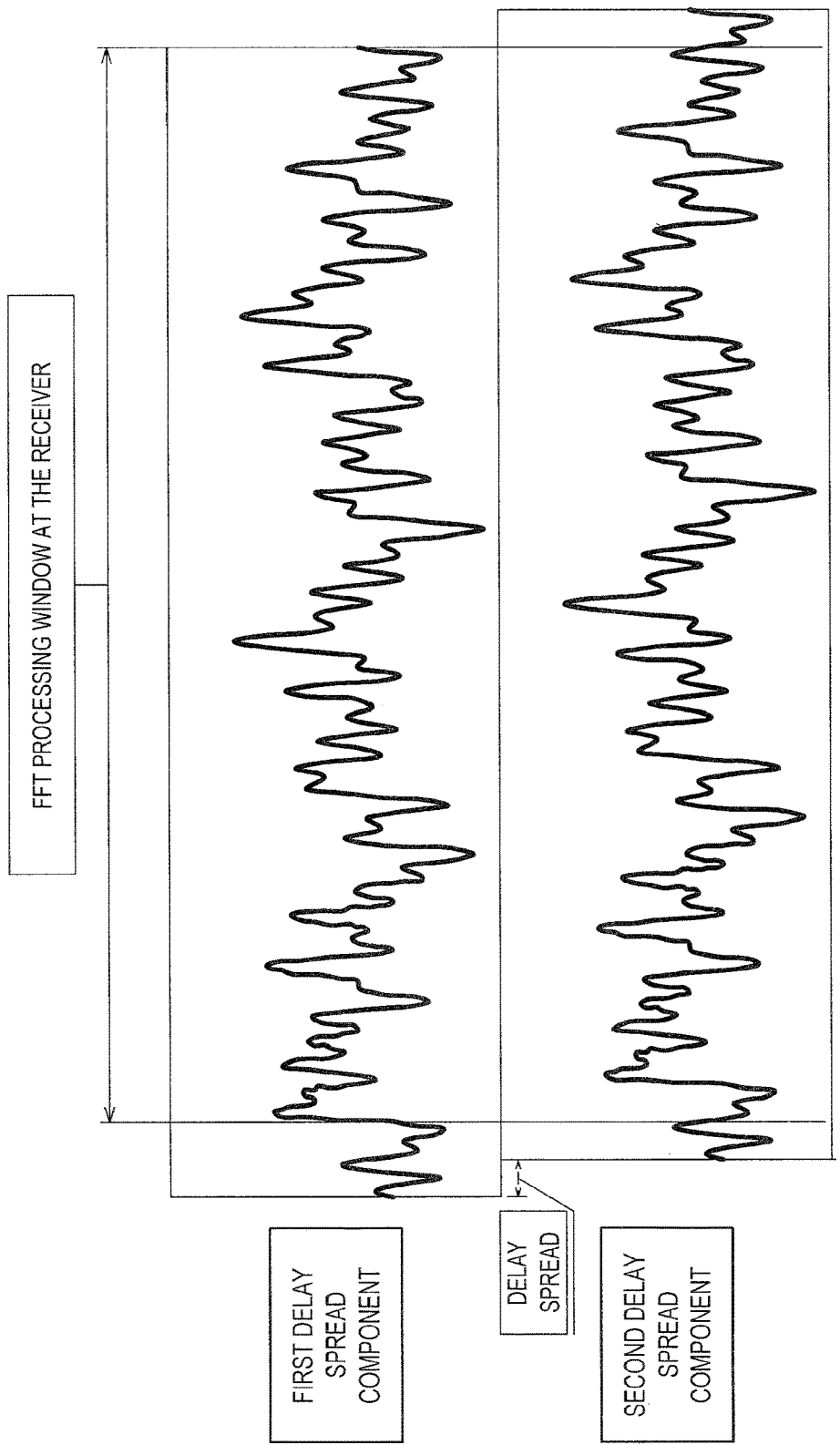
FIG. 9 is an explanatory diagram illustrating examples of a cyclic prefix (CP) and an FFT processing window.

FIG. 9 is an explanatory diagram illustrating examples of the cyclic prefix (CP) and the FFT processing window. Referring to FIG. 9, a first delay spread component and a second delay spread component are illustrated. The second delay spread component is received later than the first delay spread component by a receiver. A difference in a reception timing between the first delay spread component and the second delay spread component is a delay spread. When the delay spread is shorter than the length of the CP, a signal is fully expressed in the FFT processing window and is accurately combined.

The terminal apparatus can also determine the length of the CP which is being used. As one example, the terminal apparatus can determine the length of the CP in which a synchronization signal, a reference signal, master report information, or the like is subjected to optimum demodulation among a plurality of lengths of the CPs as the length of the CP which is being used. As another example, the terminal apparatus can determine the length of the CP which is being used through waveform analysis of the synchronization signal or the reference signal. As yet another example, the terminal apparatus can determine the number of symbols in the subframes and determine the length of the CP from the number of symbols. As still another example, the terminal apparatus can determine the length of the CP from disposition of the reference signals in the subframes.

(MCCH, MTCH, and PMCH)

Relation Between MBSFN Area and MCCH

One MCCH corresponds to one MBSFN area. That is, the MCCH is present in each MBSFN area to which the cell belongs.

SIB 13

An SIB 13 indicates a subframe or the like in which the MCCH is disposed and the terminal apparatus is notified of the SIB 13. More specifically, the SIB 13 includes an MCCH repetition period, an MCCH offset, and subframe allocation information. Hereinafter, specific examples of the subframes in which the MCCH is disposed will be described with reference to FIG. 10.

Figure 10:
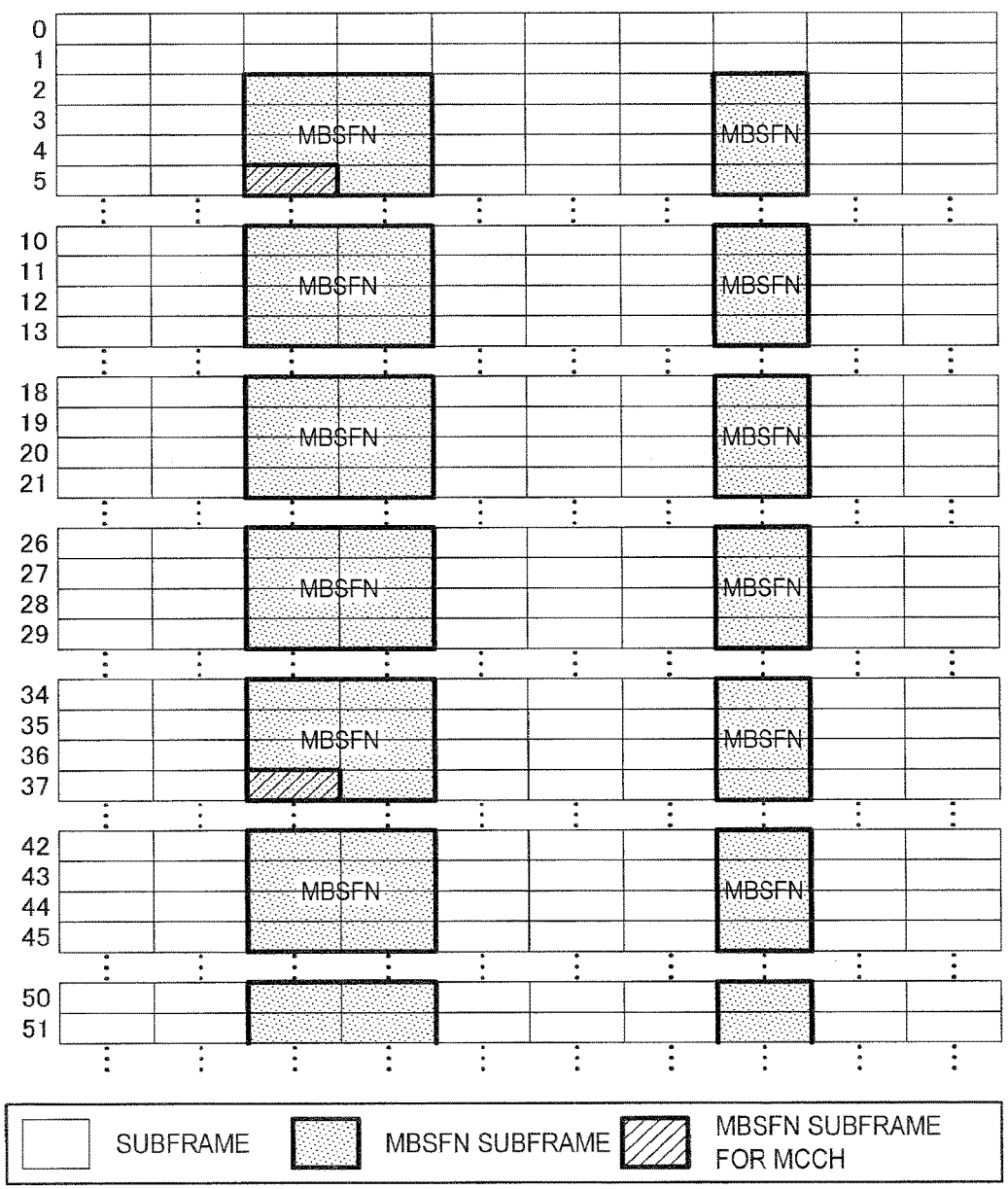
FIG. 10 is an explanatory diagram illustrating examples of subframes in which an MCCH is disposed.

FIG. 10 is an explanatory diagram illustrating examples of the subframes in which an MCCH is disposed. Referring to FIG. 10, the subframes included in a radio frame of each system frame number (SFN) are illustrated. The MBSFN subframes of this example are the same as the MBSFN subframes illustrated in FIG. 3. In this example, the MCCH repetition period is 32 and the MCCH offset is 5. Therefore, a radio frame of the SFN satisfying "SFN mod 32=5" (that is, the SFN of 5, 37, or the like) is a radio frame in which the MCCH is disposed. In this example, the subframe allocation information is "010000." When the FDD is adopted, bits of the subframe allocation indicate subframes #1, #2, #3, #6, #7, and #8. Therefore, of the radio frames, subframe #2 is a subframe in which the MCCH is disposed. In this way, the MCCH is periodically disposed in the MBSFN subframe.

The MCCH and the MTCH are multiplexed in a media access control (MAC) layer, but the terminal apparatus can demodulate the MCCH and the MTCH by multiplexing information of an MAC header.

MBSFN Area Configuration Message

The MBSFN area configuration message is mapped to the MCCH.

Common Subframe Allocation (CSA)

First, the MBSFN area configuration message includes a common subframe allocation (CSA) pattern list and a CSA period. The information indicates the MBSFN subframes of the MBSFN area. The CSA pattern list includes a radio frame allocation period, a radio frame allocation offset, and a subframe allocation. Hereinafter, specific examples of the MBSFN subframes indicated by the information will be described with reference to FIG. 11.

Figure 11:
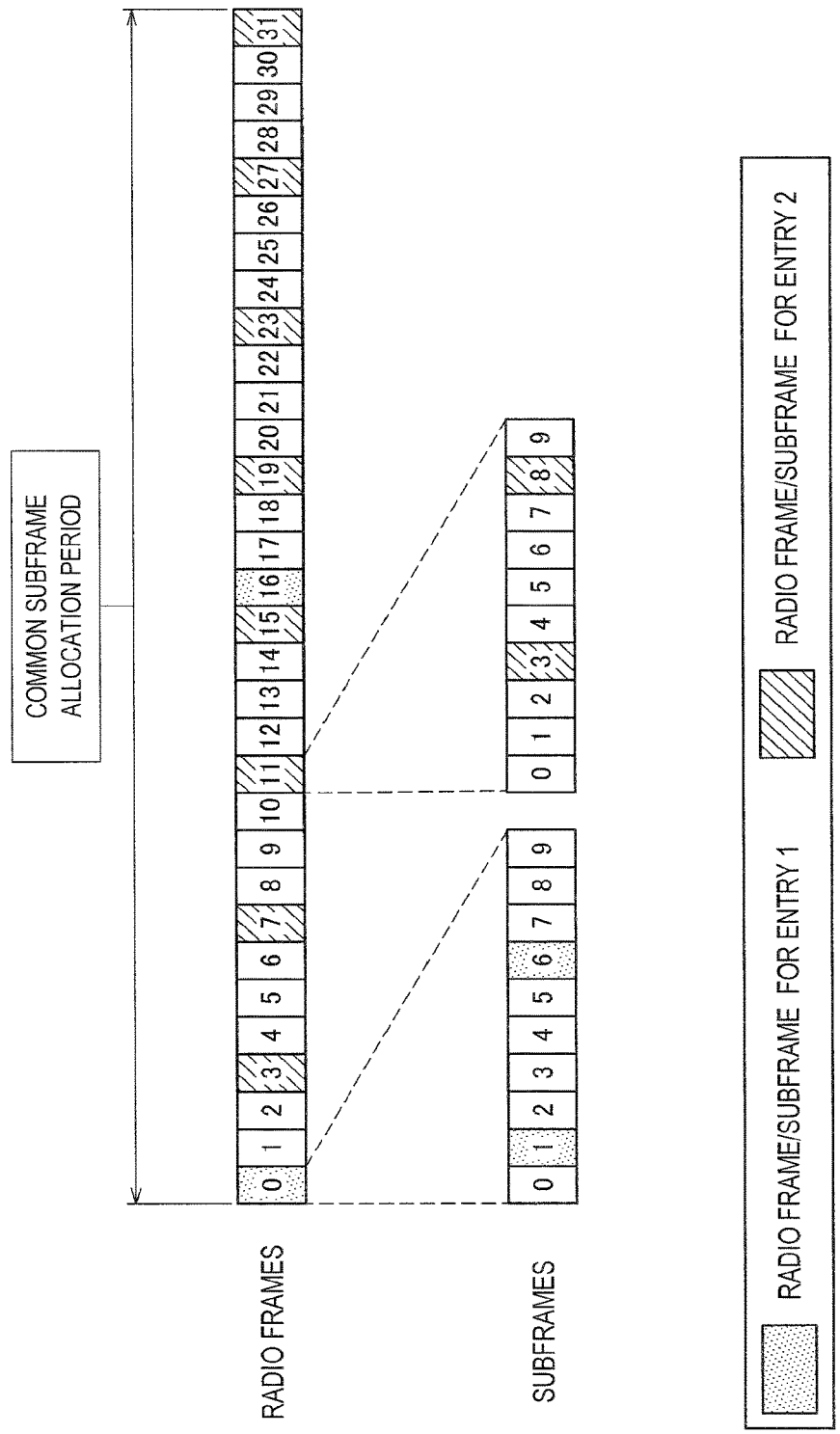
FIG. 11 is an explanatory diagram illustrating examples of MBSFN subframes.

FIG. 11 is an explanatory diagram illustrating examples of the MBSFN subframes. Referring to FIG. 11, radio frames extending over the CSA period are illustrated. In this example, the CSA period is 32 radio frames. In this example, the CSA pattern list includes entries 1 and 2. In the entry 1, the radio frame allocation period is 16, the radio frame allocation offset is 0, and the subframe allocation is "100100" of 1 frame pattern (6 bits). Thus, the MBSFN subframes of the entry 1 are subframes #1 and #6 in 2 radio frames in which the SFN is 0 and 16. In the entry 2, the radio frame allocation period is 4, the radio frame allocation offset is 3, and the subframe allocation is "001001" of 1 frame pattern (6 bits). Thus, the MBSFN subframes of the entry 2 are subframes #3 and #8 in 8 radio frames in which the SFN is 3, 7, 11, 15, 19, 23, 27, and 31. Thus, in this example, a total of 20 subframes in the CSA period are illustrated as the MBSFN subframes.

PMCH Information

Further, the MBSFN area configuration message includes a PMCH information list. The PMCH information list indicates the MBSFN subframes in which each PMCH is disposed and one or more MTCHs mapped to each PMCH. In the first subframe in the PMCH, MCH scheduling information (MSI) which is scheduling information of the MTCH mapped to the PMCH is transmitted. The PMCH information list also indicates a transmission period of the MSI. The period is referred to as an MCH scheduling period (MSP). Hereinafter, examples of the PMCH and the MTCH mapped to the PMCH will be described with reference to FIG. 12.

Figure 12:
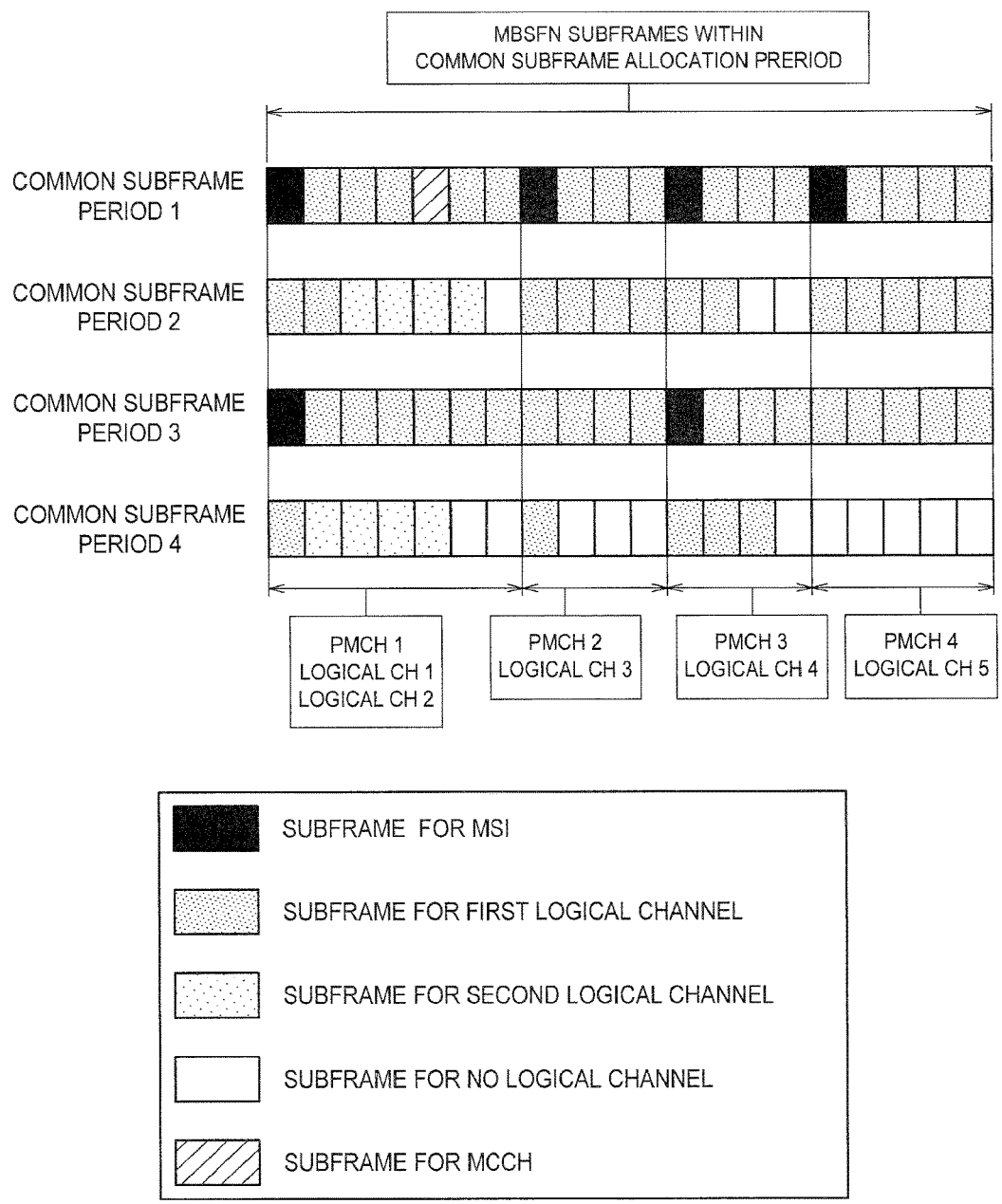
FIG. 12 is an explanatory diagram illustrating examples of a PMCH and an MTCH mapped to the PMCH.

FIG. 12 is an explanatory diagram illustrating examples of the PMCH and an MTCH mapped to the PMCH. Referring to FIG. 12, four sets of 20 MBSFN subframes described with reference to FIG. 11 are illustrated. That is, 80 MBSFN subframes over four CSA periods (that is, CSA periods 1 to 4) are illustrated. In this example, of the 20 MBSFN subframes in the CSA periods (32 radio frames), the first to seventh subframes are allocated to a PMCH 1. The eighth to eleventh subframes are allocated to a PMCH 2, the twelfth to fifteenth subframes are allocated to a PMCH 3, and the sixteenth to twentieth subframes are allocated to a PMCH 4. Logical channels 1 and 2 (that is, MTCHs 1 and 2) are mapped to the PMCH 1. A logical channel 3 (that is, an MTCH 3) is mapped to the PMCH 2, a logical channel 4 (that is, an MTCH 4) is mapped to the PMCH 3, and a logical channel 5 (that is, an MTCH 5) is mapped to the PMCH 4. When attention is paid to the PMCH 1, the MSP of the PMCH 1 is 64 radio frames and the MSI is transmitted with the PMCH 1 every two CSA periods. During the CSA periods 1 and 2, the logical channel 1 (that is, the MTCH 1) is disposed in the first to ninth subframes among the MBSFN subframes allocated to the PMCH 1. The logical channel 2 (that is, the MTCH 2) is disposed in the tenth to the thirteenth subframes. No logical channel (MTCH) is disposed in the fourteenth subframe. During the CSA periods 3 and 4, the logical channel 1 is disposed in the first to eighth subframes among the MBSFN subframes allocated to the PMCH 1. The logical channel 2 is disposed in the ninth to the twelfth subframes. No logical channel (MTCH) is disposed in the thirteenth and fourteenth subframe. As illustrated in FIG. 12, the MCCH is also disposed in the MBSFN subframe.

(Notification of Change in MCCH)

When information regarding the MCCH is changed, all of the terminal apparatuses are notified of the change in the information regarding the MCCH with downlink control information (DCI) to be transmitted over a physical downlink control channel (PDCCH) in the non-MBSFN region of the MBSFN subframe. Specifically, the DCI includes an MCCH change notification indicator. The MCCH change notification indicator is an 8-bit bitmap corresponding to each MBSFN area. In this notification, radio network temporary identity (MBMS RNTI), that is, M-RNTI, is used.

First, the change in the MCCH is notified of for an MCCH modification period and the changed information is notified of for a subsequent MCCH modification period. Hereinafter, a specific example of this point will be described with reference to FIG. 13.

Figure 13:
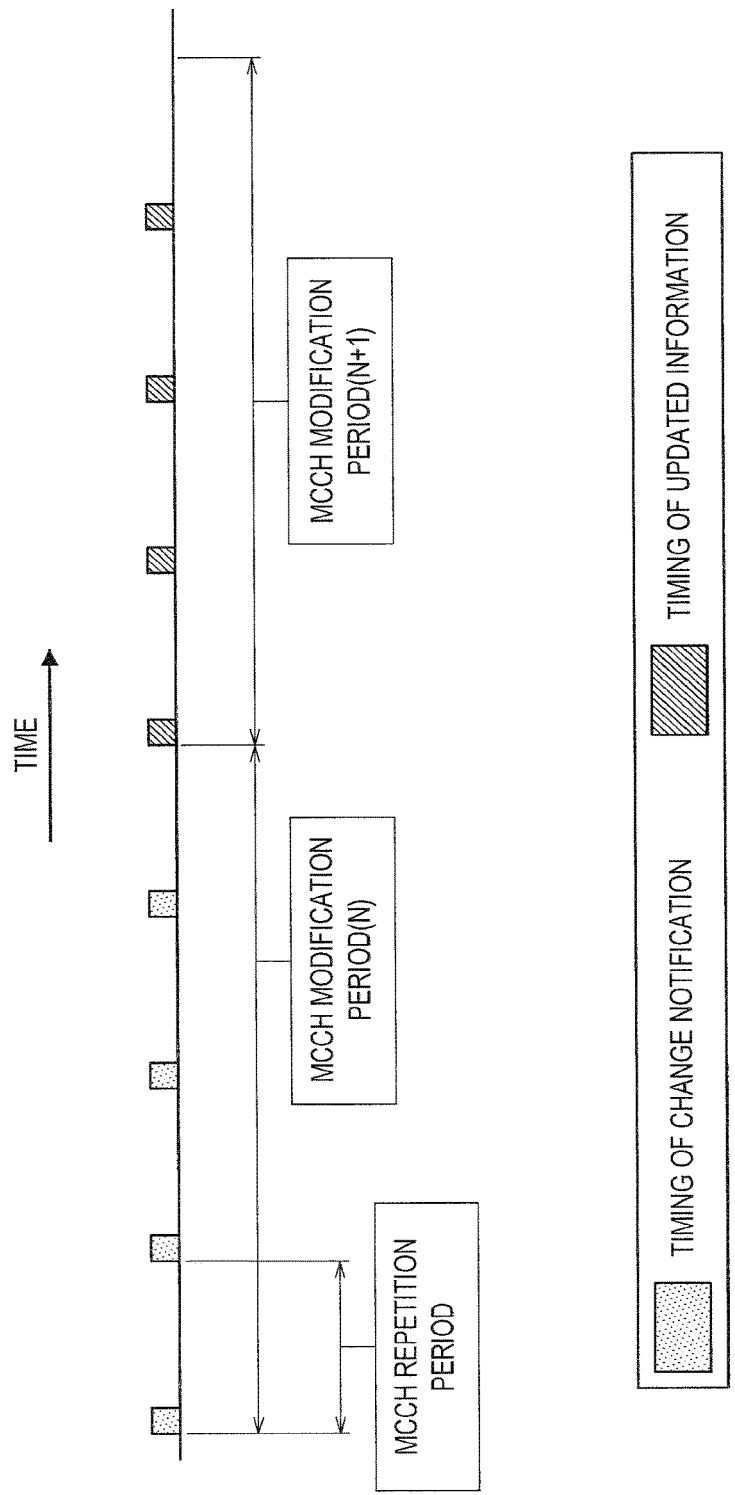
FIG. 13 is an explanatory diagram illustrating an example of a timing of notification of a change in information regarding the MCCH.

FIG. 13 is an explanatory diagram illustrating an example of a timing of notification of a change in information regarding the MCCH. Referring to FIG. 13, a first MCCH modification period (n) and a first MCCH modification period (n+1) continuing from the first MCCH modification period (n) are illustrated. In this way, the change in the information regarding the MCCH is notified of for the first MCCH modification period (n), and subsequently the changed information is notified of for the second MCCH modification period (n+1). To ensure mobility of the terminal apparatus, the changed information is transmitted not only in the first MCCH but also in subsequent MCCHs. The information regarding the MCCH is changed over a relatively long time.

(System Configuration of MBSFN)

Figure 14:
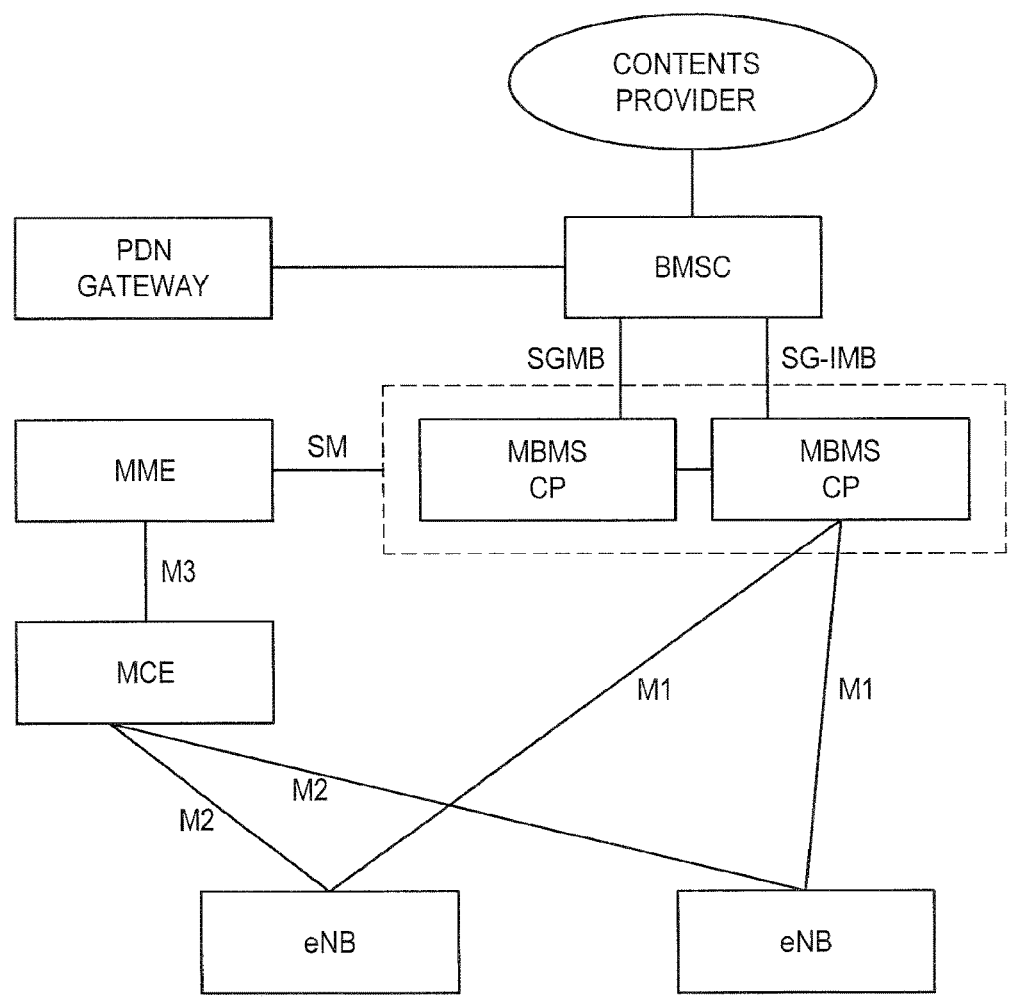
FIG. 14 is an explanatory diagram illustrating an example of the configuration of an LTE network supporting the MBSFN.

An example of the configuration of an LTE network supporting the MBSFN will be described with reference to FIG. 14. FIG. 14 is an explanatory diagram illustrating an example of the configuration of an LTE network supporting the MBSFN. Referring to FIG. 14, the LTE network includes a multi-cell/multicast coordinate entity (MCE), a broadcast/multicast service center (BM-SC), an MBMS gateway (GW), and a mobility management entity (MME). Such nodes are logical nodes. The MCE causes an evolved Node B (eNB) of a cell belonging to the MBSNF area to transmit the same data with the same radio resources. Specifically, for example, the MCE performs scheduling related to the MBSNF in the MBSNF area. The BM-SC performs data flow control in a core network, authentication, charging, and the like of a contents provider. The MBMS-GW performs transmission of multicast IP packets from the BM-SC to the eNB and a process on a session control signal via the MME. The MME performs a process on a non-access stratum (NAS).

The example in which one MCE corresponds to a plurality of eNBs has been described, but the MCE is not limited to the related example. For example, each eNB may include the MCE.

(Counting Procedure)

In the MBSFN, information regarding interest in an MBMS service is collected through an MBMS counting procedure. Hereinafter, the MBMS counting procedure will be described with reference to FIG. 15.

Figure 15:
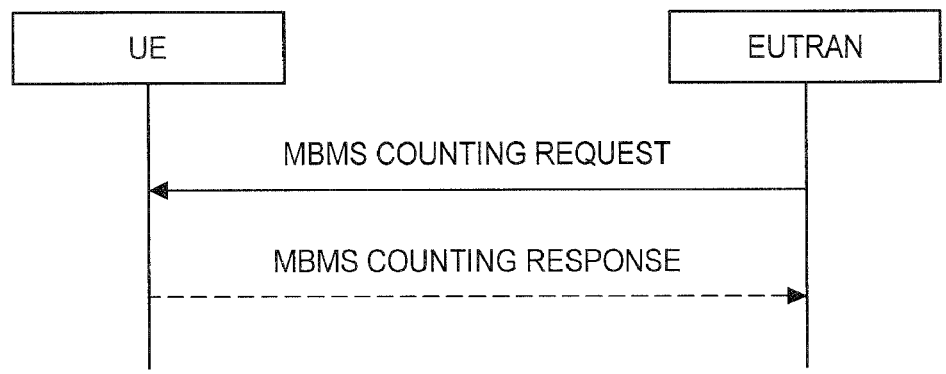
FIG. 15 is an explanatory diagram illustrating an example of an MBMS counting procedure.

FIG. 15 is an explanatory diagram illustrating an example of an MBMS counting procedure. Referring to FIG. 15, first, when the information regarding the MCCH is changed and the terminal apparatus enters the MBSFN area, the terminal apparatus receives an MBMS counting request message along with the MBSFN area configuration message. When the terminal apparatus is in an RRC connection mode and an MBMS service in which the terminal apparatus is interested is included in a list of an MBMS counting request, the terminal apparatus transmits an MBMS counting response message including an identifier of the MBMS service to a network. Accordingly, for each MBMS service, the number of terminal apparatuses which receive the MBMS service or are interested in the MBMS service can be counted. Therefore, starting and ending of the MBMS service can be controlled according to a counting result.

(Operation of Terminal)

The terminal apparatus receives the SIB 13 and specifies subframes in which the MCCH is disposed. Then, the terminal apparatus receives the MBSFN area configuration message as the information regarding the MCCH with the subframes and specifies the PMCH to which the MTCH of a desired MBMS session is mapped. Thereafter, the terminal apparatus receives the MSI of the PMCH to which the MTCH is mapped and specifies the subframes in which the MTCH is disposed. Then, the terminal apparatus receives data of the MTCH (that is, data of the desired MBMS session) with the subframes. According to such an operation, the terminal apparatus can receive the data with only necessary minimum subframes and can sleep with other subframes. Therefore, power consumption of the terminal apparatus is suppressed.

2. Schematic Configuration of Communication System

Figure 16:
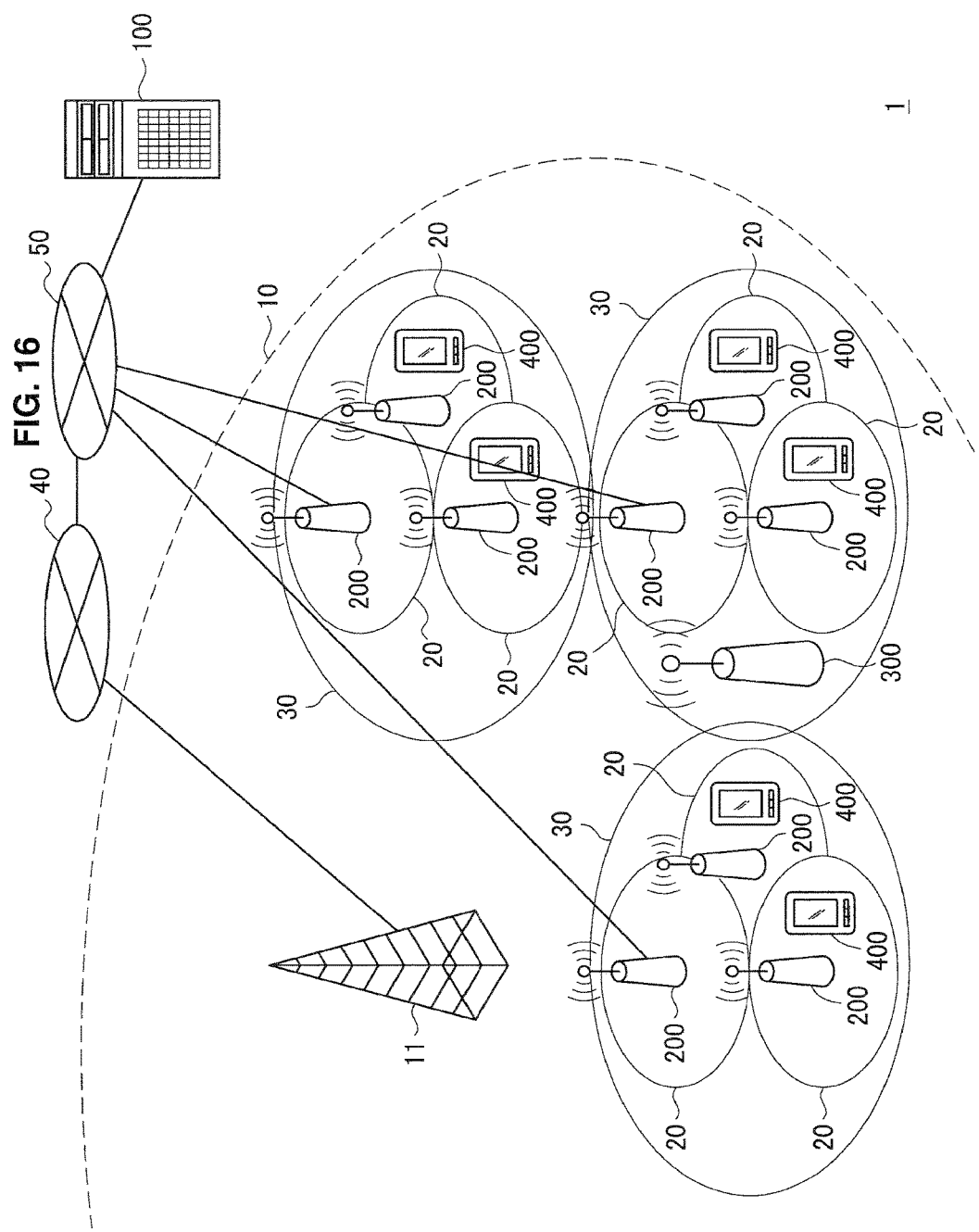
FIG. 16 is an explanatory diagram illustrating an example of a schematic configuration of a communication system according to an embodiment of the present disclosure.

Next, a schematic configuration of a communication system 1 according to an embodiment of the present disclosure will be described with reference to FIG. 16. FIG. 16 is an explanatory diagram illustrating an example of a schematic configuration of the communication system 1 according to the present disclosure. Referring to FIG. 13, the communication system 1 includes a macro base station 11, a control apparatus 100, small base stations 200, small base stations 300, and terminal apparatuses 400. The communication system 1 is, for example, a system that conforms to LTE, LTE-Advanced, or a communication standard equivalent thereto.

The macro base station 11 performs radio communication with a terminal apparatus located in a macro cell 10. The macro base station 11 is connected to a core network 40.

The small base station 200 performs radio communication with a terminal apparatus located in a small cell 20. For example, the small cell 20 partially or entirely overlaps the macro cell 10. The plurality of small cells 20 belong to an identical MBSNF area 30. In the MBSNF area 30, the plurality of small base stations 200 transmits the same signal with the same radio resources in the MBSNF subframes. For example, the small cells 20 are femtocells and the small base stations 200 are connected to the Internet 50.

The small base station 300 is a base station which is newly installed. For example, a small cell (not illustrated) of the small base station 300 does not belong to any MBSFN area at this time point.

The control apparatus 100 operates as an MCE in the plurality of small base stations 200. For example, the control apparatus 100 also operates as an MBMS-GW. For example, the control apparatus 100 is connected to the Internet 50 and communicates with the small base stations 200 via the Internet 50. The control apparatus 100 can communicate with a core network node (for example, an MME) located in the core network 40 and/or the macro base station 11 via the Internet 50.

The terminal apparatus 400 performs radio communication with the base station. For example, when the terminal apparatus 400 is located in the macro cell 10, the terminal apparatus 300 performs radio communication with the macro base station 11. When the terminal apparatus 300 is located in the small cell 20, the terminal apparatus 300 performs radio communication with the small base station 200. The terminal apparatus 400 performs radio communication with the small base station 300 when the terminal apparatus 400 is located in the small cell (not illustrated) of the small base station 300.

The schematic configuration of the communication system 1 according to the first embodiment of the present disclosure has been described. According to the embodiment of the present disclosure, for example, the control apparatus 100 acquires a result of measurement of a reference signal transmitted by one of a target base station (for example, the small base station 300) and one or more other base stations (for example, one or more small base stations 200) which is supplied by the other of the target base station and the one or more other base stations. Then, the control apparatus 100 decides the MBSFN area to which the cell of the target base station (for example, the small cell of the small base station 300) belongs based on the result of the measurement.

Hereinafter, the target base station is assumed to be the small base station 300 and the one or more other base stations are assumed to be one or more small base stations 200 in the description. The cell of the target base station is assumed to be a small cell and the MBSFN area is assumed to be formed by a small cell in the description. First to fourth embodiments will be described below.

TABLE 1

| Embodiments | Reference signal transmission entity | Measurement result supply entity | Measurement entity |
|---|---|---|---|
| First embodiment | One or more small base stations 200 | Small base station 300 | Small base station 300 |

TABLE 1-continued

| Embodiments | Reference signal transmission entity | Measurement result supply entity | Measurement entity |
|---|---|---|---|
| Second embodiment | One or more small base stations 200 | Small base station 300 | Terminal apparatus 400 connected to small base station 300 |
| Third embodiment | Small base station 300 | One or more small base stations 200 | One or more small base stations 200 |
| Fourth embodiment | Small base station 300 | One or more small base stations 200 | Terminal apparatus 400 connected to one or more base stations 200 |

3. First Embodiment

Next, a first embodiment of the present disclosure will be described with reference to FIGS. 17 to 21. According to the first embodiment, a control apparatus 100-1 acquires a result of measurement of a reference signal transmitted by one or more small base stations 200-1 which is supplied by a small base station 300-1. The control apparatus 100-1 decides an MBSFN area to which the cell of the small base station 300-1 belongs based on the result of the measurement. According to the first embodiment, the result of the measurement is a result of measurement by the small base station 300-1.

<3.1. Configuration of Control Apparatus>

Figure 17:
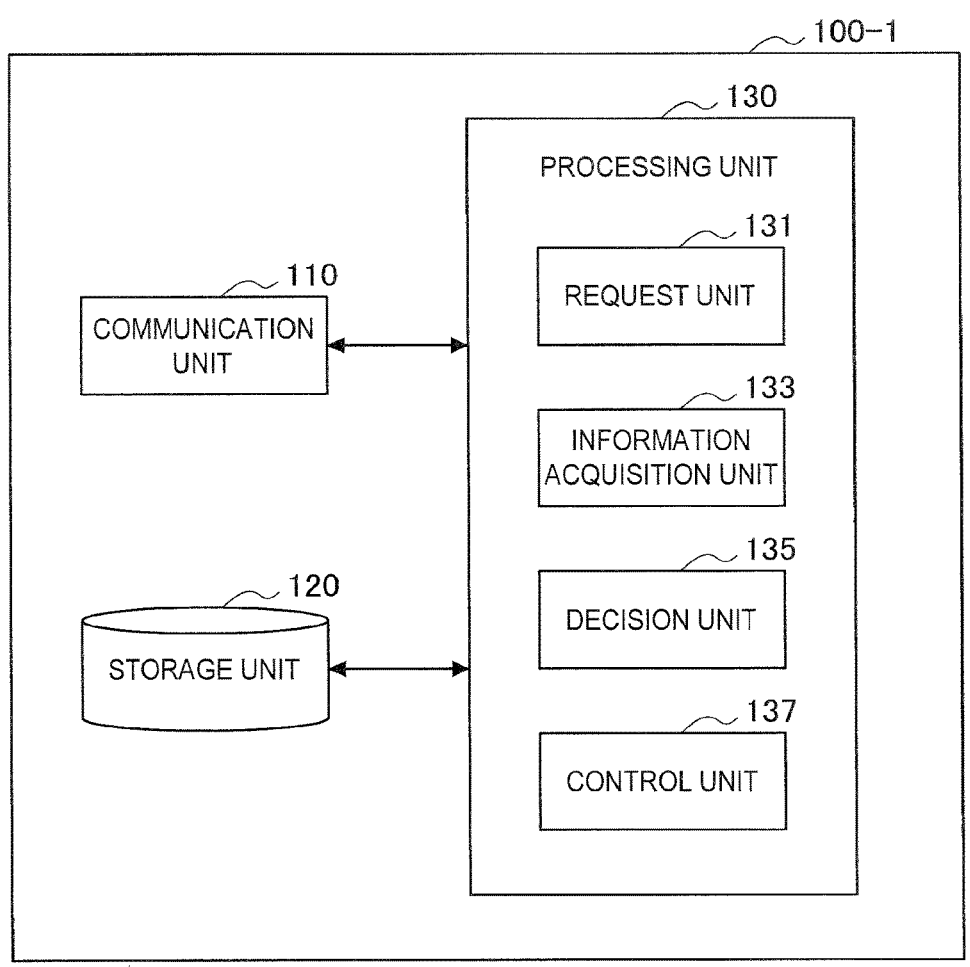
FIG. 17 is a block diagram illustrating an example of the configuration of a control apparatus according to a first embodiment.

First, the configuration of a control apparatus 100-1 according to the first embodiment will be described with reference to FIGS. 17 to 19. FIG. 17 is a block diagram illustrating an example of the configuration of the control apparatus 100-1 according to the first embodiment. Referring to FIG. 17, the control apparatus 100-1 includes a communication unit 110, a storage unit 120, and a processing unit 130.

(Communication Unit 110)

The communication unit 110 communicates with another apparatus. For example, the communication unit 110 communicates with a small base station 200-1 and a small base station 300-1. More specifically, for example, the communication unit 110 communicates with the small base station 200-1 and the small base station 300-1 via the Internet 50. The communication unit 110 can communicates with a core network node (for example, an MIME) located in the core network and/or the macro base station 11 via the Internet 50.

(Storage Unit 120)

The storage unit 120 temporarily or permanently stores a program and data for an operation of the control apparatus 100-1.

(Processing Unit 130)

The processing unit 130 supplies various functions of the control apparatus 100-1. The processing unit 130 includes a request unit 131, an information acquisition unit 133, a decision unit 135, and a control unit 137.

(Request Unit 131)

The request unit 131 requests the small base station 300-1 to supply a result of the measurement of the reference signal transmitted by another base station.

For example, the small base station 300-1 requests the control apparatus 100-1 to set the MBSFN. Then, the request unit 131 requests the small base station 300-1 to supply the result of the measurement of the reference signal transmitted by another base station.

When the request unit 131 requests the small base station 300-1 to supply the result of the measurement of the MBSFN-RS, the request unit 131 may supply information indicating the MBSFN subframes of each MBSFN area to the small base station 300-1.

(Information Acquisition Unit 133)

The information acquisition unit 133 acquires the result of measurement of the reference signal transmitted by one or more small base stations 200-1 which is supplied by the small base station 300-1.

For example, as described above, the request unit 131 requests the small base station 300-1 to supply the result of the measurement of the reference signal transmitted by another base station. Then, the small base station 300-1 supplies the control apparatus 100-1 with the result of the measurement of the reference signal transmitted by one or more small base stations 200-1. The result of the measurement is stored in the storage unit 120. The information acquisition unit 133 acquires the result of the measurement from the storage unit 120.

Measurement Entity

In the first embodiment, the result of the measurement is a result of measurement by the small base station 300-1. That is, the small base station 300-1 measures the reference signal transmitted by one or more small base stations 200-1 and supplies the result of the measurement to the control apparatus 100-1. Accordingly, for example, the result of the measurement can be obtained without imposing a burden on a terminal apparatus 400-1.

Result of Measurement

First Example: Result of Measurement of MBSFN-RS

As a first example, the reference signal is an MBSFN reference signal (MBSFN-RS). That is, the information acquisition unit 133 acquires the result of the measurement of the MBSFN-RS transmitted by one or more small base stations 200-1.

Further, the result of the measurement includes, for example, a result of measurement and identification information in each of one or more MBSFN areas 30. That is, the result of the measurement includes a result of the measurement of the MBSFN-RS transmitted by the small base station 200-1 of the small cell 20 belonging to the MBSFN area 30 and an MBSFN area ID of the MBSFN area 30 in each of the one or more MBSFN areas 30.

As one example, the result of the measurement includes a reception level and/or a signal-to-interference-plus-noise ratio (SINR) of the MBSFN-RS. Hereinafter, a specific example of this point will be described with reference to FIG. 18.

FIG. 18 is an explanatory diagram illustrating an example of a measurement result of the MBSFN reference signal. Referring to FIG. 18, the reception level and the SINR of the MBSFN-RS and the MBSFN area ID of each of three MBSFN areas 30 are illustrated as the result of the measurement of the MBSFN reference signal. For example, the reception level of the MBSFN-RS of the MBSFN area 30 in which the MBSFN area ID is 2 is −135 dBm/Hz, and the SINR of the MBSFN-RS of the MBSFN area 30 is 15 dB.

The information acquisition unit 133 acquires, for example, such a result of the measurement.

Of course, the result of the measurement is not limited to the above-described example. For example, the result of the measurement may be information indicating one MBSFN area 30 (for example, the MBSFN area ID). As one example, the result of the measurement may be information indicating a predetermined number of MBSFN areas 30 accompanied with a better measurement value (for example, a reception level or an SIRN) among one or more MBSFN areas 30. As another example, the result of the measurement may be information indicating the MBSFN area 30 accompanied with a measurement value satisfying a predetermined condition (for example, a measurement value exceeding a predetermined threshold value or a measurement value less than the predetermined threshold value) among one or more MBSFN areas 30.

Second Example: Result of Measurement of CRS

As a second example, the reference signal is the CRS. That is, the information acquisition unit 133 acquires a result of measurement of the CRS transmitted by one or more small base stations 200-1.

Further, the result of the measurement includes, for example, a result of measurement and identification information in each of one or more small base stations 200-1. That is, the result of the measurement includes a result of the measurement of the CRS transmitted by one or more small base stations 200-1 and a cell ID of the small cell 20 of the small base station 200-1 in each of the one or more small base stations 200-1.

As one example, the result of the measurement includes the reception level, the SINR, and/or a path loss of the CRS. Hereinafter, a specific example of this point will be described with reference to FIG. 19.

FIG. 19 is an explanatory diagram illustrating an example of the result of the measurement of the CRS. Referring to FIG. 19, a cell ID and a path loss of each of three small base stations 200-1 are illustrated as the result of the measurement of the CRS. For example, a path loss corresponding to the small base station 200-1 of the small cell 20 in which the cell ID is 1 (that is, the path loss of the CRS transmitted by the small base station 200-1) is 50 dB. The information acquisition unit 133 acquires, for example, such a result of the measurement.

Of course, the result of the measurement is not limited to the above-described example. For example, the result of the measurement may be information (for example, the cell ID) indicating one small base station 200-1 among one or more small base stations 200-1. As one example, the result of the measurement may be information indicating a predetermined number of small base stations 200-1 accompanied with a better measurement value (for example, a reception level, an SIRN, or a path loss) among the one or more small base stations 200-1. As another example, the result of the measurement may be information indicating the small base station 200-1 accompanied with a measurement value satisfying a predetermined condition (for example, a measurement value exceeding a predetermined threshold value or a measurement value less than the predetermined threshold value) among the one or more small base stations 200-1.

(Decision Unit 135)

Based on the result of the measurement, the decision unit 135 decides the MBSFN area to which the cell of the small base station 300-1 belongs.

First Example: Decision Based on Result of Measurement of MBSFN-RS

As described above, as a first example, the reference signal is an MBSFN reference signal (MBSFN-RS) and the result of the measurement includes, for example, identification information and a result of measurement in each of one or more MBSFN areas 30. In this case, the decision unit 135 decides one MBSFN area 30 among the one or more MBSFN areas 30 as the MBSFN area to which the cell of the small base station 300-1 belongs.

For example, the decision unit 135 decides a predetermined number of MBSFN areas 30 accompanied with a better result of the measurement among the one or more MBSFN areas 30 as the MBSFN areas to which the cell of the small base station 300-1 belongs. More specifically, for example, the predetermined number is 1. That is, the decision unit 135 decides one MBSFN area 30 accompanied with the best result of the measurement among the one or more MBSFN areas 30 as the MBSFN area to which the cell of the small base station 300-1 belongs.

As one example, referring back to FIG. 18, the reception level and the SINR in the MBSFN area 30 in which the MBSFN area ID is 2 are higher than the reception levels and the SINRs in the other MBSFN areas 30. Thus, the decision unit 135 decides the MBSFN area 30 in which the MBSFN area ID is 2 as the MBSFN area to which the cell of the small base station 300-1 belongs.

The scheme of deciding the MBSFN area to which the cell of the small base station 300-1 belongs is not limited to the above-described example. For example, the decision unit 135 may decide the MBSFN area 30 accompanied with a result of measurement satisfying a predetermined condition (for example, a result of measurement exceeding a predetermined threshold value or a result of measurement less than the predetermined threshold value) among the one or more MBSFN areas 30 as the MBSFN area to which the cell of the small base station 300-1 belongs.

As described above, the result of the measurement may be information (for example, the MBSFN area ID) indicating one MBSFN area 30. In this case, the decision unit 135 may decide the MBSFN area 30 indicated by the result of the measurement as the MBSFN area to which the cell of the small base station 300-1 belongs.

In accordance with the decision of the MBSFN area based on the result of the measurement of the MBSFN-RS described above, for example, the MBSFN area 30 near the small base station 300-1 can be decided as the MBSFN area to which the small base station 300-1 belongs.

Second Example: Decision Based on Result of Measurement of CRS

As described above, as a first example, the reference signal is the CRS and the result of the measurement includes, for example, identification information and a result of measurement in each of one or more small base stations 200-1. In this case, the decision unit 135 decides the MBSFN area 30 to which the small cell 20 of one small base station 200-1 among the one or more small base stations 200-1 belongs, as the MBSFN area to which the cell of the small base station 300-1 belongs.

For example, the decision unit 135 decides the MBSFN area 30 to which the small cell 20 of a predetermined number of small base stations 200-1 accompanied with a better result of the measurement among the one or more small base stations 200-1 belongs, as the MBSFN areas to which the cell of the small base station 300-1 belongs. More specifically, for example, the predetermined number is 1. That is, the decision unit 135 decides one MBSFN area 30 to which the small cell 20 of one small base station 200-1 accompanied with the best result of the measurement among the one or more small base stations 200-1 belongs, as the MBSFN area to which the cell of the small base station 300-1 belongs.

As one example, referring back to FIG. 19, the path loss corresponding to the small base station 200-1 of the small cell 20 in which the cell ID is 1 (that is, the path loss of the CRS transmitted by the small base station 200-1) is less than the path losses corresponding to other small base stations 200-1. Thus, the decision unit 135 decides the MBSFN area 30 to which the small cell 20 in which the cell ID is 1 belongs, as the MBSFN area to which the cell of the small base station 300-1 belongs.

The scheme of deciding the MBSFN area to which the cell of the small base station 300-1 belongs is not limited to the above-described example. For example, the decision unit 135 may decide the MBSFN area 30 to which the small cell 20 of the small base station 200-1 accompanied with a result of measurement satisfying a predetermined condition (for example, a result of measurement exceeding a predetermined threshold value or a result of measurement less than the predetermined threshold value) among the one or more small base stations 200-1 belongs, as the MBSFN area to which the cell of the small base station 300-1 belongs.

As described above, the result of the measurement may be information (for example, the cell ID) indicating one small base station 200-1. In this case, the decision unit 135 may decide the MBSFN area 30 to which the small cell 20 of the small base station 200-1 indicated by the result of the measurement belongs, as the MBSFN area to which the cell of the small base station 300-1 belongs.

In accordance with the decision of the MBSFN area based on the result of the measurement of the CRS described above, for example, the MBSFN area 30 to which the small cell 20 near the small base station 300-1 belongs can be decided as the MBSFN area to which the small base station 300-1 belongs.

As described above, based on the result of the measurement, the decision unit 135 decides the MBSFN area to which the cell of the small base station 300-1 belongs. Accordingly, for example, it is possible to automatically decide the MBSFN area to which the cell of the small base station 300-1 belongs.

(Control Unit 137)

The control unit 137 causes the small base stations 200-1 and 300-1 to perform operations of the MBSFN.

For example, the control unit 137 requests the small base stations 200-1 and 300-1 to start an MBMS session. More specifically, for example, the control unit 137 transmits an MBMS session start request message to the small base stations 200-1 and 300-1.

For example, the control unit 137 performs MBMS scheduling and supplies the small base stations 200-1 and 300-1 with MBMS scheduling information. More specifically, for example, the control unit 137 transmits an MBMS scheduling information message to the small base stations 200-1 and 300-1.

As described above, the MBSFN area to which the cell of the small base station 300-1 belongs is decided. Then, the control unit 137 transmits the MBMS session start request message and the MBMS scheduling information message corresponding to the decided MBSFN area to the small base station 300-1. Accordingly, the small base station 300-1 starts an operation as a base station of the decided MBSFN area.

<3.2. Configuration of Small Base Station>

Figure 20:
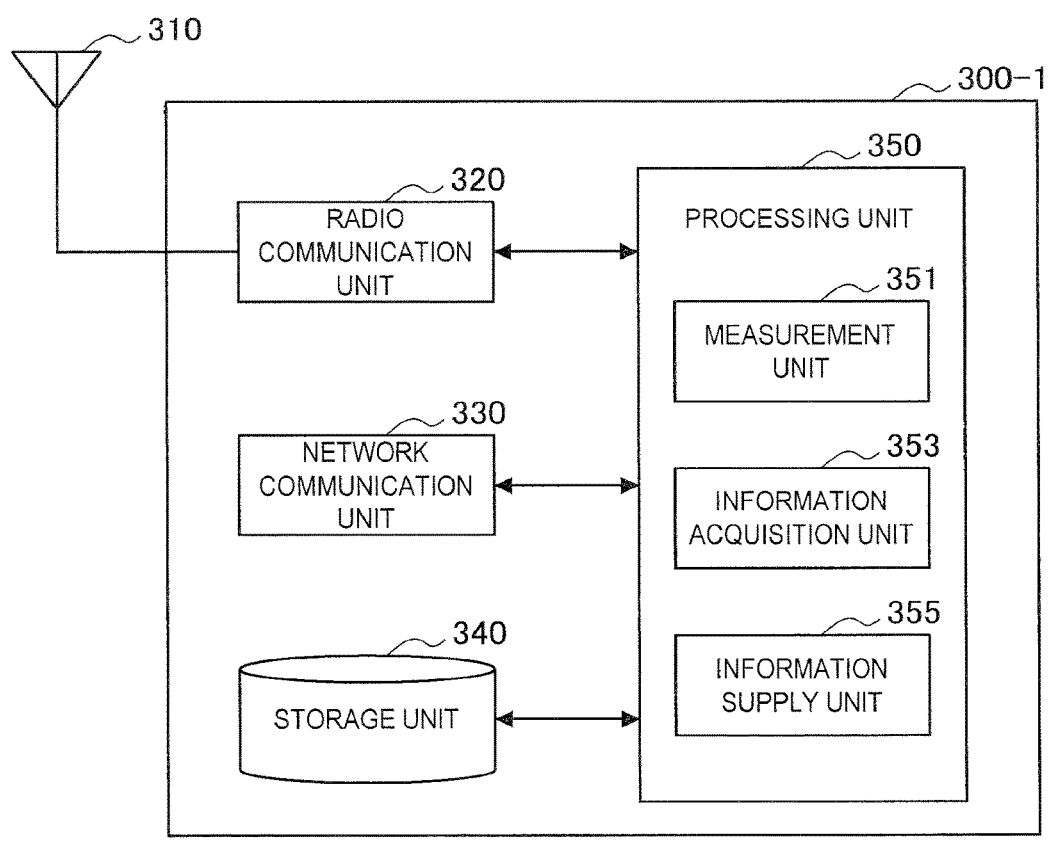
FIG. 20 is a block diagram illustrating an example of the configuration of a small base station according to the first embodiment.

Next, the configuration of the small base station 300-1 according to the first embodiment will be described with reference to FIG. 20. FIG. 20 is a block diagram illustrating an example of the configuration of the small base station 300-1 according to the first embodiment. Referring to FIG. 20, the small base station 300-1 includes an antenna unit 310, a radio communication unit 320, a network communication unit 330, a storage unit 340, and a processing unit 350.

(Antenna Unit 310)

The antenna unit 310 radiates a signal output by the radio communication unit 320 as radio waves to a space. The antenna unit 310 converts space radio waves into a signal and outputs the signal to the radio communication unit 320.

(Radio Communication Unit 320)

The radio communication unit 320 performs radio communication. For example, the radio communication unit 320 transmits a downlink signal to the terminal apparatus 400-1. The radio communication unit 320 receives an uplink signal from the terminal apparatus 400-1.

Further, in particular, in the first embodiment, the radio communication unit 320 receives a downlink signal from the small base station 200-1. The downlink signal includes a reference signal.

(Network Communication Unit 330)

The network communication unit 330 communicates with another node. For example, the network communication unit 330 communicates with a control apparatus 100-1. For example, the network communication unit 330 communicates with the small base station 200-1. For example, the network communication unit 330 communicates with a core network node located in the core network 40 and/or the macro base station 11. The network communication unit 330 communicates with another node via the Internet 50.

(Storage Unit 340)

The storage unit 340 temporarily or permanently stores a program and data for an operation of the small base station 300-1.

(Processing Unit 350)

The processing unit 350 supplies various functions of the small base station 300-1. The processing unit 350 includes a measurement unit 351, an information acquisition unit 353, and an information supply unit 355.

(Measurement Unit 351)

The measurement unit 351 measures the reference signal transmitted by one or more small base stations 200-1.

First Example: Measurement of MBSFN-RS

As a first example, the reference signal is an MBSFN-RS. That is, the measurement unit 351 measures the MBSFN-RS transmitted by one or more small base stations 200-1.

For example, the measurement unit 351 performs the measurement in each of one or more MBSFN areas 30. A result of the measurement includes identification information (for example, the MBSFN area ID) and a result of measurement in each of one or more MBSFN areas 30.

As one example, the result of the measurement includes a reception level and/or an SINR of the MBSFN-RS. A specific example of the result of the measurement is illustrated in FIG. 18.

The result of the measurement may be information indicating one MBSFN area 30 (for example, the MBSFN area ID). As one example, the result of the measurement may be information indicating a predetermined number of MBSFN areas 30 accompanied with a better measurement value (for example, a reception level or an SIRN) among one or more MBSFN areas 30. As another example, the result of the measurement may be information indicating the MBSFN area 30 accompanied with a measurement value satisfying a predetermined condition (for example, a measurement value exceeding a predetermined threshold value or a measurement value less than the predetermined threshold value) among one or more MBSFN areas 30.

Second Example: Measurement of CRS

As a second example, the reference signal is the CRS. That is, the measurement unit 351 measures the CRS transmitted by one or more small base stations 200-1.

For example, the measurement unit 351 performs the measurement in each of one or more small base stations 200-1. A result of the measurement includes identification information (for example, the cell ID) and the result of the measurement in each of one or more small base stations 200-1.

As one example, the result of the measurement includes the reception level, the SINR, and/or a path loss of the CRS. Hereinafter, a specific example of the result of the measurement will be described with reference to FIG. 19.

The result of the measurement may be information (for example, the cell ID) indicating one small base station 200-1. As one example, the result of the measurement may be information indicating a predetermined number of small base stations 200-1 accompanied with a better measurement value (for example, a reception level, an SIRN, or a path loss) among the one or more small base stations 200-1. As another example, the result of the measurement may be information indicating the small base station 200-1 accompanied with a measurement value satisfying a predetermined condition (for example, a measurement value exceeding a predetermined threshold value or a measurement value less than the predetermined threshold value) among the one or more small base stations 200-1.

(Information Acquisition Unit 353)

The information acquisition unit 353 acquires the result of the measurement of the reference signal transmitted by one or more small base stations 200-1. In the first embodiment, the information acquisition unit 353 acquires the result of the measurement by the small base station 300-1 (the measurement unit 351).

(Information Supply Unit 355)

The information supply unit 355 supplies the result of the measurement to the control apparatus 100-1. For example, the information supply unit 355 supplies the result of the measurement to the control apparatus 100-1 via the network communication unit 330.

<3.3. Flow of Process>

Figure 21:
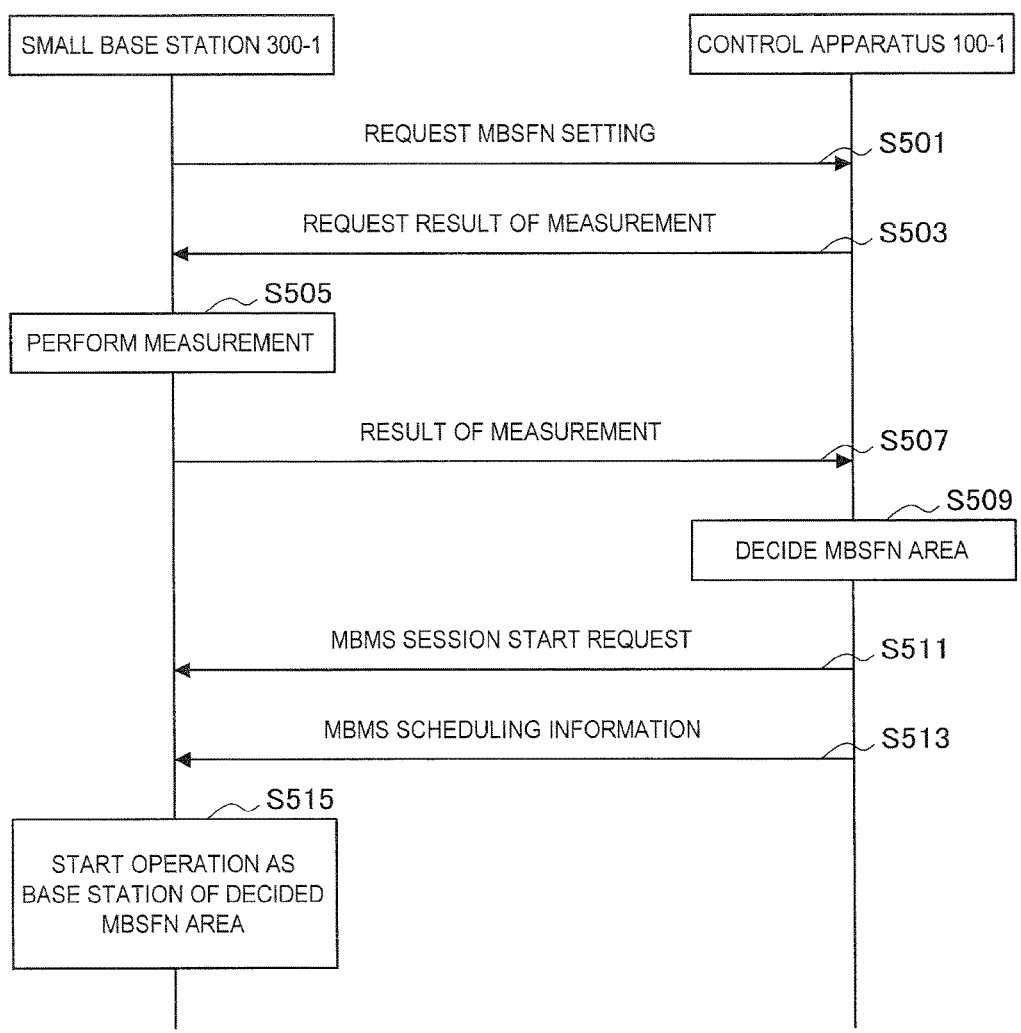
FIG. 21 is a sequence diagram illustrating an example of a schematic flow of a process according to the first embodiment.

Next, an example of a process according to the first embodiment will be described with reference to FIG. 21. FIG. 21 is a sequence diagram illustrating an example of a schematic flow of the process according to the first embodiment. The process according to the first embodiment is performed, for example, after registration and authentication, self-testing, setting of radio parameters, and the like of the small base station 300-1 are completed.

The small base station 300-1 requests the control apparatus 100-1 to set the MBSFN (S501). Then, the control apparatus 100-1 requests the small base station 300-1 to supply the result of the measurement of the reference signal transmitted by another base station (S503). The small base station 300-1 measures the reference signal transmitted by one or more small base stations 200-1 (S505). Thereafter, the small base station 300-1 supplies the result of the measurement to the control apparatus 100-1 (S507). Based on the result of the measurement, the control apparatus 100-1 decides the MBSFN area to which the cell of the small base station 300-1 belongs (S509).

Thereafter, the control apparatus 100-1 transmits the MBMS session start request message and the MBMS scheduling information message corresponding to the decided MBSFN area to the small base station 300-1 (S511 and S513). Then, the small base station 300-1 starts an operation as the base station of the decided MBSFN area (S515).

The first embodiment has been described above. According to the first embodiment, the control apparatus 100-1 acquires the result of the measurement of the reference signal transmitted by one or more small base stations 200-1 which is supplied by the small base station 300-1. Then, based on the result of the measurement, the control apparatus 100-1 decides the MBSFN area to which the cell of the small base station 300-1 belongs. Accordingly, for example, it is possible to automatically decide the MBSFN area to which the cell of the small base station 300-1 belongs. For example, the MBSFN area can be decided without a special operation by a base station (the small base station 200-1) other than the small base station 300-1.

According to the first embodiment, the result of the measurement is the result of the measurement by the small base station 300-1. Accordingly, for example, the result of the measurement can be obtained without imposing a burden on a terminal apparatus 400-1.

4. Second Embodiment

Figure 22:
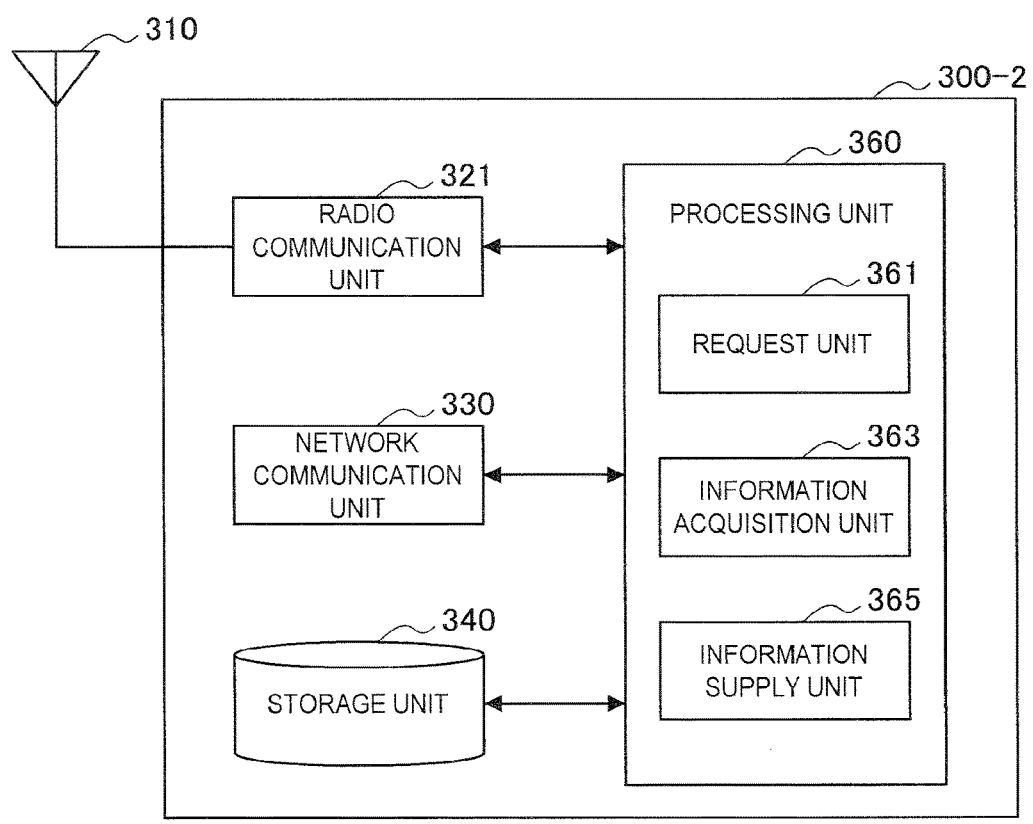
FIG. 22 is a block diagram illustrating an example of the configuration of a small base station according to a second embodiment.
Figure 23:
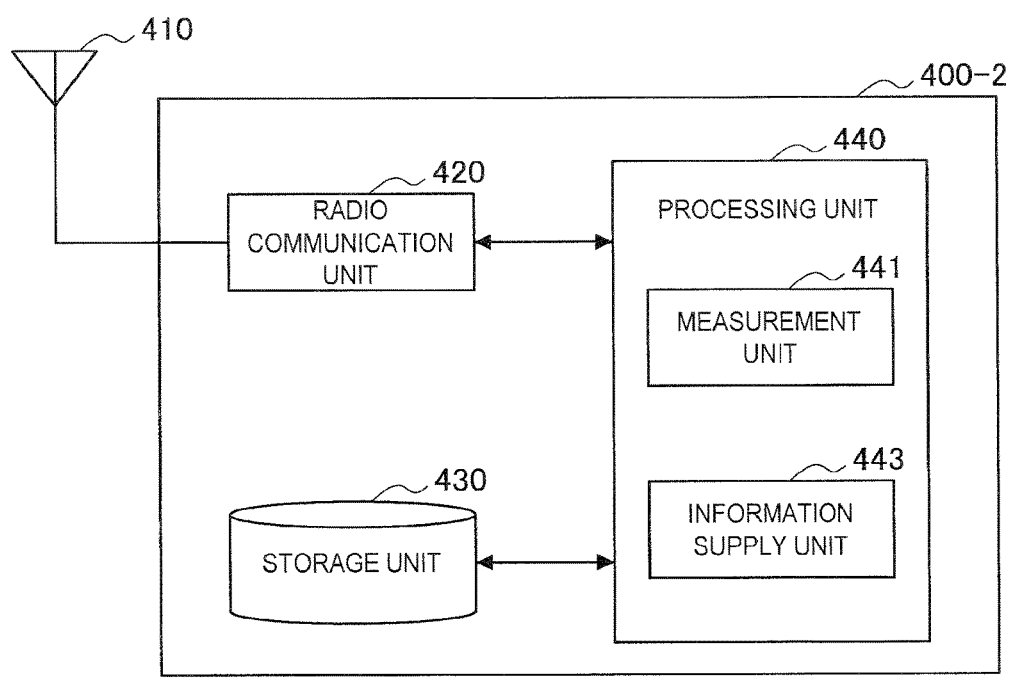
FIG. 23 is a block diagram illustrating an example of the configuration of the terminal apparatus according to the second embodiment.
Figure 24:
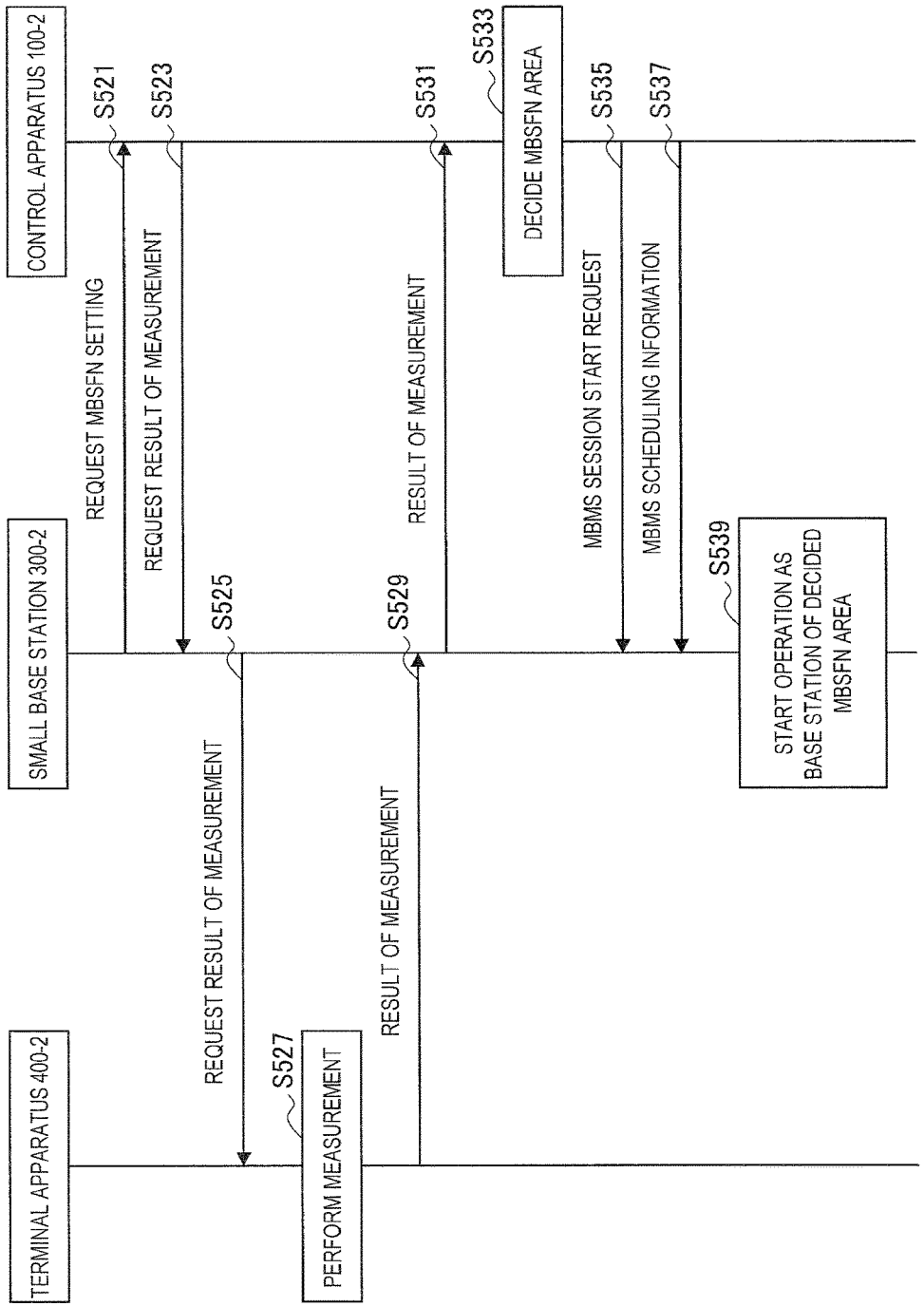
FIG. 24 is a sequence diagram illustrating an example of a schematic flow of a process according to the second embodiment.

Next, a second embodiment of the present disclosure will be described with reference to FIGS. 22 to 24. According to the second embodiment, a control apparatus 100-2 acquires a result of measurement of a reference signal transmitted by one or more small base stations 200-2 which is supplied by a small base station 300-2. The control apparatus 100-2 decides an MBSFN area to which the small cell of the small base station 300-2 belongs based on the result of the measurement. In the second embodiment, this point is the same as in the first embodiment. In particular, according to the second embodiment, the result of the measurement is a result of measurement by a terminal apparatus 400-2 connected to the small base station 300-2.

<4.1. Configuration of Control Apparatus>

The description of the control apparatus 100-2 according to the second embodiment is the same as, for example, the description of the control apparatus 100-1 according to the first embodiment excluding the following point (a measurement entity) (excluding differences in reference numerals). Thus, the repeated description will be omitted here.

(Information Acquisition Unit 133)

Measurement Entity

The control apparatus 100-1 (the information acquisition unit 133) according to the first embodiment acquires the result of the measurement by the small base station 300-1. On the other hand, the control apparatus 100-2 (information acquisition unit 133) according to the second embodiment acquires a result of measurement by the terminal apparatus 400-2 connected to the small base station 300-2. That is, according to the second embodiment, the terminal apparatus 400-2 connected to the small base station 300-2 measures a reference signal transmitted by one or more small base stations 200-2 and supplies a result of the measurement to the small base station 300-2. Then, for example, the small base station 300-2 supplies the result of the measurement to the control apparatus 100-2. Accordingly, for example, even when the small base station 300-2 has no measurement function, the result of the measurement can be obtained.

<4.2. Configuration of Small Base Station>

Next, the configuration of a small base station 300-2 according to the second embodiment will be described with reference to FIG. 22. FIG. 22 is a block diagram illustrating an example of the configuration of the small base station 300-2 according to the second embodiment. Referring to FIG. 22, the small base station 300-2 includes an antenna unit 310, a radio communication unit 320, a network communication unit 330, a storage unit 340, and a processing unit 360.

For example, the description of the antenna unit 310, the network communication unit 330, and the storage unit 340 is no different between the first and second embodiments (excluding differences in reference numerals). Thus, only the radio communication unit 321 and the processing unit 360 will be described here and the repeated description will be omitted.

(Radio Communication Unit 321)

The radio communication unit 321 performs radio communication. For example, the radio communication unit 321 transmits a downlink signal to the terminal apparatus 400-2. The radio communication unit 321 receives an uplink signal from the terminal apparatus 400-2.

In the second embodiment, the radio communication unit 321 may not receive a downlink from the small base station 200-2.

(Processing Unit 360)

The processing unit 360 supplies various functions of the small base station 300-2. The processing unit 360 includes a request unit 361, an information acquisition unit 363, and an information supply unit 365.

(Request Unit 361)

The request unit 361 requests the terminal apparatus 400-2 connected to the small base station 300-2 to supply the result of the measurement of the reference signal transmitted by another base station.

For example, the control apparatus 100-2 requests the small base station 300-2 to supply the result of the measurement of the reference signal transmitted by another base station. Then, the request unit 361 requests the terminal apparatus 400-2 connected to the small base station 300-2 to supply the result of the measurement of the reference signal transmitted by another base station.

The request unit 361 may request only one terminal apparatus 400-2 connected to the small base station 300-2 to supply the result of the measurement. Alternatively, the request unit 361 may request two or more terminal apparatuses 400-2 connected to the small base station 300-2 to supply the result of the measurement.

When the request unit 361 requests the terminal apparatus 400-2 to supply the result of the measurement of the MBSFN-RS, information indicating the MBSFN subframes of each MBSFN area may be supplied to the terminal apparatus 400-2.

(Information Acquisition Unit 363)

The information acquisition unit 363 acquires the result of the measurement of the reference signal transmitted by one or more small base station 200-1. In the second embodiment, the information acquisition unit 363 acquires the result of the measurement by the terminal apparatus 400-2 connected to the small base station 300-2.

For example, as described above, the request unit 361 requests the terminal apparatus 400-2 connected to the small base station 300-2 to supply the result of the measurement of the reference signal transmitted by another base station. Then, the terminal apparatus 400-2 supplies the result of the measurement of the reference signal transmitted by one or more small base stations 200-2 to the small base station 300-2. The result of the measurement is stored in the storage unit 340. The information acquisition unit 363 acquires the result of the measurement from the storage unit 340.

As described above, the request unit 361 may request two or more terminal apparatuses 400-2 connected to the small base station 300-2 to supply the result of the measurement and the information acquisition unit 363 may acquire the result of the measurement by the two or more terminal apparatuses 400-2. In this case, as one example, the information acquisition unit 363 may acquire the result of the individual measurement by each of the two or more terminal apparatuses 400-2. As another example, the processing unit 360 may generate a result (for example, an average value) of all the measurements from the results of the individual measurements of the two or more terminal apparatuses 400-2 and the information acquisition unit 363 may acquire the result of all the measurements.

(Information Supply Unit 365)

The information supply unit 365 supplies the result of the measurement to the control apparatus 100-2. For example, the information supply unit 365 supplies the result of the measurement to the control apparatus 100-2 via the network communication unit 330.

<4.3. Configuration of Terminal Apparatus>

Next, the configuration of a terminal apparatus 400-2 according to the second embodiment will be described with reference to FIG. 23. FIG. 23 is a block diagram illustrating an example of the configuration of the terminal apparatus 400-2 according to the second embodiment. Referring to FIG. 23, the terminal apparatus 400-2 includes an antenna unit 410, a radio communication unit 420, a storage unit 430, and a processing unit 440.

(Antenna Unit 410)

The antenna unit 410 radiates a signal output by the radio communication unit 420 as radio waves to a space. The antenna unit 410 converts space radio waves into a signal and outputs the signal to the radio communication unit 420.

(Radio Communication Unit 420)

The radio communication unit 420 performs radio communication. For example, the radio communication unit 420 receives downlink signals from base stations. The radio communication unit 420 transmits uplink signals to the base stations. The base stations include the small base station 200-2, the small base station 300-2, and the macro base station 11.

(Storage Unit 430)

The storage unit 430 temporarily or permanently stores a program and data for an operation of the terminal apparatus 400-2.

(Processing Unit 440)

The processing unit 440 supplies various functions of the terminal apparatus 400-2. The processing unit 440 includes a measurement unit 441 and an information supply unit 443.

(Measurement Unit 441)

The measurement unit 441 measures the reference signal transmitted by one or more small base stations 200-2.

The description of the measurement unit 441 of the terminal apparatus 400-2 according to the second embodiment is the same as, for example, the description of the measurement unit 351 of the small base station 300-1 according to the first embodiment. Thus, the repeated description will be omitted here.

(Information Supply Unit 443)

The information supply unit 443 supplies the result of the measurement to the small base station to which the terminal apparatus 400-2 is connected. The small base station is the small base station 300-2. For example, the information supply unit 443 supplies the result of the measurement to the small base station 300-2 via the radio communication unit 420.

<4.4. Flow of Process>

Next, an example of a process according to the second embodiment will be described with reference to FIG. 24. FIG. 24 is a sequence diagram illustrating an example of a schematic flow of the process according to the second embodiment. The process according to the second embodiment is performed, for example, after registration and authentication, self-testing, setting of radio parameters, and the like of the small base station 300-2 are completed.

The small base station 300-2 requests the control apparatus 100-2 to set the MBSFN (S521). Then, the control apparatus 100-2 requests the small base station 300-2 to supply the result of the measurement of the reference signal transmitted by another base station (S523). Thereafter, the small base station 300-2 requests the terminal apparatus 400-2 connected to the small base station 300-2 to supply the result of the measurement of the reference signal transmitted by another base station (S525). Then, the terminal apparatus 400-2 measures the reference signal transmitted by one or more small base stations 200-2 (S527). The terminal apparatus 400-2 supplies the result of the measurement to the small base station 300-2 (S529). Thereafter, the small base station 300-2 supplies the result of the measurement to the control apparatus 100-2 (S531). Based on the result of the measurement, the control apparatus 100-2 decides the MBSFN area to which the cell of the small base station 300-2 belongs (S533).

Thereafter, the control apparatus 100-2 transmits the MBMS session start request message and the MBMS scheduling information message corresponding to the decided MBSFN area to the small base station 300-2 (S535 and S537). Then, the small base station 300-2 starts an operation as the base station of the decided MBSFN area (S539).

The second embodiment has been described above. According to the second embodiment, the control apparatus 100-2 acquires the result of the measurement of the reference signal transmitted by one or more small base stations 200-2 which is supplied by the small base station 300-2. Then, based on the result of the measurement, the control apparatus 100-2 decides the MBSFN area to which the cell of the small base station 300-2 belongs. Accordingly, for example, it is possible to automatically decide the MBSFN area to which the cell of the small base station 300-2 belongs. For example, the MBSFN area can be decided without a special operation by a base station (the small base station 200-2) other than the small base station 300-2.

According to the second embodiment, the result of the measurement is the result of the measurement by the terminal apparatus 400-2 connected to the small base station 300-2. Accordingly, for example, the result of the measurement can be obtained even when the small base station 300-2 has no measurement function.

5. Third Embodiment

Next, a third embodiment of the present disclosure will be described with reference to FIGS. 25 to 28. According to the third embodiment, a control apparatus 100-3 acquires a result of measurement of a reference signal transmitted by a small base station 300-3 which is supplied by one or more small base stations 200-3. The control apparatus 100-3 decides an MBSFN area to which the cell of the small base station 300-3 belongs based on the result of the measurement. According to the third embodiment, the result of the measurement is a result of measurement by the one or more small base stations 200-3.

<5.1. Configuration of Control Apparatus>

Figure 25:
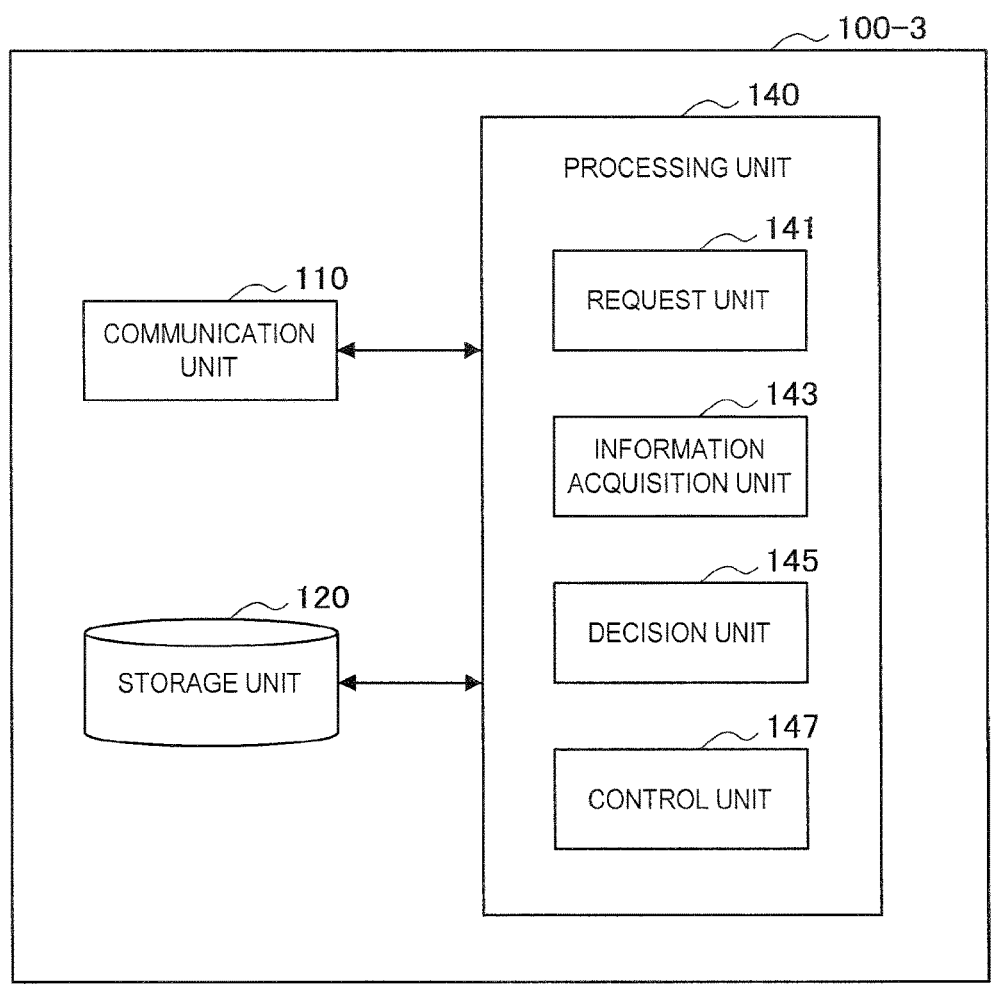
FIG. 25 is a block diagram illustrating an example of the configuration of a control apparatus according to a third embodiment.

First, the configuration of a control apparatus 100-3 according to the third embodiment will be described with reference to FIGS. 25 and 26. FIG. 25 is a block diagram illustrating an example of the configuration of the control apparatus 100-3 according to the third embodiment. Referring to FIG. 25, the control apparatus 100-3 includes a communication unit 110, a storage unit 120, and a processing unit 140.

The description of the communication unit 110 and the storage unit 120 is no different between the first and third embodiments (excluding differences in reference numerals). Thus, only the processing unit 140 will be described here and the repeated description will be omitted.

(Processing Unit 140)

The processing unit 140 supplies various functions of the control apparatus 100-3. The processing unit 140 includes a request unit 141, an information acquisition unit 143, a decision unit 145, and a control unit 147.

(Request Unit 141)

The request unit 141 requests one or more small base stations 200-3 to supply the result of the measurement of the reference signal transmitted by the small base station 300-3.

For example, the small base station 300-3 requests the control apparatus 100-3 to set the MBSFN. Then, the request unit 141 requests one or more small base station 200-3 to supply the result of the measurement of the reference signal transmitted by the small base station 300-3.

(Information Acquisition Unit 143)

The information acquisition unit 143 acquires the result of the measurement of the reference signal transmitted by the small base station 300-3 which is supplied by one or more small base stations 200-1.

For example, as described above, the request unit 141 requests one or more small base stations 200-3 to supply the result of the measurement of the reference signal transmitted by the small base station 300-3. Then, the one or more small base stations 200-3 supply the control apparatus 100-3 with the result of the measurement of the reference signal transmitted by the small base station 300-3. The result of the measurement is stored in the storage unit 120. The information acquisition unit 143 acquires the result of the measurement from the storage unit 120.

Measurement Entity

In the third embodiment, the result of the measurement is a result of measurement by each of the one or more small base stations 200-3. That is, each of the one or more small base stations 200-3 measures the reference signal transmitted by the small base station 300-3 and supplies the result of the measurement to the control apparatus 100-3. Accordingly, for example, the result of the measurement can be obtained without imposing a burden on a terminal apparatus 400-3.

Result of Measurement

For example, the reference signal is the CRS. That is, the information acquisition unit 143 acquires the result of the measurement of the CRS transmitted by the small base station 300-3.

Further, the result of the measurement includes, for example, a result of measurement and identification information in each of the one or more small base stations 200-3. That is, the result of the measurement includes a result of the measurement of the CRS transmitted by the small base station 300-3 and the cell ID of the small cell 20 of the small base station 200-3 in each of the one or more small base stations 200-3.

As one example, the result of the measurement includes a reception level, an SINR of the CRS, and/or a path loss. Hereinafter, a specific example of this point will be described with reference to FIG. 26.

Figure 26:
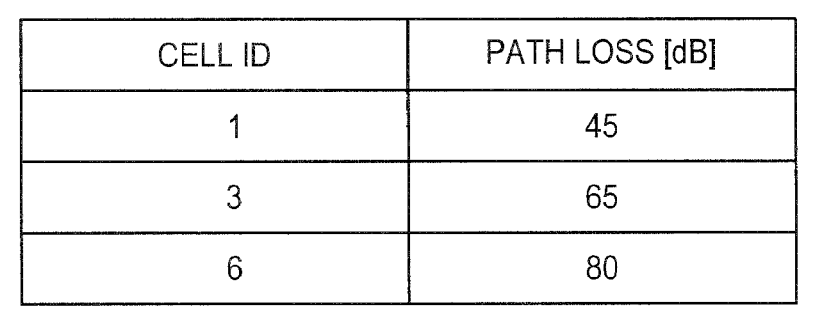

FIG. 26 is an explanatory diagram illustrating an example of the result of the measurement of the CRS. Referring to FIG. 26, the cell ID and the path loss of each of three small base stations 200-3 are illustrated as the result of the measurement of the CRS. For example, the path loss corresponding to the small base station 200-3 of the small cell 20 in which the cell ID is 1 (that is, the path loss supplied by the small base station 200-3) is 45 dB. The information acquisition unit 143 acquires, for example, such a result of the measurement.

(Decision Unit 145)

Based on the result of the measurement, the decision unit 145 decides the MBSFN area to which the cell of the small base station 300-3 belongs.

As described above, for example, the reference signal is the CRS and the result of the measurement includes, for example, identification information and the result of measurement in each of one or more small base stations 200-3. In this case, the decision unit 145 decides the MBSFN area 30 to which the small cell 20 of one small base station 200-3 among the one or more small base stations 200-3 belongs, as the MBSFN area to which the cell of the small base station 300-3 belongs.

For example, the decision unit 145 decides the MBSFN area 30 to which the small cells 20 of a predetermined number of small base stations 200-3 accompanied with a better result of the measurement among the one or more small base stations 200-3 belongs, as the MBSFN area to which the cell of the small base station 300-3 belongs. More specifically, for example, the predetermined number is 1. That is, the decision unit 145 decides one MBSFN area 30 to which the small cell 20 of one small base station 200-3 accompanied with the best result of the measurement among the one or more small base stations 200-3 belongs, as the MBSFN area to which the cell of the small base station 300-3 belongs.

As one example, referring back to FIG. 26, the path loss corresponding to the small base station 200-3 of the small cell 20 in which the cell ID is 1 (that is, the path loss supplied by the small base station 200-3) is less than the path losses corresponding to the other small base stations 200-3. Thus, the decision unit 145 decides the MBSFN area 30 to which the small cell 20 in which the cell ID is 1 belongs, as the MBSFN area to which the cell of the small base station 300-3 belongs.

The scheme of deciding the MBSFN area to which the cell of the small base station 300-3 belongs is not limited to the above-described example. For example, the decision unit 145 may decide the MBSFN area 30 to which the small cell 20 of the small base station 200-3 accompanied with a result of measurement satisfying a predetermined condition (for example, a result of measurement exceeding a predetermined threshold value or a result of measurement less than the predetermined threshold value) among the one or more small base stations 200-3 belongs, as the MBSFN area to which the cell of the small base station 300-3 belongs. Of course, yet another decision method may be adopted.

In accordance with the decision of the MBSFN area based on the result of the measurement of the CRS described above, for example, the MBSFN area 30 to which the small cell 20 near the small base station 300-3 belongs can be decided as the MBSFN area to which the small base station 300-3 belongs.

As described above, based on the result of the measurement, the decision unit 145 decides the MBSFN area to which the cell of the small base station 300-3 belongs. Accordingly, for example, it is possible to automatically decide the MBSFN area to which the cell of the small base station 300-3 belongs.

(Control Unit 147)

The control unit 147 causes the small base stations 200-3 and 300-3 to perform operations of the MBSFN.

The description of the control unit 147 of a control apparatus 100-3 according to the third embodiment is the same as, for example, the description of the control unit 137 of the control apparatus 100-1 according to the first embodiment. Thus, the repeated description will be omitted herein.

<5.2. Configuration of Small Base Station>

Figure 27:
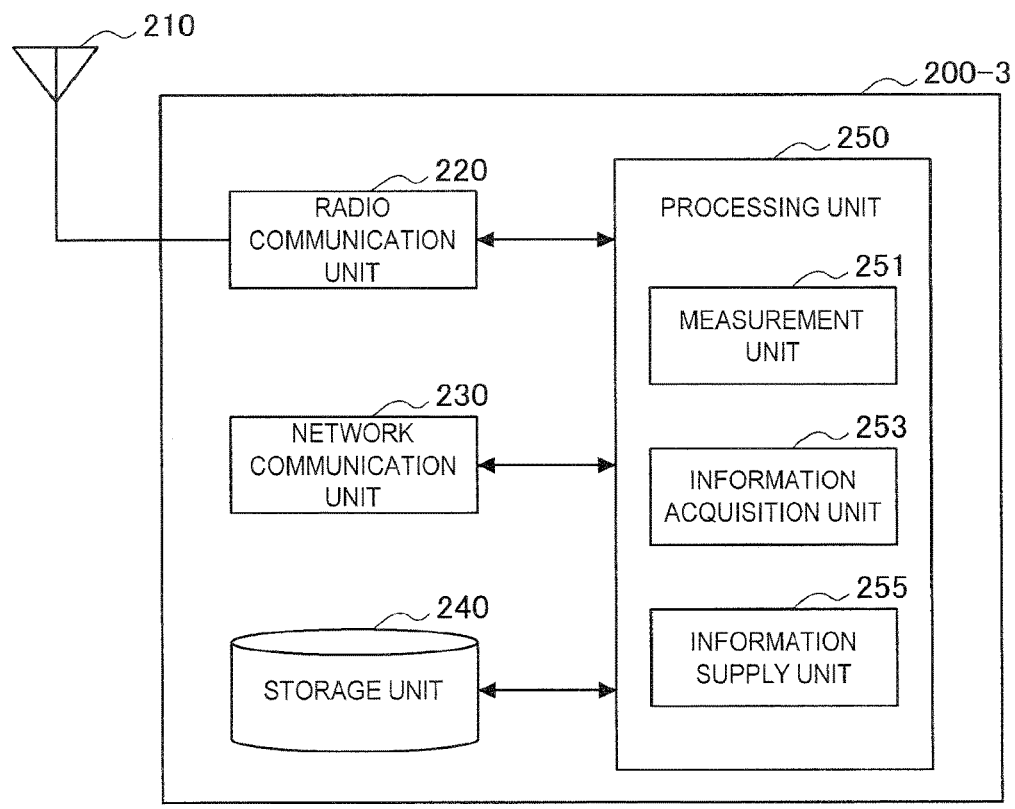
FIG. 27 is a block diagram illustrating an example of the configuration of a small base station according to a third embodiment.

Next, the configuration of a small base station 200-3 according to the third embodiment will be described with reference to FIG. 27. FIG. 27 is a block diagram illustrating an example of the configuration of the small base station 200-3 according to the third embodiment. Referring to FIG. 27, the small base station 200-3 includes an antenna unit 210, a radio communication unit 220, a network communication unit 230, a storage unit 240, and a processing unit 250.

(Antenna Unit 210)

The antenna unit 210 radiates a signal output by the radio communication unit 220 as radio waves to a space. The antenna unit 210 converts space radio waves into a signal and outputs the signal to the radio communication unit 220.

(Radio Communication Unit 220)

The radio communication unit 220 performs radio communication. For example, the radio communication unit 220 transmits a downlink signal to the terminal apparatus 400-3. The radio communication unit 220 receives an uplink signal from the terminal apparatus 400-3.

Further, in particular, in the third embodiment, the radio communication unit 220 receives a downlink signal from the small base station 300-3. The downlink signal includes a reference signal.

(Network Communication Unit 230)

The network communication unit 230 communicates with another node. For example, the network communication unit 230 communicates with a control apparatus 100-3. For example, the network communication unit 230 communicates with the small base station 300-3. For example, the network communication unit 230 communicates with a core network node located in the core network 40 and/or the macro base station 11. The network communication unit 230 communicates with another node via the Internet 50.

(Storage Unit 240)

The storage unit 240 temporarily or permanently stores a program and data for an operation of the small base station 200-3.

(Processing Unit 250)

The processing unit 250 supplies various functions of the small base station 200-3. The processing unit 250 includes a measurement unit 251, an information acquisition unit 253, and an information supply unit 255.

(Measurement Unit 251)

The measurement unit 251 measures the reference signal transmitted by the small base station 300-3.

For example, the reference signal is the CRS. That is, the measurement unit 251 measures the CRS transmitted by the small base station 300-3. As one example, the result of the measurement includes the reception level, the SINR, and/or the path loss of the CRS.

(Information Acquisition Unit 253)

The information acquisition unit 253 acquires the result of the measurement of the reference signal transmitted by small base station 300-3. In the third embodiment, the information acquisition unit 253 acquires the result of the measurement by the small base station 200-3 (the measurement unit 251).

(Information Supply Unit 255)

The information supply unit 255 supplies the result of the measurement to the control apparatus 100-3. For example, the information supply unit 255 supplies the result of the measurement to the control apparatus 100-3 via the network communication unit 230. The information supply unit 255 may also supply the cell ID of the cell of the small base station 200-3 along with the result of the measurement.

<5.3. Flow of Process>

Figure 28:
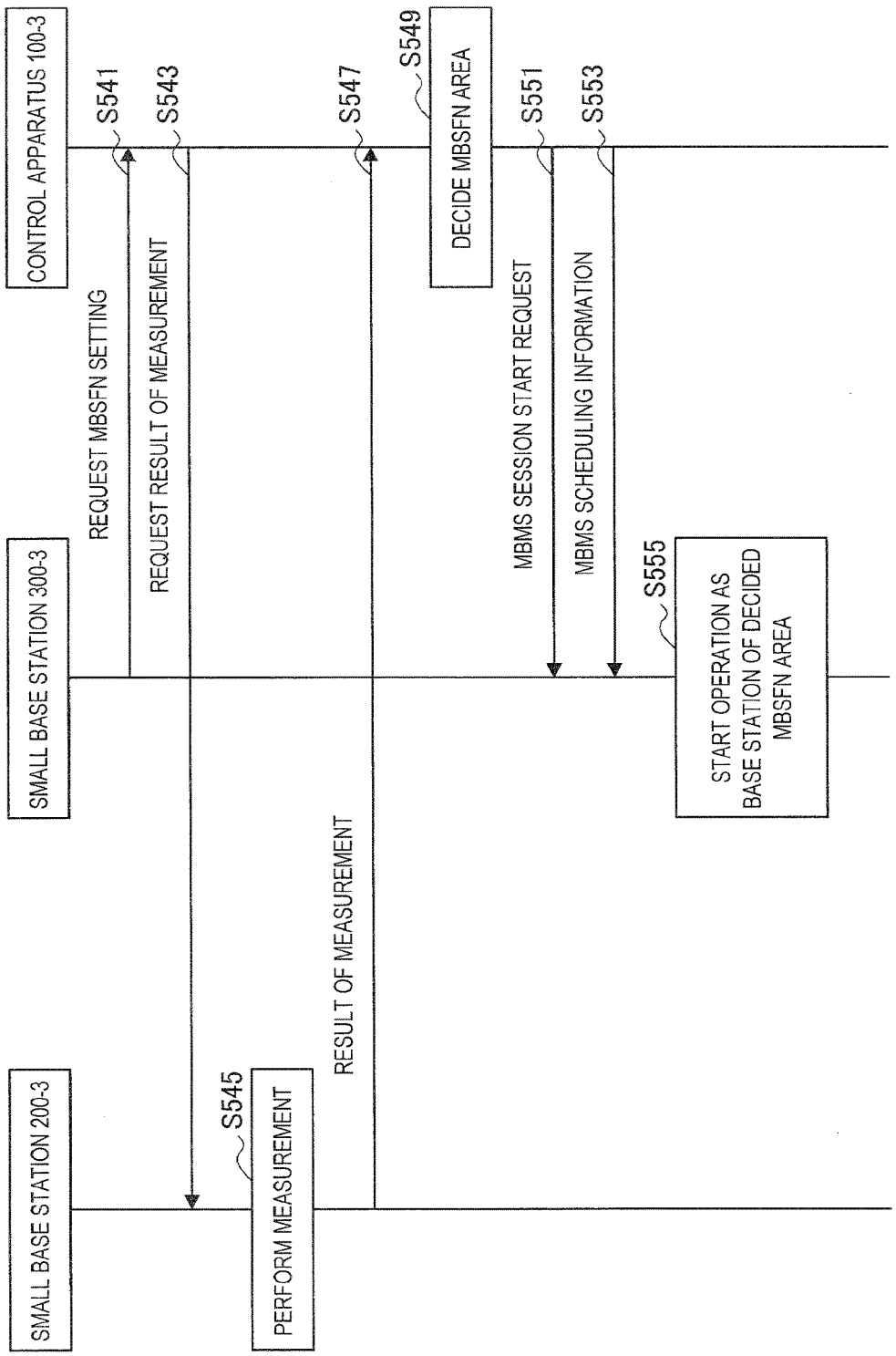
FIG. 28 is a sequence diagram illustrating an example of a schematic flow of a process according to the third embodiment.

Next, an example of a process according to the third embodiment will be described with reference to FIG. 28. FIG. 28 is a sequence diagram illustrating an example of a schematic flow of the process according to the third embodiment. The process according to the third embodiment is performed, for example, after registration and authentication, self-testing, setting of radio parameters, and the like of the small base station 300-3 are completed.

The small base station 300-3 requests the control apparatus 100-3 to set the MBSFN (S541). Then, the control apparatus 100-3 requests one or more small base stations 200-3 to supply the result of the measurement of the reference signal transmitted by the small base station 300-3 (S543). Each of the one or more small base stations 200-3 measures the reference signal transmitted by the small base station 300-3 (S545). Thereafter, each of the one or more small base stations 200-3 supplies the result of the measurement to the control apparatus 100-3 (S547). Based on the result of the measurement, the control apparatus 100-3 decides the MBSFN area to which the cell of the small base station 300-3 belongs (S549).

Thereafter, the control apparatus 100-3 transmits the MBMS session start request message and the MBMS scheduling information message corresponding to the decided MBSFN area to the small base station 300-3 (S551 and S553). Then, the small base station 300-3 starts an operation as the base station of the decided MBSFN area (S555).

The third embodiment has been described above. According to the third embodiment, the control apparatus 100-3 acquires the result of the measurement of the reference signal transmitted by the small base station 300-3 which is supplied by the one or more small base stations 200-3. Then, based on the result of the measurement, the control apparatus 100-3 decides the MBSFN area to which the cell of the small base station 300-3 belongs. Accordingly, for example, it is possible to automatically decide the MBSFN area to which the cell of the small base station 300-3 belongs. For example, the MBSFN area can be decided without a special operation by the small base station 300-3.

According to the third embodiment, the result of the measurement is the result of the measurement by the one or more small base stations 200-3. Accordingly, for example, the result of the measurement can be obtained without imposing a burden on a terminal apparatus 400-3.

6. Fourth Embodiment

Figure 29:
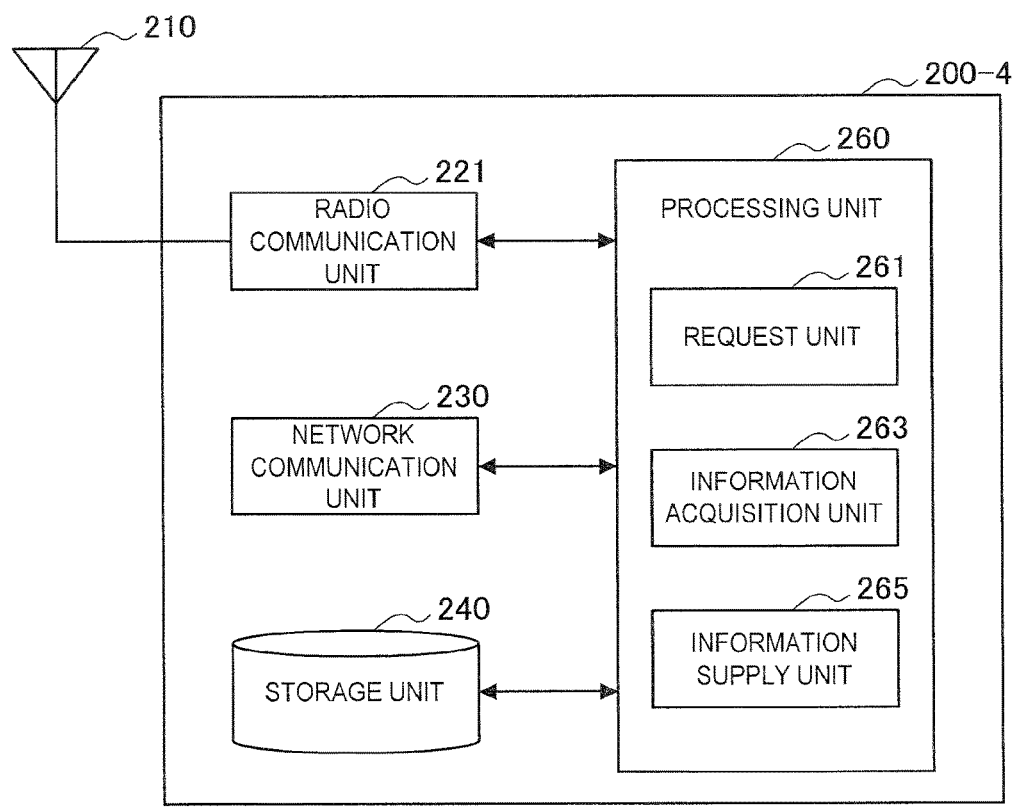
FIG. 29 is a block diagram illustrating an example of the configuration of a small base station according to the fourth embodiment.
Figure 30:
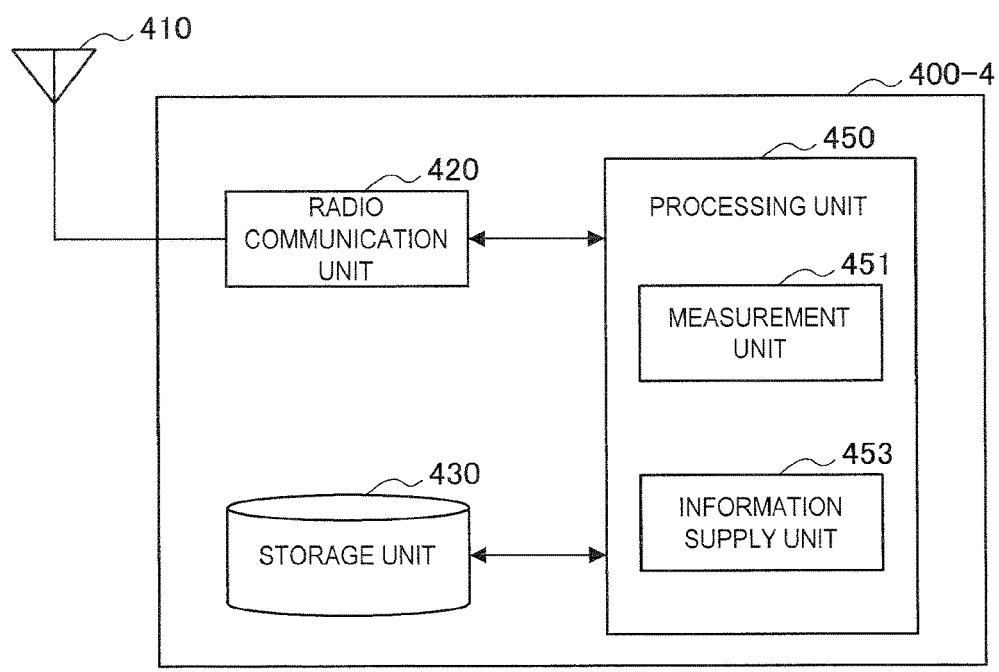
FIG. 30 is a block diagram illustrating an example of the configuration of the terminal apparatus according to the fourth embodiment.
Figure 31:
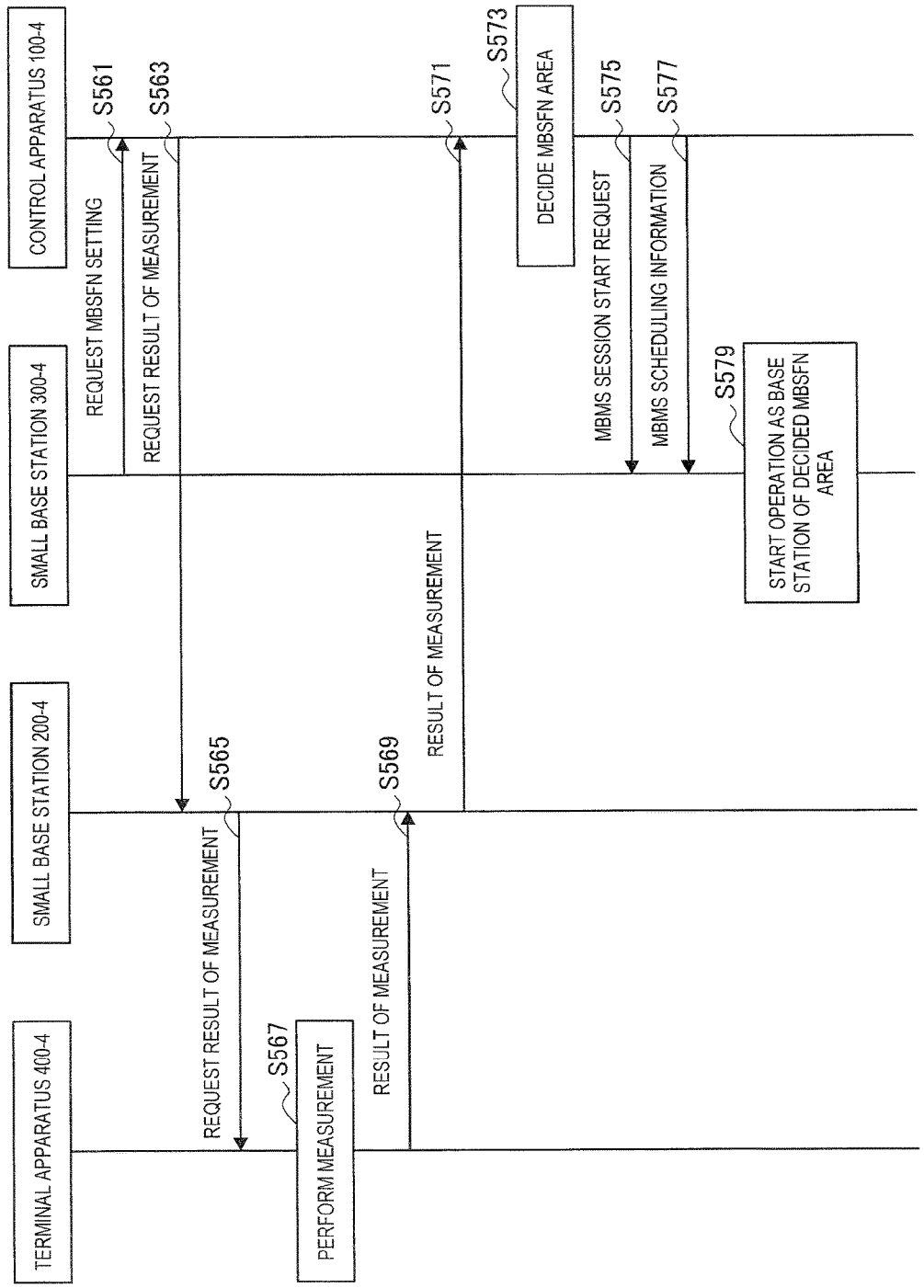
FIG. 31 is a sequence diagram illustrating an example of a schematic flow of a process according to the fourth embodiment.

Next, a fourth embodiment of the present disclosure will be described with reference to FIGS. 29 to 31. According to the fourth embodiment, a control apparatus 100-4 acquires a result of measurement of a reference signal transmitted by a small base station 300-4 which is supplied by one or more base stations 200-4. The control apparatus 100-4 decides an MBSFN area to which the cell of the small base station 300-4 belongs based on the result of the measurement. In the fourth embodiment, this point is the same as the third embodiment. In particular, according to the fourth embodiment, the result of the measurement is a result of measurement by a terminal apparatus 400-4 connected to each of the one or more base stations 200-4.

<6.1. Configuration of Control Apparatus>

The description of the control apparatus 100-4 according to the fourth embodiment is the same as, for example, the description of the control apparatus 100-3 according to the third embodiment excluding the following point (a measurement entity) (excluding differences in reference numerals). Thus, the repeated description will be omitted here.

(Information Acquisition Unit 143)

Measurement Entity

The control apparatus 100-3 (the information acquisition unit 143) according to the third embodiment acquires the result of the measurement by one or more small base stations 200-3. On the other hand, the control apparatus 100-4 (information acquisition unit 143) according to the fourth embodiment acquires a result of measurement by the terminal apparatus 400-4 connected to the one or more small base stations 200-3. That is, according to the fourth embodiment, the terminal apparatus 400-4 connected to each of the one or more small base stations 200-3 measures a reference signal transmitted by the small base station 300-4 and supplies a result of the measurement to the small base station 200-4. Then, for example, each of the one or more small base stations 300-2 supplies the result of the measurement to the control apparatus 100-2. Accordingly, for example, even when the small base station 200-4 has no measurement function, the result of the measurement can be obtained.

<6.2. Configuration of Small Base Station>

Next, the configuration of a small base station 200-4 according to the fourth embodiment will be described with reference to FIG. 29. FIG. 29 is a block diagram illustrating an example of the configuration of the small base station 200-4 according to the fourth embodiment. Referring to FIG. 29, the small base station 200-4 includes an antenna unit 210, a radio communication unit 221, a network communication unit 230, a storage unit 240, and a processing unit 260.

For example, the description of the antenna unit 210, the network communication unit 230, and the storage unit 240 is no different between the third and fourth embodiments (excluding differences in reference numerals). Thus, only the radio communication unit 221 and the processing unit 260 will be described here and the repeated description will be omitted.

(Radio Communication Unit 220)

The radio communication unit 221 performs radio communication. For example, the radio communication unit 221 transmits a downlink signal to the terminal apparatus 400-4. The radio communication unit 221 receives an uplink signal from the terminal apparatus 400-3.

In the fourth embodiment, the radio communication unit 221 may not receive a downlink signal from the small base station 300-4.

(Processing Unit 260)

The processing unit 260 supplies various functions of the small base station 200-4. The processing unit 260 includes a request unit 261, an information acquisition unit 263, and an information supply unit 265.

(Request Unit 261)

The request unit 261 requests the terminal apparatus 400-4 connected to the small base station 200-4 to supply the result of the measurement of the reference signal transmitted by the small base station 300-4.

For example, the control apparatus 100-4 requests the small base station 200-4 to supply the result of the measurement of the reference signal transmitted by the small base station 300-4. Then, the request unit 261 requests the terminal apparatus 400-4 connected to the small base station 200-4 to supply the result of the measurement of the reference signal transmitted by the small base station 300-4.

The request unit 261 may request only one terminal apparatus 400-4 connected to the small base station 200-4 to supply the result of the measurement. Alternatively, the request unit 261 may request two or more terminal apparatuses 400-4 connected to the small base station 200-4 to supply the result of the measurement.

(Information Acquisition Unit 263)

The information acquisition unit 263 acquires the result of the measurement of the reference signal transmitted by the small base station 300-4. In the fourth embodiment, the information acquisition unit 263 acquires the result of the measurement by the terminal apparatus 400-4 connected to the small base station 200-4.

For example, as described above, the request unit 261 requests the terminal apparatus 400-4 connected to the small base station 200-4 to supply the result of the measurement of the reference signal transmitted by the small base station 300-4. Then, the terminal apparatus 400-4 supplies the small base station 200-4 with the result of the measurement of the reference signal transmitted by the small base station 300-4. Then, the result of the measurement is stored in the storage unit 240. The information acquisition unit 263 acquires the result of the measurement from the storage unit 240.

As described above, the request unit 261 may request two or more terminal apparatuses 400-4 connected to the small base station 200-4 to supply the result of the measurement and the information acquisition unit 263 may acquire the result of the measurement by the two or more terminal apparatuses 400-4. In this case, as one example, the information acquisition unit 263 may acquire the result of the individual measurement by each of the two or more terminal apparatuses 400-4. As another example, the processing unit 260 may generate a result (for example, an average value) of all the measurements from the results of the individual measurements of the two or more terminal apparatuses 400-4 and the information acquisition unit 263 may acquire the result of all the measurements.

(Information Supply Unit 265)

The information supply unit 265 supplies the result of the measurement to the control apparatus 100-4. For example, the information supply unit 265 supplies the result of the measurement to the control apparatus 100-4 via the network communication unit 230. The information supply unit 265 may also supply the cell ID of the cell of the small base station 200-4 along with the result of the measurement.

<4.3. Configuration of Terminal Apparatus>

Next, the configuration of a terminal apparatus 400-4 according to the fourth embodiment will be described with reference to FIG. 30. FIG. 30 is a block diagram illustrating an example of the configuration of the terminal apparatus 400-4 according to the fourth embodiment. Referring to FIG. 30, the terminal apparatus 400-4 includes an antenna unit 410, a radio communication unit 420, a storage unit 430, and a processing unit 450.

For example, the description of the antenna unit 410, the radio communication unit 420, and the storage unit 430 is no different between the second and fourth embodiments (excluding differences in reference numerals). Thus, only the processing unit 450 will be described here and the repeated description will be omitted.

(Processing Unit 450)

The processing unit 450 supplies various functions of the terminal apparatus 400-4. The processing unit 450 includes the measurement unit 451 and the information supply unit 453.

(Measurement Unit 451)

The measurement unit 451 measures the reference signal transmitted by the small base station 300-4.

For example, the reference signal is the CRS. That is, the measurement unit 451 measures the CRS transmitted by small base station 300-4. As one example, the result of the measurement includes the reception level, the SINR, and/or the path loss of the CRS.

(Information Supply Unit 453)

The information supply unit 453 supplies the result of the measurement to the small base station to which the terminal apparatus 400-4 is connected. The small base station is the small base station 200-4. For example, the information supply unit 453 supplies the result of the measurement to the small base station 200-4 via the radio communication unit 420.

<6.4. Flow of Process>

Next, an example of a process according to the fourth embodiment will be described with reference to FIG. 31. FIG. 31 is a sequence diagram illustrating an example of a schematic flow of the process according to the fourth embodiment. The process according to the fourth embodiment is performed, for example, after registration and authentication, self-testing, setting of radio parameters, and the like of the small base station 300-4 are completed.

The small base station 300-4 requests the control apparatus 100-4 to set the MBSFN (S561). Then, the control apparatus 100-4 requests one or more small base stations 200-4 to supply the result of the measurement of the reference signal transmitted by the small base station 300-4 (S563). Thereafter, each of the one or more small base stations 200-4 requests the terminal apparatus 400-4 connected to the small base station 200-4 to supply the result of the measurement of the reference signal transmitted by the small base station 300-4 (S565). Then, the terminal apparatus 400-4 measures the reference signal transmitted by the small base station 300-4 (S567). The terminal apparatus 400-4 supplies the result of the measurement to the small base station 200-4 to which the terminal apparatus 400-4 is connected (S569). Thereafter, each of the one or more small base stations 200-4 supplies the result of the measurement to the control apparatus 100-4 (S571). Based on the result of the measurement, the control apparatus 100-4 decides the MBSFN area to which the cell of the small base station 300-4 belongs (S573).

Thereafter, the control apparatus 100-4 transmits the MBMS session start request message and the MBMS scheduling information message corresponding to the decided MBSFN area to the small base station 300-2 (S575 and S577). Then, the small base station 300-4 starts an operation as the base station of the decided MBSFN area (S579)

The fourth embodiment has been described above. According to the fourth embodiment, the control apparatus 100-4 acquires the result of the measurement of the reference signal transmitted by the small base station 300-4 which is supplied by one or more small base stations 200-4. Then, based on the result of the measurement, the control apparatus 100-4 decides the MBSFN area to which the cell of the small base station 300-4 belongs. Accordingly, for example, it is possible to automatically decide the MBSFN area to which the cell of the small base station 300-4 belongs. For example, the MBSFN area can be decided without a special operation by the small base station 300-4.

According to the fourth embodiment, the result of the measurement is the result of the measurement by the terminal apparatus 400-4 connected to the one or more small base stations 200-4. Accordingly, for example, the result of the measurement can be obtained even when the small base station 200-4 has no measurement function.

7. Application Examples

The technology of the present disclosure is applicable to various products. For example, a control apparatus 100 may be realized as any type of server such as a tower server, a rack server, and a blade server. At least a part of constituent elements of the control apparatus 100 may be realized as a module (such as an integrated circuit module including a single die, and a card or a blade that is inserted into a slot of a blade server) mounted on a server.

For example, the small base station 200 and the small base station 300 may be realized as an evolved node B (eNB). In particular, the small base station 200 and the small base station 300 may be a small eNB that covers a smaller cell than a macro cell. As one example, the small base station 200 and the small base station 300 may be a home (femto) eNB. As another example, the small base station 200 and the small base station 300 may be a pico eNB or a micro eNB. Instead, the small base station 200 and the small base station 300 may be realized as any other types of base stations such as a NodeB and a base transceiver station (BTS). The small base station 200 and the small base station 300 may include a main body (that is also referred to as a base station apparatus) configured to control radio communication, and one or more remote radio heads (RRH) disposed in a different place from the main body. Additionally, various types of terminals to be discussed later may also operate as the small base station 200 or the small base station 300 by temporarily or semi-permanently executing a base station function.

For example, a terminal apparatus 400 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. At least a part of constituent elements of the terminal apparatus 400 may also be realized as a terminal (that is also referred to as a machine type communication (MTC) terminal) that performs machine-to-machine (M2M) communication. Furthermore, the terminal apparatus 400 may be a radio module (such as an integrated circuit module including a single die) mounted on each of the terminals.

<7.1. Application Example Regarding Control Apparatus>

Figure 32:
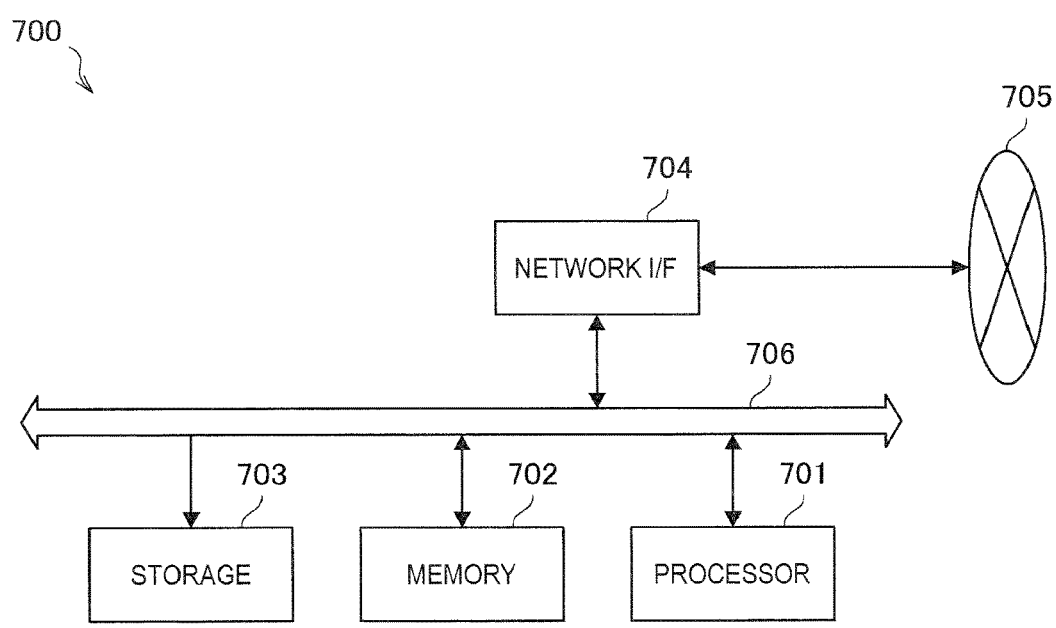
FIG. 32 is a block diagram illustrating an example of a schematic configuration of a server.

FIG. 32 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 illustrated in FIG. 32, at least a part of constituent elements (i.e. the request unit 131, the information acquisition unit 133, the decision unit 135, and the control unit 137) included in the processing unit 130 described with reference to FIG. 17 may be implemented in the processor 701. As one example, a program causing the processor to function as at least the part of constituent elements (in other words, a program causing the processor to perform the operations of at least the part of constituent elements) may be installed in the server 700 so that the processor 701 can execute the program. As another example, in the server 700, a module including the processor 701 and the memory 702 may be mounted and at least the part of constituent elements may be implemented in the module. In this case, the module may store a program causing the processor to function as at least the part of constituent elements in the memory 702 and the processor 701 may execute the program. As described above, the server 700 or the module may be provided as an apparatus including at least the part of constituent elements or the program causing the processor to function as at least the part of constituent elements may be provided. A readable storage medium storing the program may be provided. In regard to this point, at least a part of the constituent elements included in the processing unit 140 described with reference to FIG. 25 are also the same as at least a part of the constituent elements included in the processing unit 130.

<7.2. Application Examples Regarding Base Station>
(First Application Example)

Figure 33:
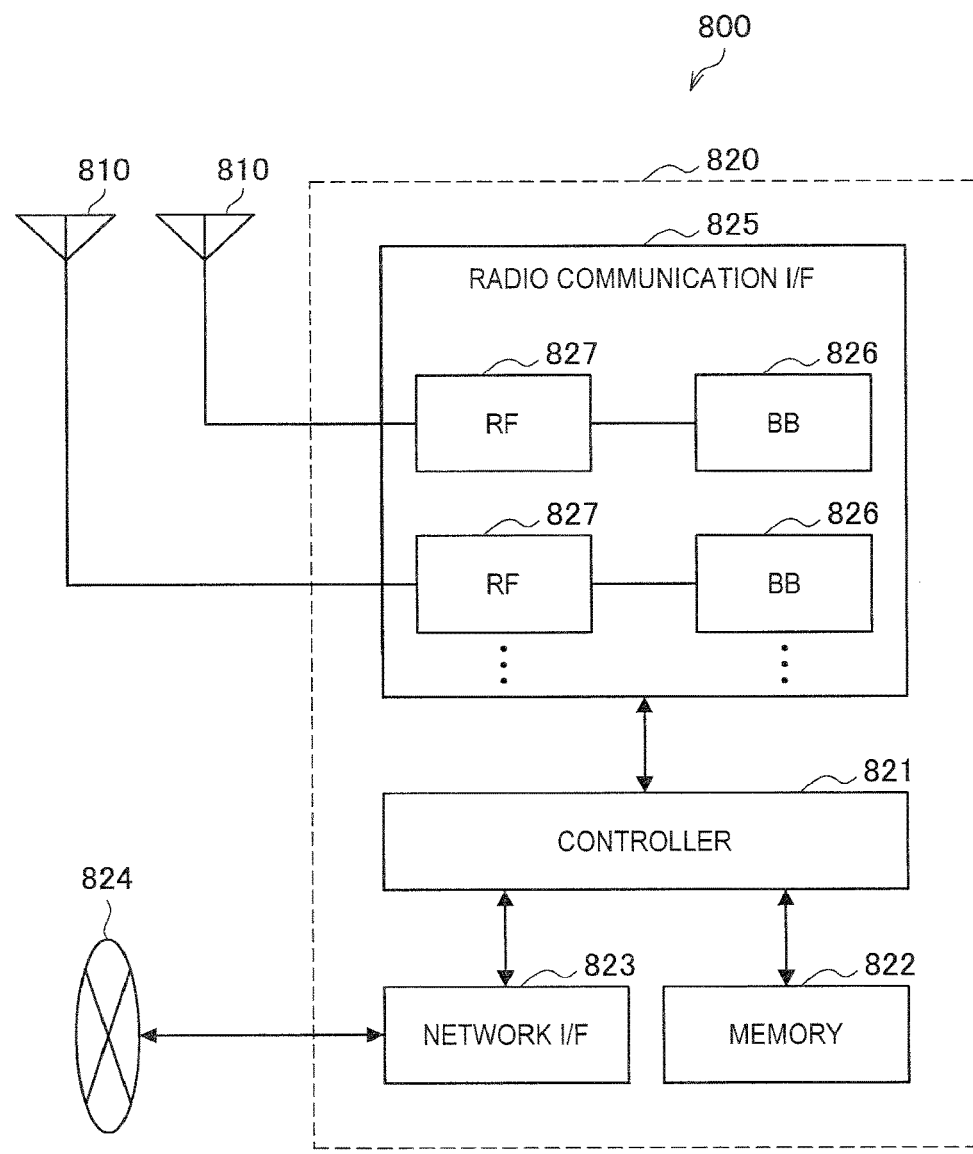
FIG. 33 is a block diagram illustrating a first example of a schematic configuration of an eNB.

FIG. 33 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 33. For example, the multiple antennas 810 may be compatible with multiple frequency bands used by the eNB 800. Although FIG. 33 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 33. For example, the multiple BB processors 826 may be compatible with multiple frequency bands used by the eNB 800. The radio communication interface 825 may include the multiple RF circuits 827, as illustrated in FIG. 33. For example, the multiple RF circuits 827 may be compatible with multiple antenna elements. Although FIG. 33 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 33, at least a part of constituent elements (i.e. the measurement unit 351, the information acquisition unit 353, and the information supply unit 355) included in the processing unit 350 described with reference to FIG. 20 may be implemented in the radio communication interface 825. Alternatively, at least the part of constituent elements may be implemented in the controller 821. As one example, in the eNB 800, a part (for example, the BB processor 826) or all of the radio communication interface 825 and/or a module including the controller 821 may be mounted, and at least the part of constituent elements may be implemented in the module. In this case, the module may store a program causing the processor to function as at least the part of constituent elements (in other words, a program causing the processor to perform the operations of at least the part of constituent elements) and may execute the program. As another example, a program causing the processor to function as at least the part of constituent elements may be installed in the eNB 800, and the radio communication interface 825 (for example, the BB processor 826) and/or the controller 821 may execute the program. As described above, the eNB 800, the base station apparatus 820, or the module may be provided as an apparatus including at least the part of constituent elements, or a program causing the processor to function as at least the part of constituent elements may be provided. A readable storage medium storing the program may be provided. In regard to this point, at least a part of the constituent elements included in the processing unit 360 described with reference to FIG. 22, at least a part of the constituent elements included in the processing unit 250 described with reference to FIG. 27, and at least a part of the constituent elements included in the processing unit 260 described with reference to FIG. 29 are also the same as at least a part of the constituent elements included in the processing unit 350.

(Second Application Example)

Figure 34:
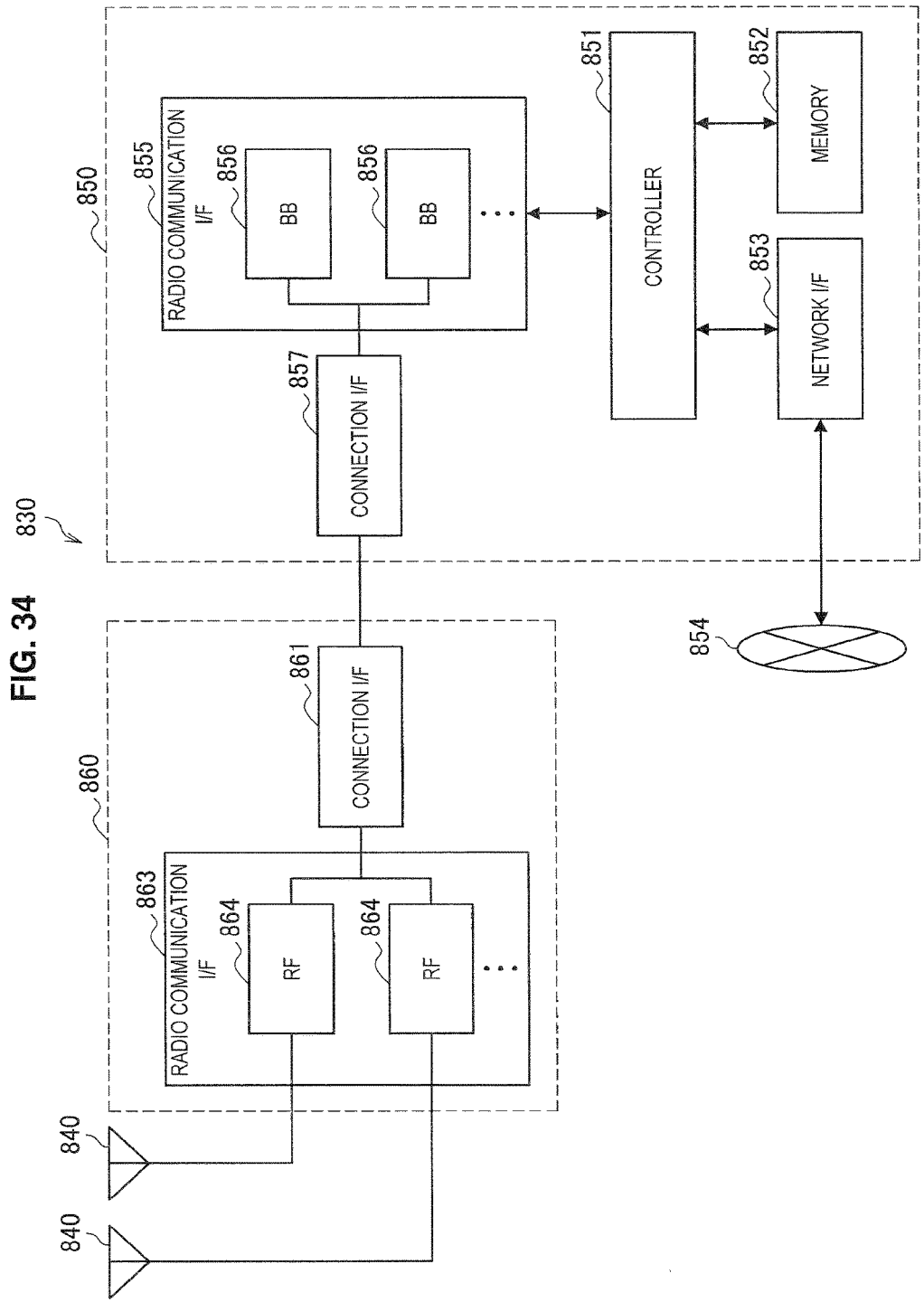
FIG. 34 is a block diagram illustrating a second example of a schematic configuration of an eNB.

FIG. 34 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 34. For example, the multiple antennas 840 may be compatible with multiple frequency bands used by the eNB 830. Although FIG. 34 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 33.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 33, except the BB processor 856 is connected to the RF circuit 864 of the RRH 860 via the connection interface 857. The radio communication interface 855 may include the multiple BB processors 856, as illustrated in FIG. 34. For example, the multiple BB processors 856 may be compatible with multiple frequency bands used by the eNB 830. Although FIG. 34 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 34. For example, the multiple RF circuits 864 may support multiple antenna elements. Although FIG. 34 illustrates the example in which the radio communication interface 863 includes the multiple RF circuits 864, the radio communication interface 863 may also include a single RF circuit 864.

In the eNB 830 illustrated in FIG. 34, at least a part of constituent elements (i.e. the measurement unit 351, the information acquisition unit 353, and the information supply unit 355) included in the processing unit 350 described with reference to FIG. 20 may be implemented in the radio communication interface 855 and/or the radio communication interface 863. Alternatively, at least the part of constituent elements may be implemented in the controller 851. As one example, in the eNB 830, a module including a part (for example, the BB processor 856) or all of the radio communication interface 855 and/or the controller 851 may be mounted, and at least the part of constituent elements may be implemented in the module. In this case, the module may store a program causing the processor to function as at least the part of constituent elements (in other words, a program causing the processor to perform the operations of at least the part of constituent elements) and may execute the program. As another example, a program causing the processor to function as at least the part of constituent elements may be installed in the eNB 830, and the radio communication interface 855 (for example, the BB processor 856) and/or the controller 851 may execute the program. As described above, the eNB 830, the base station apparatus 850, or the module may be provided as an apparatus including at least the part of constituent elements, or a program causing the processor to function as at least the part of constituent elements may be provided. A readable storage medium storing the program may be provided. In regard to this point, at least a part of the constituent elements included in the processing unit 360 described with reference to FIG. 22, at least a part of the constituent elements included in the processing unit 250 described with reference to FIG. 27, and at least a part of the constituent elements included in the processing unit 260 described with reference to FIG. 29 are also the same as at least a part of the constituent elements included in the processing unit 350.

<7.3. Application Examples Regarding Terminal Apparatus>

(First Application Example)

Figure 35:
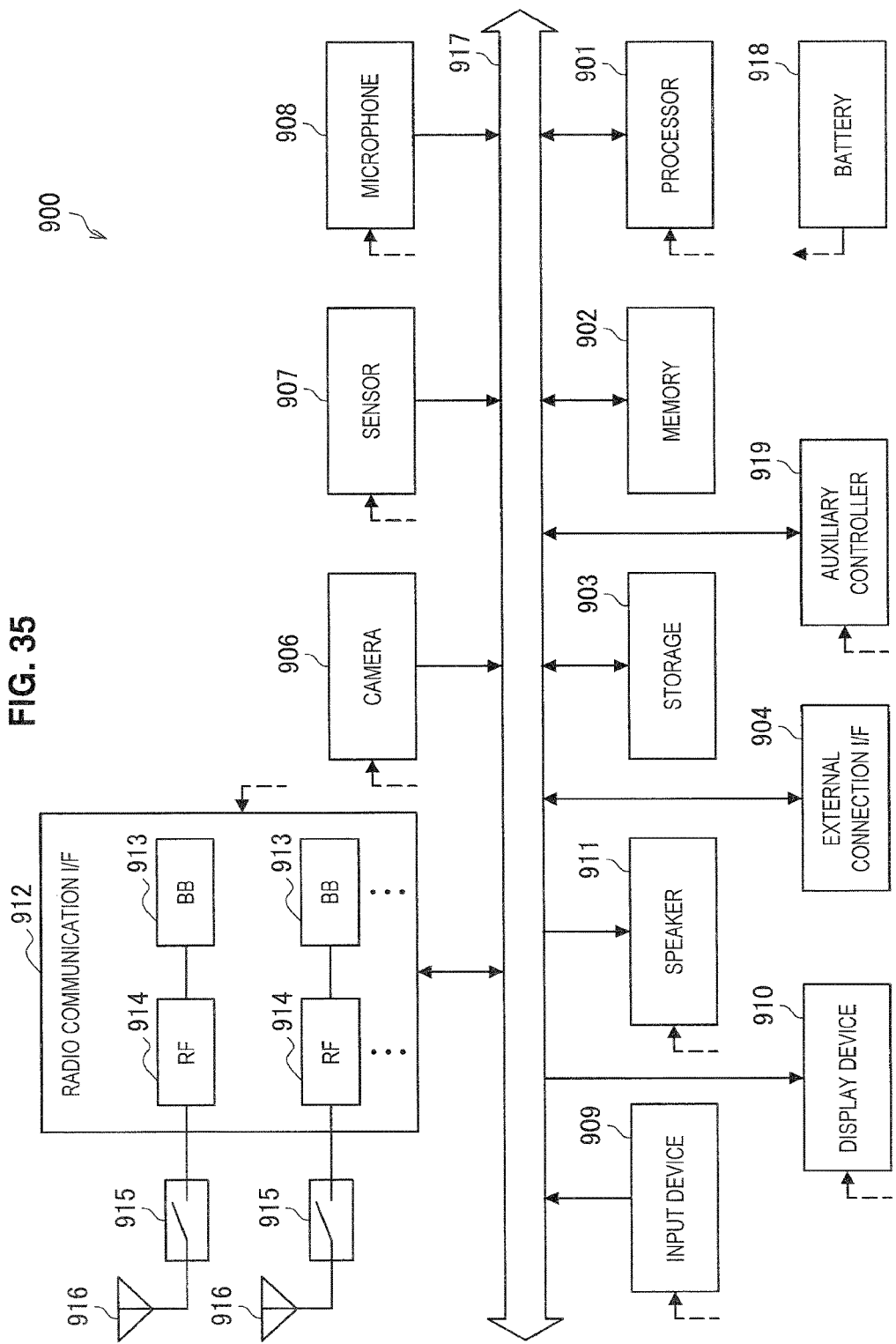
FIG. 35 is a block diagram illustrating an example of a schematic configuration of a smartphone.

FIG. 35 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 35. Although FIG. 35 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 35. Although FIG. 35 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 35 via feeder lines, which are partially shown as dashed lines in the figure. The auxiliary controller 919 operates a minimum necessary function of the smartphone 900, for example, in a sleep mode.

In the smartphone 900 illustrated in FIG. 35, at least one of the measurement unit 441 and the information supply unit 443 described with reference to FIG. 23 may be implemented in the radio communication interface 912. Alternatively, at least one of the measurement unit 441 and the information supply unit 443 may be implemented in the processor 901 in the auxiliary controller 919. As one example, in the smartphone 900, a module including a part (for example, the BB processor 913) or all of the radio communication interface 912, the processor 901, and/or the auxiliary controller 919 may be mounted, and at least one of the measurement unit 441 and the information supply unit 443 may be implemented in the module. In this case, the module may store a program causing the processor to function as at least one of the measurement unit 441 and the information supply unit 443 (in other words, a program causing the processor to perform the operations of at least one of the measurement unit 441 and the information supply unit 443) and may execute the program. As another example, a program causing the processor to function as at least one of the measurement unit 441 and the information supply unit 443 may be installed in the smartphone 900, and the radio communication interface 912 (for example, the BB processor 913), the processor 901, and/or the auxiliary controller 919 may execute the program. As described above, the smartphone 900 or the module may be provided as an apparatus including at least one of the measurement unit 441 and the information supply unit 443, or a program causing the processor to function as at least one of the measurement unit 441 and the information supply unit 443 may be provided. A readable storage medium storing the program may be provided. In regard to this point, at least one of the measurement unit 451 and the information supply unit 453 is the same as at least one of the measurement unit 441 and the information supply unit 443.

(Second Application Example)

FIG. 36 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 36. Although FIG. 36 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 36. Although FIG. 36 illustrates the example in which the car navigation apparatus 920 includes the multiple antennas 937, the car navigation apparatus 920 may also include a single antenna 937.

Furthermore, a FIG. 36 car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 36 via feeder lines that are partially shown as dashed lines in the figure. The battery 938 accumulates power supplied form the vehicle.

In the car navigation apparatus 920 illustrated in FIG. 36, at least one of the measurement unit 441 and the information supply unit 443 described with reference to FIG. 23 may be implemented in the radio communication interface 933. Alternatively, at least one of the measurement unit 441 and the information supply unit 443 may be implemented in the processor 921. As one example, in the car navigation apparatus 920, a module including a part (for example, the BB processor 934) or all of the radio communication interface 933 and/or the processor 921 may be mounted, and at least one of the measurement unit 441 and the information supply unit 443 may be implemented in the module. In this case, the module may store a program causing the processor to function as at least one of the measurement unit 441 and the information supply unit 443 (in other words, a program causing the processor to perform the operations of at least one of the measurement unit 441 and the information supply unit 443) and may execute the program. As another example, a program causing the processor to function as at least one of the measurement unit 441 and the information supply unit 443 may be installed in the car navigation apparatus 920, and the radio communication interface 933 (for example, the BB processor 934) and/or the processor 921 may execute the program. As described above, the car navigation apparatus 920 or the module may be provided as an apparatus including at least one of the measurement unit 441 and the information supply unit 443, or a program causing the processor to function as at least one of the measurement unit 441 and the information supply unit 443 may be provided. A readable storage medium storing the program may be provided. In regard to this point, at least one of the measurement unit 451 and the information supply unit 453 described with reference to FIG. 30 is the same as at least one of the measurement unit 441 and the information supply unit 443.

The technology of the present disclosure may also be realized as an in-vehicle system (or a vehicle) 940 including one or more blocks of the car navigation apparatus 920, the in-vehicle network 941, and a vehicle module 942. That is, the in-vehicle system (or a vehicle) 940 may be provided as an apparatus including at least one of the measurement unit 441 and the information supply unit 443 (or at least one of the measurement unit 451 and the information supply unit 453). The vehicle module 942 generates vehicle data such as vehicle speed, engine speed, and trouble information, and outputs the generated data to the in-vehicle network 941.

8. Conclusion

Each apparatus and each process according to the embodiments of the present disclosure have been described above with reference to FIGS. 1 to 36.

According to the embodiments of the present disclosure, the control apparatus 100 acquires a result of measurement of a reference signal transmitted by one of a target base station (for example, the small base station 300) and one or more other base stations (for example, one or more small base stations 200) which is supplied by the other of the target base station and the one or more other base stations. Then, the control apparatus 100 decides the MBSFN area to which the cell of the target base station (for example, the small cell of the small base station 300) belongs based on the result of the measurement.

Accordingly, for example, it is possible to automatically decide the MBSFN area to which the cell of the small base station 300 belongs.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the embodiments in which attention is paid to the small base station have been described, but an embodiment of the present disclosure is not limited to the related example. For example, the operation of the above-described small base station may be performed by the macro base station. That is, the technology according to the present disclosure can be applied not only to the small base station but also to the macro base station.

For example, the example in which the communication system is a system that conforms to LTE, LTE-Advanced, or a communication standard equivalent thereto has been described, but an embodiment of the present disclosure is not limited thereto. For example, the communication system may be a system that conforms to another communication standard.

The processing steps in the processes of the present specification may not necessarily be performed chronologically in the orders described in the flowcharts or the sequence diagrams. For example, the processing steps in the processes may be performed in different orders from the orders described in the flowcharts or the sequence diagrams or may be performed in parallel.

It is also possible to generate a computer program causing the processors (for example, CPUs or DSPs) included in the nodes (for example, the control apparatus, the small base station, and/or the terminal apparatus) of the present specification to function as the constituent elements (for example, the information acquisition unit and the decision unit) of the nodes (in other words, a computer program causing the processor to perform the operations of the constituent elements of the nodes). A storage medium storing the computer program may be provided. An apparatus (for example, an apparatus body or a module (a processing circuit, a chip, or the like) for the apparatus body) including a memory storing the computer program and one or more processors capable of executing the computer program may also be provided.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An apparatus including:

an acquisition unit configured to acquire a result of measurement of a reference signal transmitted by one of a target base station and one or more other base stations, the result of the measurement being supplied by the other of the target base station and the one or more other base stations; and a decision unit configured to decide a multimedia broadcast multicast service (MBMS) over single frequency network (MBSFN) area to which a cell of the target base station belongs based on the result of the measurement.

(2)

The apparatus according to (1), wherein the target base station is a small cell base station, and wherein the cell is a small cell.

(3)

The apparatus according to (2), wherein each of the one or more other base stations is a small cell base station.

(4)

The apparatus according to (2) or (3), wherein the MBSFN area is formed by one or more small cells.

(5)

The apparatus according to any one of (1) to (4), wherein the result of the measurement is a result of measurement of reference signal transmitted by the one or more other base stations, the result of the measurement being supplied by the target base station.

(6)

The apparatus according to (5), wherein the result of the measurement is a result of measurement by the target base station.

(7)

The apparatus according to (5), wherein the result of the measurement is a result of measurement by a terminal apparatus connected to the target base station.

(8)

The apparatus according to any one of (1) to (4), wherein the result of the measurement is a result of measurement of the reference signal transmitted by the target base station, the result of the measurement being supplied by the one or more other base stations.

(9)
The apparatus according to (8),
wherein the result of the measurement is a result of measurement by each of the one or more other base stations.
(10)
The apparatus according to (8),
wherein the result of the measurement is a result of measurement by a terminal apparatus connected to each of the one or more other base stations.
(11)
The apparatus according to any one of (5) to (7),
wherein the reference signal is an MBSFN reference signal.
(12)
The apparatus according to (11),
wherein the result of the measurement includes identification information and a result of measurement in each of one or more MBSFN areas.
(13)
The apparatus according to (12),
wherein the decision unit decides one MBSFN area among the one or more MBSFN areas as an MBSFN area to which a cell of the target base station belongs.
(14)
The apparatus according to any one of (11) to (13),
wherein the result of the measurement includes a reception level or a signal-to-interference-plus-noise ratio (SINR) of an MBSFN reference signal.
(15)
The apparatus according to (11),
wherein the result of the measurement is information indicating one MBSFN area.
(16)
The apparatus according to any one of (5) to (10),
wherein the reference signal is a cell-specific reference signal (CRS).
(17)
The apparatus according to (16),
wherein the result of the measurement includes identification information and a result of measurement in regard to each of the one or more other base stations.
(18)
The apparatus according to (17),
wherein the decision unit decides an MBSFN area to which a cell of one base station belongs among the one or more other base stations as an MBSFN area to which a cell of the target base station belongs.
(19)
The apparatus according to any one of (16) to (18),
wherein the result of the measurement includes a reception level, an SINR, or a path loss of the CRS.
(20)
The apparatus according to (16),
wherein the result of the measurement is information indicating one base station among the one or more other base stations.
(21)
An apparatus including:
an acquisition unit configured to acquire a result of measurement of a reference signal transmitted by one of a target base station and one or more other base stations; and
a supply unit configured to supply the result of the measurement to a control apparatus that decides an MBSFN area to which a cell of the target base station belongs.

(22)
The apparatus according to (21),
wherein the result of the measurement is a result of measurement of a reference signal transmitted by the one or more other base stations, and
wherein the apparatus is the target base station, a base station apparatus for the target base station, or a module for the base station apparatus.
(23)
The apparatus according to (21),
wherein the result of the measurement is a result of measurement of a reference signal transmitted by the target base station, and
wherein the apparatus is another base station, a base station apparatus for the other base station, or a module for the base station apparatus.
(24)
An apparatus including:
a measurement unit configured to measure an MBSFN reference signal transmitted by one or more base stations; and
a supply unit configured to supply a result of the measurement to a base station to which a terminal apparatus is connected.
(25)
The apparatus according to (24),
wherein the apparatus is the terminal apparatus or a module for the terminal apparatus.
(26)
A method including:
acquiring a result of measurement of a reference signal transmitted by one of a target base station and one or more other base stations, the result of the measurement being supplied by the other of the target base station and the one or more other base stations; and
deciding, by a processor, an MBSFN area to which a cell of the target base station belongs based on the result of the measurement.
(27)
A program for causing a processor to execute:
acquiring a result of measurement of a reference signal transmitted by one of a target base station and one or more other base stations, the result of the measurement being supplied by the other of the target base station and the one or more other base stations; and
deciding an MBSFN area to which a cell of the target base station belongs based on the result of the measurement.
(28)
A readable recording medium having a program recorded thereon, the program causing a processor to execute:
acquiring a result of measurement of a reference signal transmitted by one of a target base station and one or more other base stations, the result of the measurement being supplied by the other of the target base station and the one or more other base stations; and
deciding an MBSFN area to which a cell of the target base station belongs based on the result of the measurement.
(29)
A method including:
acquiring a result of measurement of a reference signal transmitted by one of a target base station and one or more other base stations; and
supplying, by a processor, the result of the measurement to a control apparatus that decides an MBSFN area to which a cell of the target base station belongs.

(30)
A program for causing a processor to execute:
acquiring a result of measurement of a reference signal transmitted by one of a target base station and one or more other base stations; and
supplying the result of the measurement to a control apparatus that decides an MBSFN area to which a cell of the target base station belongs.

(31)
A readable recording medium having a program recorded thereon, the program causing a processor to execute:
acquiring a result of measurement of a reference signal transmitted by one of a target base station and one or more other base stations; and
supplying the result of the measurement to a control apparatus that decides an MBSFN area to which a cell of the target base station belongs.

(32)
A method including:
measuring, by a processor, an MBSFN reference signal transmitted by one or more base stations; and
supplying a result of the measurement to a base station to which a terminal apparatus is connected.

(33)
A program for causing a processor to execute:
measuring an MBSFN reference signal transmitted by one or more base stations; and
supplying a result of the measurement to a base station to which a terminal apparatus is connected.

(34)
A readable recording medium having a program recorded thereon, the program causing a processor to execute:
measuring an MBSFN reference signal transmitted by one or more base stations; and
supplying a result of the measurement to a base station to which a terminal apparatus is connected.

REFERENCE SIGNS LIST 1 communication system
10 macro cell
11 macro base station
20 small cell
100 control apparatus
131, 141 request unit
133, 143 information acquisition unit
135, 145 decision unit
137, 147 control unit
200 small base station
251 measurement unit
253, 263 information acquisition unit
255, 265 information supply unit
261 request unit
300 small base station
351 measurement unit
353, 363 information acquisition unit
355, 365 information supply unit
361 request unit
400 terminal apparatus
441, 451 measurement unit
443, 453 information supply unit

The invention claimed is:

1. An apparatus comprising:
circuitry configured to:
acquire a result of measurement of a reference signal transmitted by one of a target base station and one or more other base stations, the result of the measurement being supplied by the other of the target base station and the one or more other base stations, the target base station being newly installed; and
decide a multimedia broadcast multicast service (MBMS) over single frequency network (MBSFN) area to which a cell of the target base station belongs based on the result of the measurement, a cell of the one or more other base stations belonging to the MBSFN area.

2. The apparatus according to claim 1,
wherein the target base station is a small cell base station, and
wherein the cell of the target base station is a small cell.

3. The apparatus according to claim 2, wherein each of the one or more other base stations is a small cell base station.

4. The apparatus according to claim 2, wherein the MBSFN area is formed by one or more small cells.

5. The apparatus according to claim 1, wherein the result of the measurement is a result of measurement of the reference signal transmitted by the one or more other base stations, the result of the measurement being supplied by the target base station.

6. The apparatus according to claim 5, wherein the result of the measurement is a result of measurement by the target base station.

7. The apparatus according to claim 5, wherein the result of the measurement is a result of measurement by a terminal apparatus connected to the target base station.

8. The apparatus according to claim 5, wherein the reference signal is an MBSFN reference signal.

9. The apparatus according to claim 8, wherein the result of the measurement includes identification information and a result of measurement in each of one or more MBSFN areas.

10. The apparatus according to claim 9, wherein the circuitry is configured to decide one MBSFN area among the one or more MBSFN areas as the MBSFN area to which the cell of the target base station belongs.

11. The apparatus according to claim 8, wherein the result of the measurement includes a reception level or a signal-to-interference-plus-noise ratio (SINR) of an MBSFN reference signal.

12. The apparatus according to claim 8, wherein the result of the measurement is information indicating one MBSFN area.

13. The apparatus according to claim 5, wherein the reference signal is a cell-specific reference signal (CRS).

14. The apparatus according to claim 13, wherein the result of the measurement includes identification information and a result of measurement in regard to each of the one or more other base stations.

15. The apparatus according to claim 14, wherein the circuitry is configured to device an MBSFN area to which a cell of one base station belongs among the one or more other base stations as the MBSFN area to which the cell of the target base station belongs.

16. The apparatus according to claim 13, wherein the result of the measurement includes a reception level, an SINR, or a path loss of the CRS.

17. The apparatus according to claim 13, wherein the result of the measurement is information indicating one base station among the one or more other base stations.

18. The apparatus according to claim 1, wherein the result of the measurement is a result of measurement of the reference signal transmitted by the target base station, the result of the measurement being supplied by the one or more other base stations.

19. The apparatus according to claim 18, wherein the result of the measurement is a result of measurement by each of the one or more other base stations.

20. The apparatus according to claim 18, wherein the result of the measurement is a result of measurement by a terminal apparatus connected to each of the one or more other base stations.

21. An apparatus comprising:
circuitry configured to:
acquire a result of measurement of a reference signal transmitted by one of a target base station and one or more other base stations, the target base station being newly installed; and
supply the result of the measurement to a control apparatus that decides an MBSFN area to which a cell of the target base station belongs, a cell of the one or more other base stations belonging to the MBSFN area.

22. The apparatus according to claim 21,
wherein the result of the measurement is a result of measurement of the reference signal transmitted by the one or more other base stations, and
wherein the apparatus is the target base station, a base station apparatus for the target base station, or a module for the base station apparatus.

23. The apparatus according to claim 21,
wherein the result of the measurement is a result of measurement of the reference signal transmitted by the target base station, and
wherein the apparatus is another base station, a base station apparatus for the other base station, or a module for the base station apparatus.

24. An apparatus comprising:
circuitry configured to:
measure an MBSFN reference signal transmitted by a first one of a target base station and one or more base stations; and
supply a result of the measurement to a second one of the target base station and the one or more base stations to which a terminal apparatus is connected,
wherein target base station is newly installed, and
wherein a cell of the one or more other base stations belongs to a multimedia broadcast multicast service (MBMS) over single frequency network (MBSFN) area.

25. The apparatus according to claim 24, wherein the apparatus is the terminal apparatus or a module for the terminal apparatus.

* * * * *